(12) United States Patent
Ko et al.

(10) Patent No.: US 10,674,463 B2
(45) Date of Patent: Jun. 2, 2020

(54) METHOD AND APPARATUS FOR RECEIVING A SYNCHRONIZATION SIGNAL

(71) Applicant: LG ELECTRONICS INC., Seoul (KR)

(72) Inventors: Hyunsoo Ko, Seoul (KR); Kijun Kim, Seoul (KR); Sukhyon Yoon, Seoul (KR); Youngsub Kim, Seoul (KR); Eunsun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/243,462

(22) Filed: Jan. 9, 2019

(65) Prior Publication Data

US 2019/0150110 A1 May 16, 2019

Related U.S. Application Data

(63) Continuation of application No. 16/064,938, filed as application No. PCT/KR2018/004860 on Apr. 26, 2018.

(Continued)

(51) Int. Cl.
*H04J 3/06* (2006.01)
*H04W 56/00* (2009.01)
(Continued)

(52) U.S. Cl.
CPC ........... *H04W 56/001* (2013.01); *H04J 11/00* (2013.01); *H04W 56/00* (2013.01);
(Continued)

(58) Field of Classification Search
CPC .................. H04W 56/00; H04W 56/0045; H04B 7/2662; H04J 2011/0096
See application file for complete search history.

(56) References Cited

U.S. PATENT DOCUMENTS

2016/0021632 A1\* 1/2016 Sun ...................... H04W 56/00 370/350
2018/0279380 A1\* 9/2018 Jung ................ H04W 56/0005
(Continued)

FOREIGN PATENT DOCUMENTS

| CL | 2019000065 | 4/2019 |
| KR | 10-2009-0125289 A | 12/2009 |

(Continued)

OTHER PUBLICATIONS

LG Electronics, "Discussion on SS block, SS burst set composition and time index indication," 3GPP TSG RAN WG1 Meeting #88bis, R1-1704862, Spokane, USA, Apr. 3-7, 2017, 8 pages.

(Continued)

*Primary Examiner* — Siren Wei
(74) *Attorney, Agent, or Firm* — Fish & Richardson P.C.

(57) ABSTRACT

A method of receiving a downlink (DL) signal by a user equipment (UE) operating on a frequency band above 6 GHz in a wireless communication system is discussed. The method includes receiving system information including first information related to one or more synchronization signal (SS) and PBCH (SS/PBCH) block groups and second information related to one or more SS/PBCH blocks within each of the one or more of SS/PBCH block groups; and receiving the DL signal in resources other than resources used for the one or more SS/PBCH blocks within each of the one or more of SS/PBCH block groups indicated by the first and second information.

18 Claims, 44 Drawing Sheets

Related U.S. Application Data

(60) Provisional application No. 62/544,212, filed on Aug. 11, 2017, provisional application No. 62/502,543, filed on May 5, 2017.

(51) Int. Cl.
*H04W 72/04* (2009.01)
*H04W 72/00* (2009.01)
*H04J 11/00* (2006.01)

(52) U.S. Cl.
CPC ......... *H04W 72/005* (2013.01); *H04W 72/04* (2013.01); *H04W 72/042* (2013.01)

(56) References Cited

U.S. PATENT DOCUMENTS

| | | | |
|---|---|---|---|
| 2018/0324022 A1* | 11/2018 | Sheng | H04L 5/0094 |
| 2018/0324678 A1 | 11/2018 | Chen et al. | |
| 2018/0324753 A1 | 11/2018 | Islam et al. | |
| 2019/0150110 A1 | 5/2019 | Ko et al. | |
| 2019/0335406 A1 | 10/2019 | Akkarakaran et al. | |
| 2020/0067755 A1 | 2/2020 | Pan et al. | |

FOREIGN PATENT DOCUMENTS

| | | |
|---|---|---|
| KR | 10-2013-0018890 A | 2/2013 |
| KR | 10-2014-0065398 A | 5/2014 |
| KR | 10-2014-0126309 A | 10/2014 |
| KR | 10-1502614 B1 | 3/2015 |
| KR | 10-2016-0086904 A | 7/2016 |
| KR | 10-2017-0007163 A | 1/2017 |
| WO | WO 2016/168478 A1 | 10/2016 |
| WO | WO 2017/053024 A1 | 3/2017 |

OTHER PUBLICATIONS

LG Electronics, "Discussion on SS burst set composition," 3GPP TSG RAN WG1 Meeting Nr#2, R1-1710259, Qingdao, P.R. China, Jun. 27-30, 2017, 7 pages.

MCC Support, "Draft Report of 3GPP TSG RAN WG1 #88 v0.1.0," 3GPP TSG RAN WG1 Meeting #88bis, Spokane, USA, Apr. 3-7, 2017, 145 pages.

Extended European Search Report in European Application No. 18794240.4, dated Feb. 6, 2020, 6 pages.

ZTE, ZTE Microelectronics, "Composition of SS block, burst and burst set," R1-1704358, 3GPP TSG RAN WG1 Meeting #88bis, Spokane, USA, dated Apr. 3-7, 2017, 10 pages, XP051251161.

United States Office Action in U.S. Appl. No. 16/064,938, dated Apr. 2, 2020, 11 pages.

* cited by examiner

FIG. 1
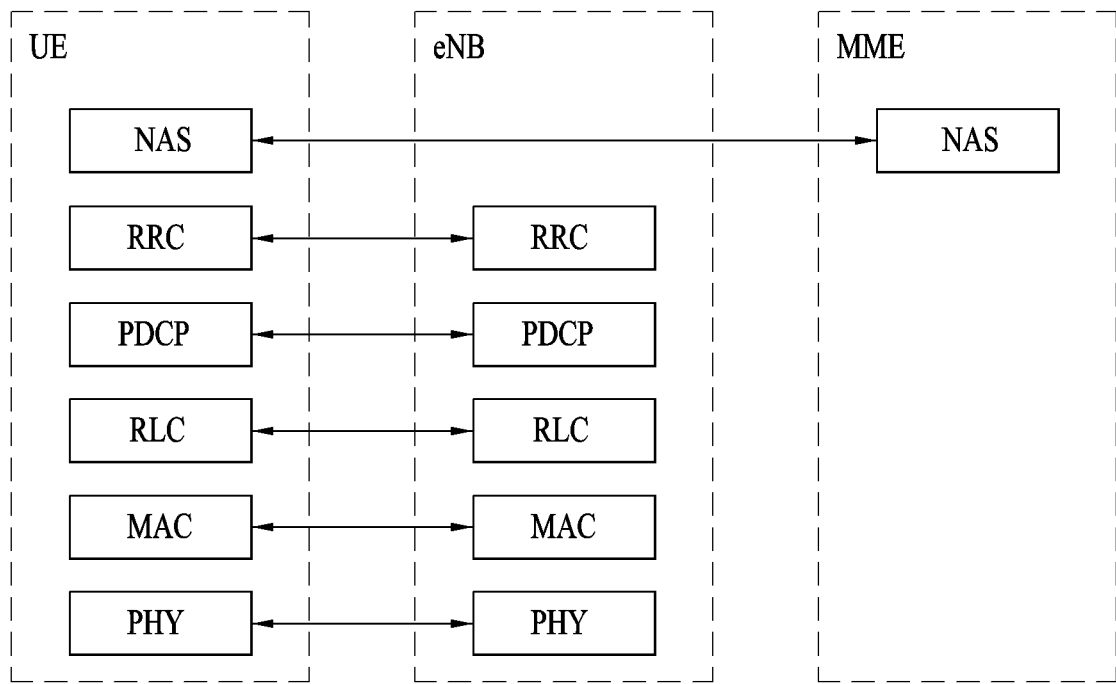
(A) CONTROL-PLANE PROTOCOL STACK
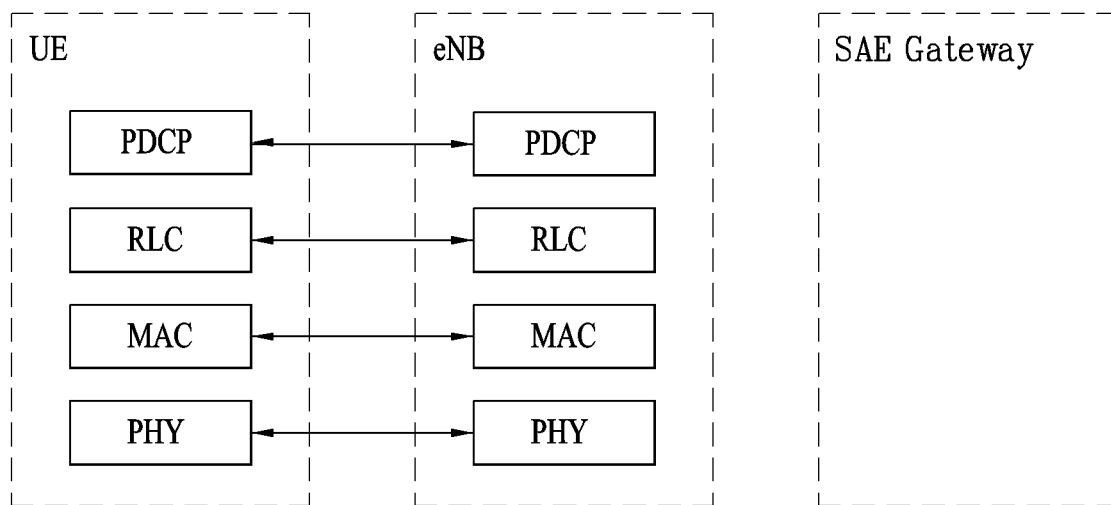
(B) USER-PLANE PROTOCOL STACK (A)  (B)

FIG. 15
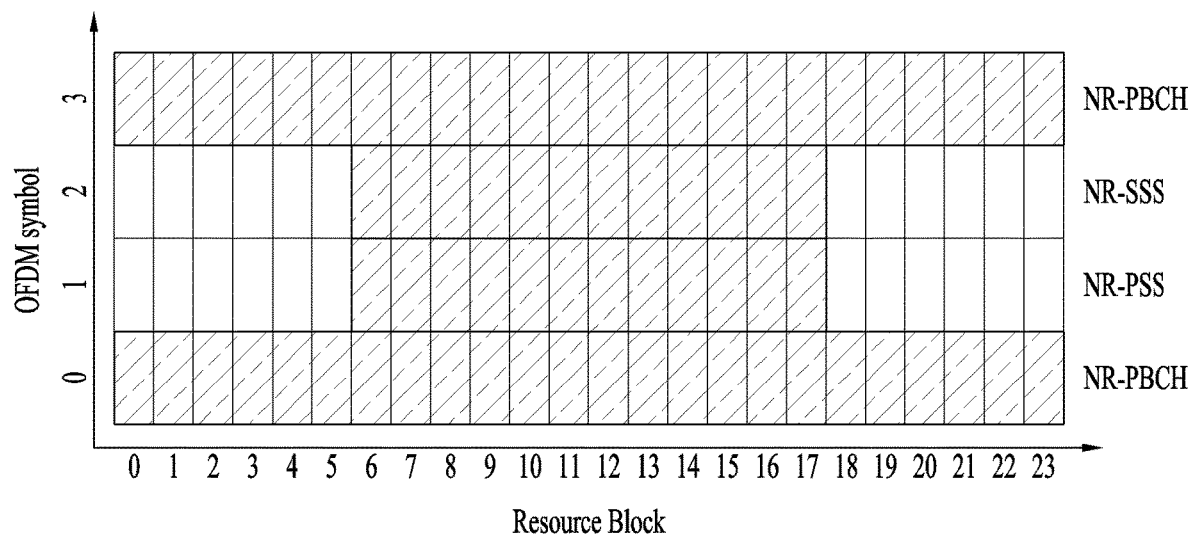
(a)
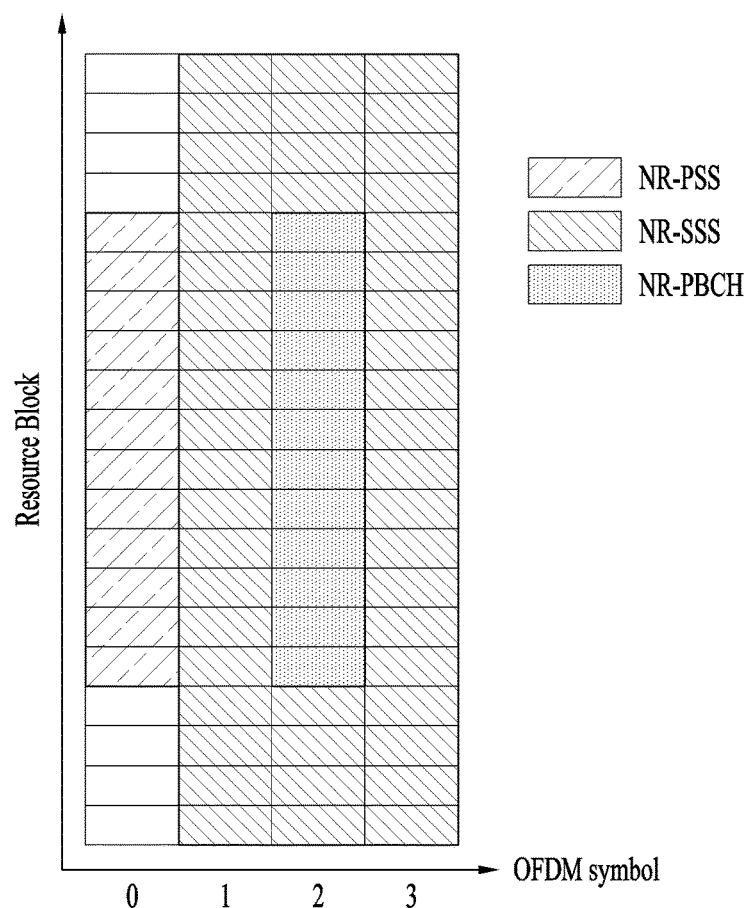
(b)

METHOD AND APPARATUS FOR RECEIVING A SYNCHRONIZATION SIGNAL

CROSS-REFERENCE TO RELATED APPLICATIONS

This Application is a Continuation of co-pending U.S. patent application Ser. No. 16/064,938 filed on Jun. 21, 2018, which is the National Phase of PCT International Application No. PCT/KR2018/004860 filed on Apr. 26, 2018, which claims the priority benefit under 35 U.S.C. § 119(e) to U.S. Provisional Application Nos. 62/544,212 filed on Aug. 11, 2017 and 62/502,543 filed on May 5, 2017, all of which are hereby expressly incorporated by reference into the present application.

BACKGROUND OF THE INVENTION

Field of the Invention

The present invention relates to a method of receiving a synchronization signal and an apparatus therefor, and more particularly, to a method of indicating an index of an actually transmitted synchronization signal among synchronization signal candidates determined according to subcarrier spacing, a method of receiving a synchronization signal based on the index, and an apparatus therefor.

Discussion of the Related Art

As more communication devices require greater communication traffic, necessity for a next generation 5G system corresponding to mobile broadband communication, which is enhanced compared to a legacy LTE system, is emerging. In the next generation 5G system, scenarios can be classified into Enhanced Mobile BroadBand (eMBB), Ultra-reliable Machine-Type Communications (uMTC), Massive Machine-Type Communications (mMTC), and the like.

The eMBB corresponds to a next generation mobile communication scenario having such a characteristic as high spectrum efficiency, high user experienced data rate, high peak data rate, and the like, the uMTC corresponds to a next generation mobile communication scenario having such a characteristic as ultra-reliable, ultra-low latency, ultra-high availability, and the like (e.g., V2X, Emergency Service, Remote Control), and the mMTC corresponds to a next generation mobile communication scenario having such a characteristic as low cost, low energy, short packet, and massive connectivity (e.g., IoT).

SUMMARY OF THE INVENTION

An object of the present invention is to provide a method of receiving a synchronization signal and an apparatus therefor.

Technical tasks obtainable from the present invention are non-limited by the abovementioned technical task. And, other unmentioned technical tasks can be clearly understood from the following description by those having ordinary skill in the technical field to which the present invention pertains.

To achieve these and other advantages and in accordance with the purpose of the present invention, as embodied and broadly described, according to one embodiment, a method of receiving a synchronization signal block, which is received by a user equipment (UE) in a wireless communication system, includes receiving a message containing a synchronization signal block group indicator, which indicates one or more synchronization signal block groups containing at least one transmission synchronization signal block, among a plurality of synchronization signal block groups grouping the prescribed number of candidate synchronization signal block positions of a synchronization signal block consisting of a primary synchronization signal, a secondary synchronization signal, and a physical broadcast channel signal, and receiving the at least one transmission synchronization signal block based on the message.

In particular, the message can further include a first synchronization signal block indicator indicating the at least one transmission synchronization signal block contained in the one or more synchronization signal block groups.

The message can be received when the UE operates on a frequency band exceeding a specific value.

If the UE operates on a frequency band equal to or less than a specific value, a second synchronization signal block indicator indicating a position at which a transmission synchronization signal block is transmitted is received on the frequency band equal to or less than the specific value using a bitmap of which each bit corresponds to a candidate synchronization signal block position and a synchronization signal block can be received based on the second synchronization signal block indicator.

The synchronization signal block group indicator can indicate the one or more synchronization signal block groups using a bitmap.

The first synchronization signal block indicator may correspond to information on the number of the at least one transmission synchronization signal block included in the one or more synchronization signal block groups.

The first synchronization signal block indicator can indicate a position of the at least one transmission synchronization signal block within the one or more synchronization signal block groups.

If the at least one transmission synchronization signal block is received, a signal rather than the at least one transmission synchronization signal block may not be received in a resource corresponding to the at least one transmission synchronization signal block.

A second synchronization signal block indicator indicating a position at which the at least one transmission synchronization signal block is transmitted is further received using a bitmap of which each bit corresponds to a candidate synchronization signal block position. If the first synchronization signal block group indicator is collided with information of a second synchronization signal block indicator, the at least one transmission synchronization signal block can be received based on the second synchronization signal block indicator.

A value resulted from multiplying the number of synchronization signal block groups capable of being indicated by the first synchronization signal block group indicator by the number of transmission synchronization signal blocks capable of being indicated by the first synchronization signal block indicator corresponds to the number of transmission synchronization signal blocks capable of being indicated by the second synchronization signal block indicator.

To further achieve these and other advantages and in accordance with the purpose of the present invention, according to a different embodiment, a user equipment (UE) receiving a synchronization signal in a wireless communication system includes an RF module configured to transceive a radio signal with a base station, and a processor configured to receive a message including a synchronization signal block group indicator, which indicates one or more synchronization signal block groups containing at least one transmission synchronization signal block, among a plurality of synchronization signal block groups grouping the prescribed number of candidate synchronization block positions of a synchronization signal block consisting of a primary synchronization signal, a secondary synchronization signal, and a physical broadcast channel signal in a manner of being connected with the RF module, the processor configured to receive the at least one transmission synchronization signal block based on the message.

In particular, the message can further include a first synchronization signal block indicator indicating the at least one transmission synchronization signal block included in the one or more synchronization signal block groups.

The message can be received when the UE operates on a frequency band exceeding a specific value.

If the UE operates on a frequency band equal to or less than a specific value, the processor is configured to receive a second synchronization signal block indicator indicating a position at which a transmission synchronization signal block is transmitted on the frequency band equal to or less than the specific value using a bitmap of which each bit corresponds to a candidate synchronization signal block position and receive a synchronization signal block based on the second synchronization signal block indicator.

The synchronization signal block group indicator can indicate the one or more synchronization signal block groups using a bitmap.

To further achieve these and other advantages and in accordance with the purpose of the present invention, according to a further different embodiment, a method of measuring a frequency, which is measured by a user equipment (UE) in a wireless communication system, includes receiving a synchronization signal block indicator indicating at least one candidate synchronization signal block including a transmission synchronization signal block among candidate synchronization signal block positions of a synchronization signal block consisting of a primary synchronization signal, a secondary synchronization signal, and a physical broadcast channel signal, and performing measurement associated with a frequency on which the transmission synchronization signal block is transmitted using a transmission synchronization signal block corresponding to the at least one candidate synchronization signal block.

The synchronization signal block indicator can indicate the at least one candidate synchronization signal block using a bitmap.

To further achieve these and other advantages and in accordance with the purpose of the present invention, according to a further different embodiment, a user equipment (UE) measuring a frequency in a wireless communication system includes an RF module configured to transceive a radio signal with a base station, and a processor configured to receive a synchronization signal block indicator indicating at least one candidate synchronization signal block including a transmission synchronization signal block among candidate synchronization signal block positions of a synchronization signal block consisting of a primary synchronization signal, a secondary synchronization signal, and a physical broadcast channel signal in a manner of being connected with the RF module, the processor configured to perform measurement associated with a frequency on which the transmission synchronization signal block is transmitted using a transmission synchronization signal block corresponding to the at least one candidate synchronization signal block.

The synchronization signal block indicator can indicate the at least one candidate synchronization signal block using a bitmap.

According to the present invention, although the number of synchronization signal candidates is equal to or greater than a prescribed number, it is able to indicate an index of a transmitted synchronization signal using the small number of bits, thereby reducing signaling overhead.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

FIG. 1 is a diagram for structures of control and user planes of radio interface protocol between a 3GPP radio access network standard-based user equipment and E-UTRAN;

FIGS. 14 and 15 are diagrams for explaining embodiments of multiplexing a PSS/SSS/PBCH within a synchronization signal;

DETAILED DESCRIPTION OF THE EMBODIMENTS

Figure 2:
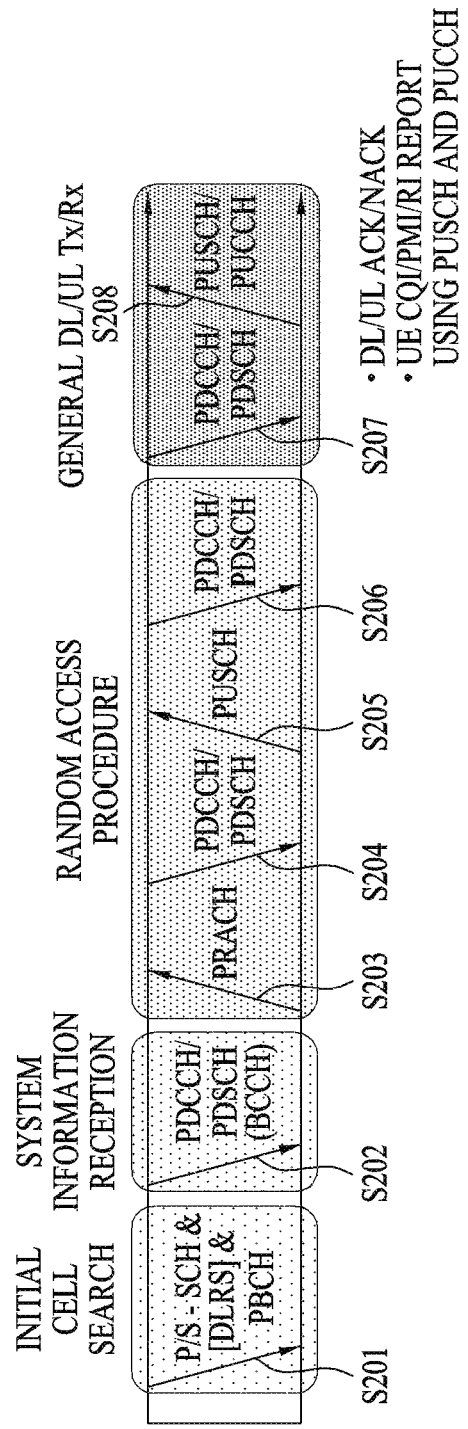
FIG. 2 is a diagram for explaining physical channels used for 3GPP system and a general signal transmission method using the physical channels.

The configuration, operation, and other features of the present disclosure will readily be understood with embodiments of the present disclosure described with reference to the attached drawings. Embodiments of the present disclosure as set forth herein are examples in which the technical features of the present disclosure are applied to a 3rd Generation Partnership Project (3GPP) system.

While embodiments of the present disclosure are described in the context of Long Term Evolution (LTE) and LTE-Advanced (LTE-A) systems, they are purely exemplary. Therefore, the embodiments of the present disclosure are applicable to any other communication system as long as the above definitions are valid for the communication system.

The term 'Base Station (BS)' may be used to cover the meanings of terms including Remote Radio Head (RRH), evolved Node B (eNB or eNode B), Reception Point (RP), relay, etc.

FIG. 1 illustrates control-plane and user-plane protocol stacks in a radio interface protocol architecture conforming to a 3GPP wireless access network standard between a User Equipment (UE) and an Evolved UMTS Terrestrial Radio Access Network (E-UTRAN). The control plane is a path in which the UE and the E-UTRAN transmit control messages to manage calls, and the user plane is a path in which data generated from an application layer, for example, voice data or Internet packet data is transmitted.

A PHYsical (PHY) layer at Layer 1 (L1) provides information transfer service to its higher layer, a Medium Access Control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in Orthogonal Frequency Division Multiple Access (OFDMA) for Downlink (DL) and in Single Carrier Frequency Division Multiple Access (SC-FDMA) for Uplink (UL).

The MAC layer at Layer 2 (L2) provides service to its higher layer, a Radio Link Control (RLC) layer via logical channels. The RLC layer at L2 supports reliable data transmission. RLC functionality may be implemented in a function block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a Broadcast Channel (BCH) carrying system information, a Paging Channel (PCH) carrying a paging message, and a Shared Channel (SCH) carrying user traffic or a control message. DL multicast traffic or control messages or DL broadcast traffic or control messages may be transmitted on a DL SCH or a separately defined DL Multicast Channel (MCH). UL transport channels used to deliver data from a UE to the E-UTRAN include a Random Access Channel (RACH) carrying an initial control message and a UL SCH carrying user traffic or a control message. Logical channels that are defined above transport channels and mapped to the transport channels include a Broadcast Control Channel (BCCH), a Paging Control Channel (PCCH), a Common Control Channel (CCCH), a Multicast Control Channel (MCCH), a Multicast Traffic Channel (MTCH), etc.

FIG. 2 illustrates physical channels and a general method for transmitting signals on the physical channels in the 3GPP system.

Referring to FIG. 2, when a UE is powered on or enters a new cell, the UE performs initial cell search (S201). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During the initial cell search, the UE may monitor a DL channel state by receiving a DownLink Reference Signal (DL RS).

After the initial cell search, the UE may acquire detailed system information by receiving a Physical Downlink Control Channel (PDCCH) and receiving a Physical Downlink Shared Channel (PDSCH) based on information included in the PDCCH (S202).

If the UE initially accesses the eNB or has no radio resources for signal transmission to the eNB, the UE may perform a random access procedure with the eNB (S203 to S206). In the random access procedure, the UE may transmit a predetermined sequence as a preamble on a Physical Random Access Channel (PRACH) (S203 and S205) and may receive a response message to the preamble on a PDCCH and a PDSCH associated with the PDCCH (S204 and S206). In the case of a contention-based RACH, the UE may additionally perform a contention resolution procedure.

After the above procedure, the UE may receive a PDCCH and/or a PDSCH from the eNB (S207) and transmit a Physical Uplink Shared Channel (PUSCH) and/or a Physical Uplink Control Channel (PUCCH) to the eNB (S208), which is a general DL and UL signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL ACKnowledgment/Negative ACKnowledgment (ACK/NACK) signal, a Channel Quality Indicator (CQI), a Precoding Matrix Index (PMI), a Rank Indicator (RI), etc. In the 3GPP LTE system, the UE may transmit control information such as a CQI, a PMI, an RI, etc. on a PUSCH and/or a PUCCH.

Figure 3:
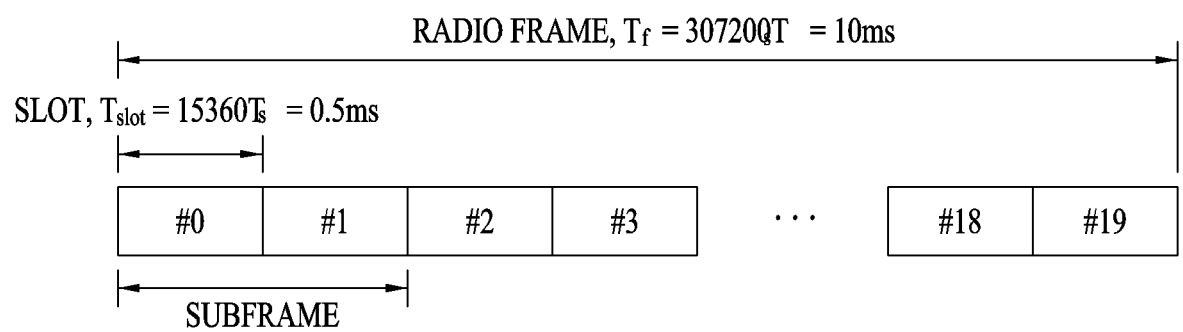
FIG. 3 is a diagram for a structure of a radio frame in LTE system.

FIG. 3 illustrates a structure of a radio frame used in the LTE system.

Referring to FIG. 3, a radio frame is 10 ms (327200×Ts) long and divided into 10 equal-sized subframes. Each subframe is 1 ms long and further divided into two slots. Each time slot is 0.5 ms (15360×Ts) long. Herein, Ts represents a sampling time and $Ts=1/(15 \text{ kHz} \times 2048)=3.2552 \times 10-8$ (about 33 ns). A slot includes a plurality of Orthogonal Frequency Division Multiplexing (OFDM) symbols or SC-FDMA symbols in the time domain by a plurality of Resource Blocks (RBs) in the frequency domain. In the LTE system, one RB includes 12 subcarriers by 7 (or 6) OFDM symbols. A unit time during which data is transmitted is defined as a Transmission Time Interval (TTI). The TTI may be defined in units of one or more subframes. The above-described radio frame structure is purely exemplary and thus the number of subframes in a radio frame, the number of slots in a subframe, or the number of OFDM symbols in a slot may vary.

Figure 4:
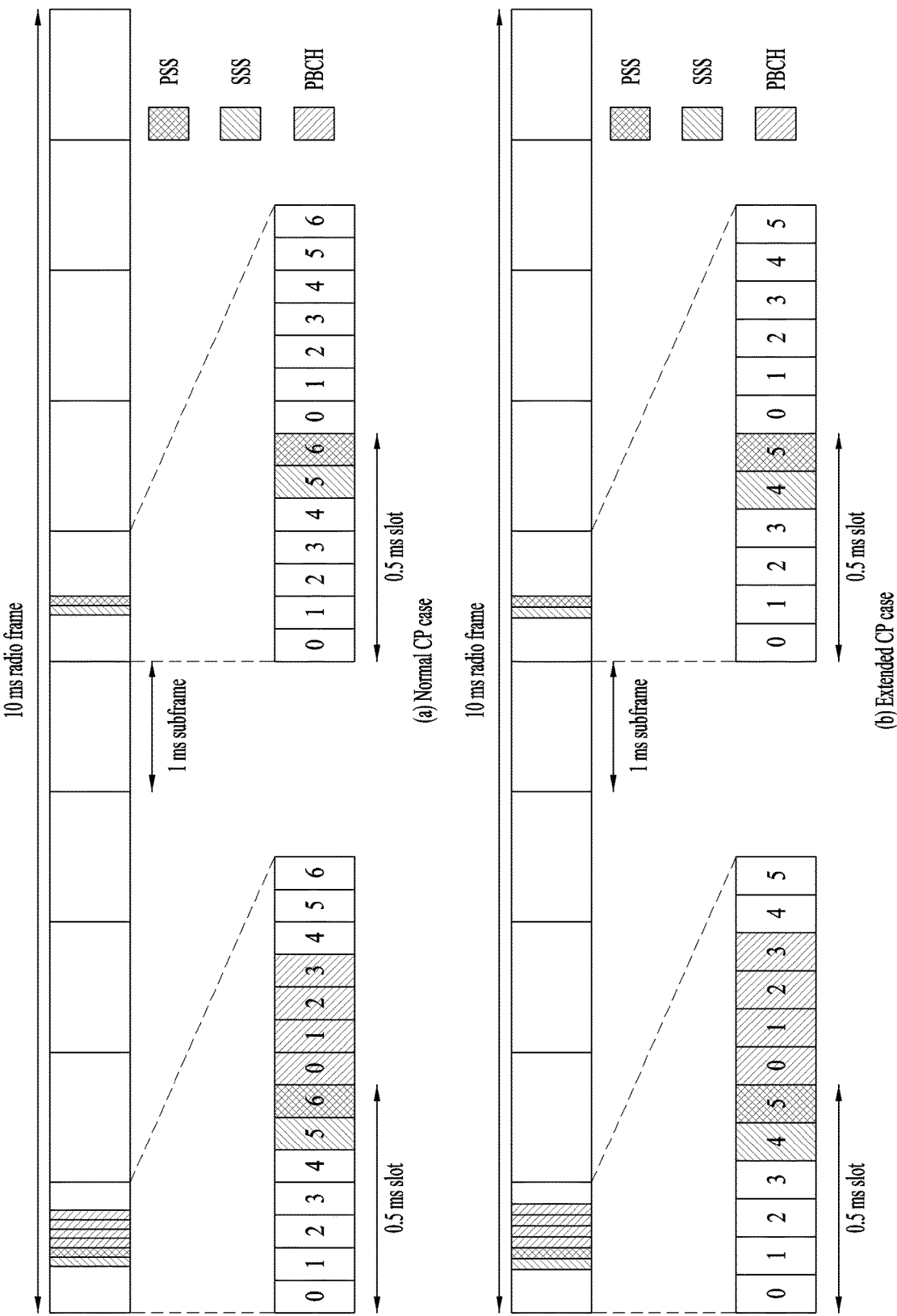
FIG. 4 is a diagram illustrating a radio frame structure for transmitting an SS (synchronization signal) in LTE system.

FIG. 4 is a diagram illustrating a radio frame structure for transmitting an SS (synchronization signal) in LTE system. In particular, FIG. 4 illustrates a radio frame structure for transmitting a synchronization signal and PBCH in FDD (frequency division duplex). FIG. 4 (a) shows positions at which the SS and the PBCH are transmitted in a radio frame configured by a normal CP (cyclic prefix) and FIG. 4 (b) shows positions at which the SS and the PBCH are transmitted in a radio frame configured by an extended CP.

An SS will be described in more detail with reference to FIG. 4. An SS is categorized into a PSS (primary synchronization signal) and an SSS (secondary synchronization signal). The PSS is used to acquire time-domain synchronization such as OFDM symbol synchronization, slot synchronization, etc. and/or frequency-domain synchronization. And, the SSS is used to acquire frame synchronization, a cell group ID, and/or a CP configuration of a cell (i.e. information indicating whether to a normal CP or an extended is used). Referring to FIG. 4, a PSS and an SSS are transmitted through two OFDM symbols in each radio frame. Particularly, the SS is transmitted in first slot in each of subframe 0 and subframe 5 in consideration of a GSM (Global System for Mobile communication) frame length of 4.6 ms for facilitation of inter-radio access technology (inter-RAT) measurement. Especially, the PSS is transmitted in a last OFDM symbol in each of the first slot of subframe 0 and the first slot of subframe 5. And, the SSS is transmitted in a second to last OFDM symbol in each of the first slot of subframe 0 and the first slot of subframe 5. Boundaries of a corresponding radio frame may be detected through the SSS. The PSS is transmitted in the last OFDM symbol of the corresponding slot and the SSS is transmitted in the OFDM symbol immediately before the OFDM symbol in which the PSS is transmitted. According to a transmission diversity scheme for the SS, only a single antenna port is used. However, the transmission diversity scheme for the SS standards is not separately defined in the current standard.

Referring to FIG. 4, by detecting the PSS, a UE may know that a corresponding subframe is one of subframe 0 and subframe 5 since the PSS is transmitted every 5 ms but the UE cannot know whether the subframe is subframe 0 or subframe 5. That is, frame synchronization cannot be obtained only from the PSS. The UE detects the boundaries of the radio frame in a manner of detecting an SSS which is transmitted twice in one radio frame with different sequences.

Having demodulated a DL signal by performing a cell search procedure using the PSS/SSS and determined time and frequency parameters necessary to perform UL signal transmission at an accurate time, a UE can communicate with an eNB only after obtaining system information necessary for a system configuration of the UE from the eNB.

The system information is configured with a master information block (MIB) and system information blocks (SIBs). Each SIB includes a set of functionally related parameters and is categorized into an MIB, SIB Type 1 (SIB1), SIB Type 2 (SIB2), and SIB3 to SIB8 according to the included parameters.

The MIB includes most frequently transmitted parameters which are essential for a UE to initially access a network served by an eNB. The UE may receive the MIB through a broadcast channel (e.g. a PBCH). The MIB includes a downlink system bandwidth (DL BW), a PHICH configuration, and a system frame number (SFN). Thus, the UE can explicitly know information on the DL BW, SFN, and PHICH configuration by receiving the PBCH. On the other hand, the UE may implicitly know information on the number of transmission antenna ports of the eNB. The information on the number of the transmission antennas of the eNB is implicitly signaled by masking (e.g. XOR operation) a sequence corresponding to the number of the transmission antennas to 16-bit CRC (cyclic redundancy check) used in detecting an error of the PBCH.

The SIB1 includes not only information on time-domain scheduling for other SIBs but also parameters necessary to determine whether a specific cell is suitable in cell selection. The UE receives the SIB1 via broadcast signaling or dedicated signaling.

A DL carrier frequency and a corresponding system bandwidth can be obtained by MIB carried by PBCH. A UL carrier frequency and a corresponding system bandwidth can be obtained through system information corresponding to a DL signal. Having received the MIB, if there is no valid system information stored in a corresponding cell, a UE applies a value of a DL BW included in the MIB to a UL bandwidth until system information block type 2 (SystemInformationBlockType2, SIB2) is received. For example, if the UE obtains the SIB2, the UE is able to identify the entire UL system bandwidth capable of being used for UL transmission through UL-carrier frequency and UL-bandwidth information included in the SIB2.

In the frequency domain, PSS/SSS and PBCH are transmitted irrespective of an actual system bandwidth in total 6 RBs, i.e., 3 RBs in the left side and 3 RBs in the right side with reference to a DC subcarrier within a corresponding OFDM symbol. In other words, the PSS/SSS and the PBCH are transmitted only in 72 subcarriers. Therefore, a UE is configured to detect or decode the SS and the PBCH irrespective of a downlink transmission bandwidth configured for the UE.

Having completed the initial cell search, the UE can perform a random access procedure to complete the accessing the eNB. To this end, the UE transmits a preamble via PRACH (physical random access channel) and can receive a response message via PDCCH and PDSCH in response to the preamble. In case of contention based random access, it may transmit additional PRACH and perform a contention resolution procedure such as PDCCH and PDSCH corresponding to the PDCCH.

Having performed the abovementioned procedure, the UE can perform PDCCH/PDSCH reception and PUSCH/PUCCH transmission as a general UL/DL signal transmission procedure.

The random access procedure is also referred to as a random access channel (RACH) procedure. The random access procedure is used for various usages including initial access, UL synchronization adjustment, resource allocation, handover, and the like. The random access procedure is categorized into a contention-based procedure and a dedicated (i.e., non-contention-based) procedure. In general, the contention-based random access procedure is used for performing initial access. On the other hand, the dedicated random access procedure is restrictively used for performing handover, and the like. When the contention-based random access procedure is performed, a UE randomly selects a RACH preamble sequence. Hence, a plurality of UEs can transmit the same RACH preamble sequence at the same time. As a result, a contention resolution procedure is required thereafter. On the contrary, when the dedicated random access procedure is performed, the UE uses an RACH preamble sequence dedicatedly allocated to the UE by an eNB. Hence, the UE can perform the random access procedure without a collision with a different UE.

The contention-based random access procedure includes 4 steps described in the following. Messages transmitted via the 4 steps can be respectively referred to as message (Msg) 1 to 4 in the present invention.

Step 1: RACH preamble (via PRACH) (UE to eNB)
Step 2: Random access response (RAR) (via PDCCH and PDSCH (eNB to)
Step 3: Layer 2/Layer 3 message (via PUSCH) (UE to eNB)
Step 4: Contention resolution message (eNB to UE)

On the other hand, the dedicated random access procedure includes 3 steps described in the following. Messages transmitted via the 3 steps can be respectively referred to as message (Msg) 0 to 2 in the present invention. It may also perform uplink transmission (i.e., step 3) corresponding to PAR as a part of the ransom access procedure. The dedicated random access procedure can be triggered using PDCCH (hereinafter, PDCCH order) which is used for an eNB to indicate transmission of an RACH preamble.

Step 0: RACH preamble assignment via dedicated signaling (eNB to UE)
Step 1: RACH preamble (via PRACH) (UE to eNB)
Step 2: Random access response (RAR) (via PDCCH and PDSCH) (eNB to UE)

After the RACH preamble is transmitted, the UE attempts to receive a random access response (RAR) in a preconfigured time window. Specifically, the UE attempts to detect PDCCH (hereinafter, RA-RNTI PDCCH) (e.g., a CRC masked with RA-RNTI in PDCCH) having RA-RNTI (random access RNTI) in a time window. If the RA-RNTI PDCCH is detected, the UE checks whether or not there is a RAR for the UE in PDSCH corresponding to the RA-RNTI PDCCH. The RAR includes timing advance (TA) information indicating timing offset information for UL synchronization, UL resource allocation information (UL grant information), a temporary UE identifier (e.g., temporary cell-RNTI, TC-RNTI), and the like. The UE can perform UL transmission (e.g., message 3) according to the resource allocation information and the TA value included in the RAR. HARQ is applied to UL transmission corresponding to the RAR. In particular, the UE can receive reception response information (e.g., PHICH) corresponding to the message 3 after the message 3 is transmitted.

A random access preamble (i.e. RACH preamble) consists of a cyclic prefix of a length of TCP and a sequence part of a length of TSEQ. The TCP and the TSEQ depend on a frame structure and a random access configuration. A preamble format is controlled by higher layer. The RACH preamble is transmitted in a UL subframe. Transmission of the random access preamble is restricted to a specific time resource and a frequency resource. The resources are referred to as PRACH resources. In order to match an index 0 with a PRB and a subframe of a lower number in a radio frame, the PRACH resources are numbered in an ascending order of PRBs in subframe numbers in the radio frame and frequency domain. Random access resources are defined according to a PRACH configuration index (refer to 3GPP TS 36.211 standard document). The RACH configuration index is provided by a higher layer signal (transmitted by an eNB).

In LTE/LTE-A system, subcarrier spacing for a random access preamble (i.e., RACH preamble) is regulated by 1.25 kHz and 7.5 kHz for preamble formats 0 to 3 and a preamble format 4, respectively (refer to 3GPP TS 36.211).

Figure 5:
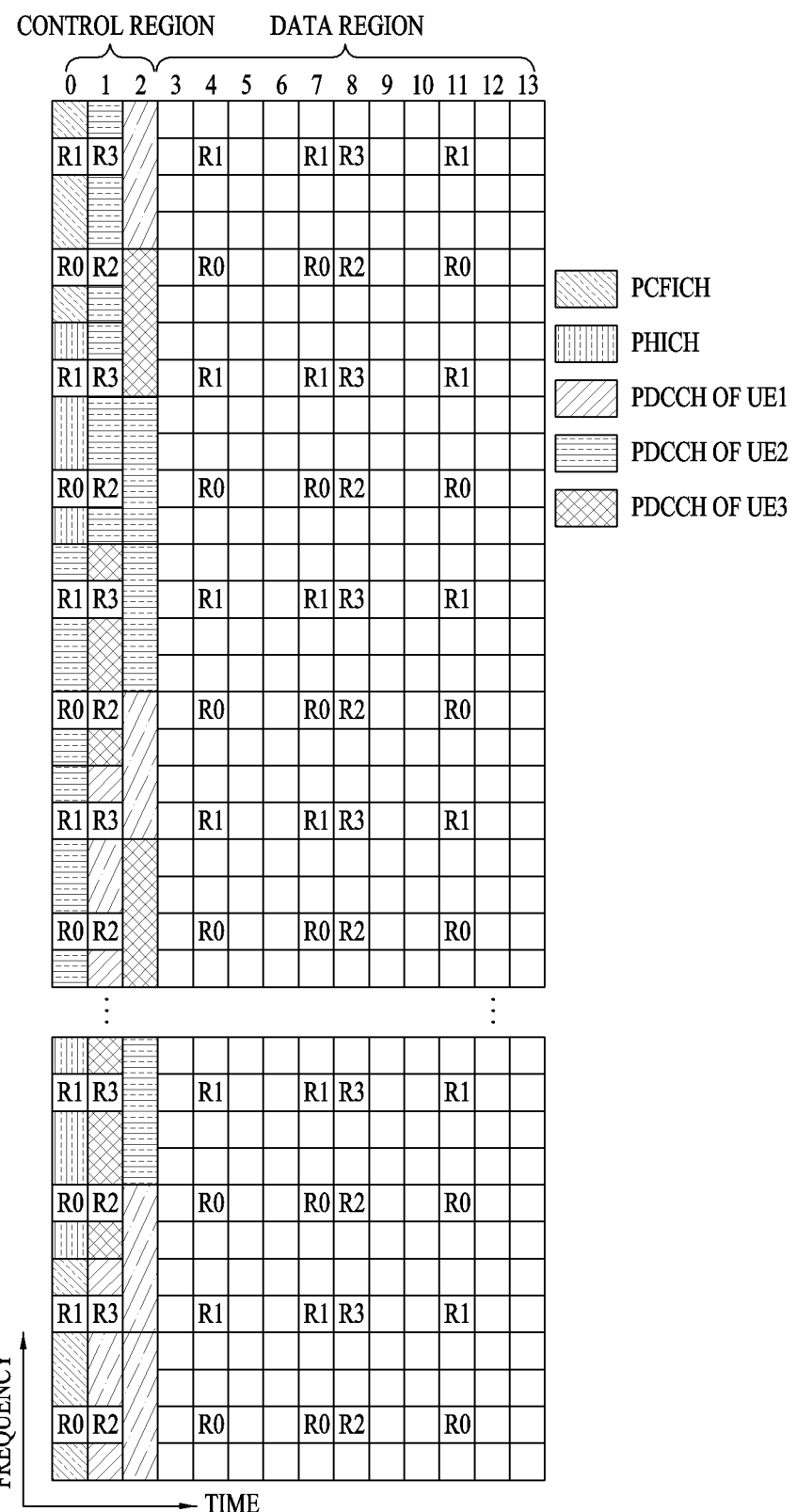
FIG. 5 illustrates a structure of a downlink radio frame in the LTE system.

FIG. 5 illustrates exemplary control channels included in a control region of a subframe in a DL radio frame.

Referring to FIG. 5, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 Resource Element Groups (REGs), each REG being distributed to the control region based on a cell Identity (ID). One REG includes 4 Resource Elements (REs). An RE is a minimum physical resource defined by one subcarrier by one OFDM symbol. The PCFICH is set to 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more CCEs. The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that Cyclic Redundancy Check (CRC) of a specific PDCCH is masked by Radio Network Temporary Identity (RNTI) "A"

and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

Figure 6:
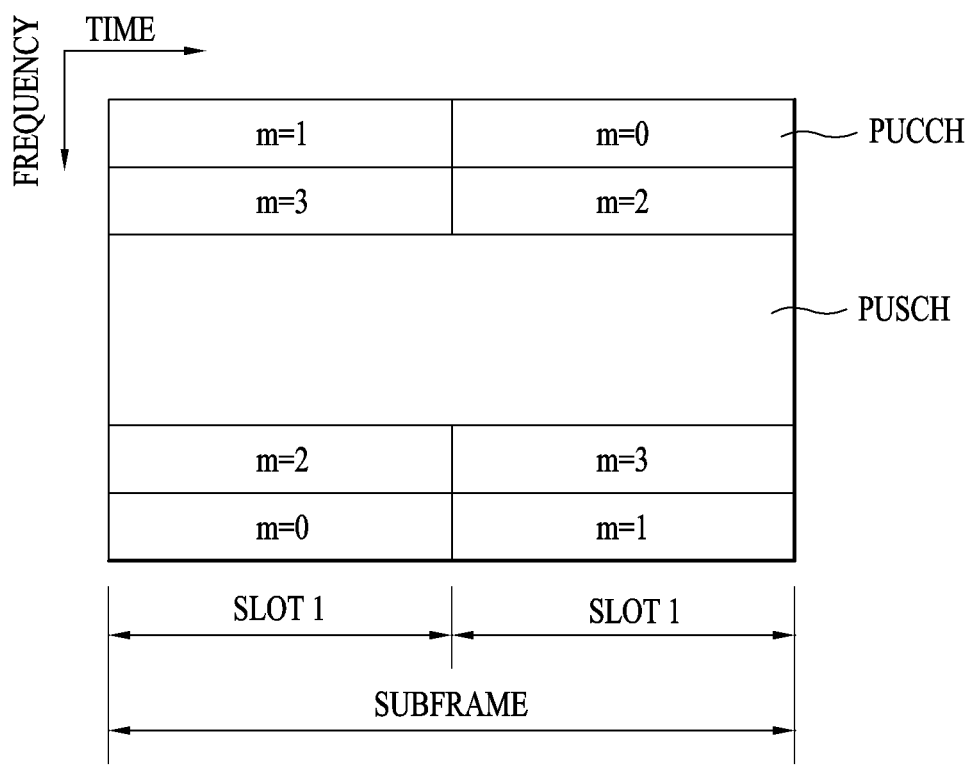
FIG. 6 illustrates a structure of an uplink subframe in the LTE system.

FIG. 6 illustrates a structure of a UL subframe in the LTE system.

Referring to FIG. 6, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for Multiple Input Multiple Output (MIMO), a Scheduling Request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, and m=2 are allocated to a subframe in FIG. 6.

Hereinafter, channel state information (CSI) reporting will be described below. In the current LTE standard, there are two MIMO transmission schemes, open-loop MIMO operating without channel information and closed-loop MIMO operating with channel information. Particularly in the closed-loop MIMO, each of an eNB and a UE may perform beamforming based on CSI to obtain the multiplexing gain of MIMO antennas. To acquire CSI from the UE, the eNB may command the UE to feedback CSI on a downlink signal by allocating a PUCCH (Physical Uplink Control CHannel) or a PUSCH (Physical Uplink Shared CHannel) to the UE.

The CSI is largely classified into three information types, RI (Rank Indicator), PMI (Precoding Matrix), and CQI (Channel Quality Indication). First of all, the RI indicates rank information of a channel as described above, and means the number of streams that may be received by a UE through the same time-frequency resources. Also, since the RI is determined by long-term fading of a channel, the RI may be fed back to an eNB in a longer period than a PMI value and a CQI value.

Second, the PMI is a value obtained by reflecting spatial characteristics of a channel, and indicates a precoding matrix index of an eNB, which is preferred by the UE based on a metric such as signal to interference and noise ratio (SINR). Finally, the CQI is a value indicating channel strength, and generally means a reception SINR that may be obtained by the eNB when the PMI is used.

In the 3GPP LTE-A system, the eNB may configure a plurality of CSI processes for the UE, and may be reported CSI for each of the CSI processes. In this case, the CSI process includes CSI-RS resource for specifying signal quality and CSI-IM (interference measurement) resource, that is, IMR (interference measurement resource) for interference measurement.

Since a wavelength becomes short in the field of Millimeter Wave (mmW), a plurality of antenna elements may be installed in the same area. In more detail, a wavelength is 1 cm in a band of 30 GHz, and a total of 64(8×8) antenna elements of a 2D array may be installed in a panel of 4 by 4 cm at an interval of 0.5 lambda (wavelength). Therefore, a recent trend in the field of mmW attempts to increase coverage or throughput by enhancing BF (beamforming) gain using a plurality of antenna elements.

In this case, if a transceiver unit (TXRU) is provided to control a transmission power and phase per antenna element, independent beamforming may be performed for each frequency resource. However, a problem occurs in that effectiveness is deteriorated in view of cost when TXRU is provided for all of 100 antenna elements. Therefore, a scheme is considered, in which a plurality of antenna elements are mapped into one TXRU and a beam direction is controlled by an analog phase shifter. Since this analog beamforming scheme may make only one beam direction in a full band, a problem occurs in that frequency selective beamforming is not available.

As an intermediate type of digital BF and analog BF, a hybrid BF having B TXRUs smaller than Q antenna elements may be considered. In this case, although there is a difference depending on a connection scheme of B TXRUs and Q antenna elements, the number of beam directions that enable simultaneous transmission is limited to B or less.

Figure 7:
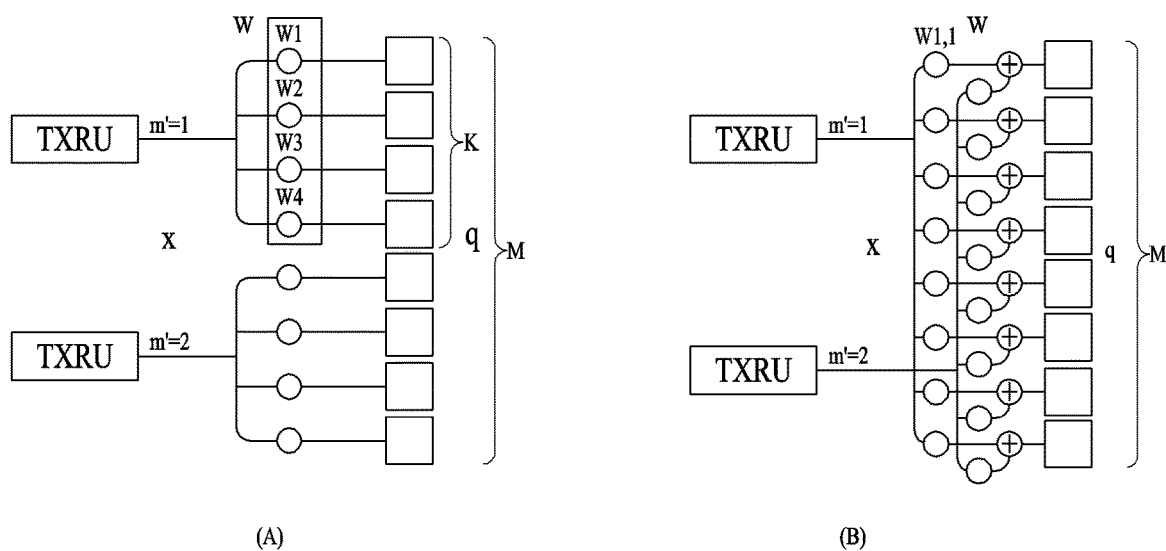
FIG. 7 illustrates examples of a connection scheme between TXRUs and antenna elements.

FIG. 7 illustrates examples of a connection scheme between TXRUs and antenna elements.

FIG. 7 (a) illustrates that TXRU is connected to a sub-array. In this case, the antenna elements are connected to only one TXRU. Unlike FIG. 7 (a), FIG. 7 (b) illustrates that TXRU is connected to all antenna elements. In this case, the antenna elements are connected to all TXRUs. In FIG. 7, W indicates a phase vector multiplied by an analog phase shifter. That is, a direction of analog beamforming is determined by W. In this case, mapping between CSI-RS antenna ports and TXRUs may be 1-to-1 or 1-to-many.

As more communication devices require greater communication capacity, the need of mobile broadband communication more advanced than the conventional RAT (radio access technology) has been issued. Also, massive MTC (Machine Type Communications) technology that provides various services anywhere and at any time by connecting a plurality of devices and things is one of main issues which will be considered in next generation communication. Furthermore, a communication system design considering service/UE susceptible to reliability and latency has been discussed. Considering this status, the introduction of the next generation RAT has been discussed, and the next generation RAT will be referred to as NewRAT in the present invention.

Figure 8:
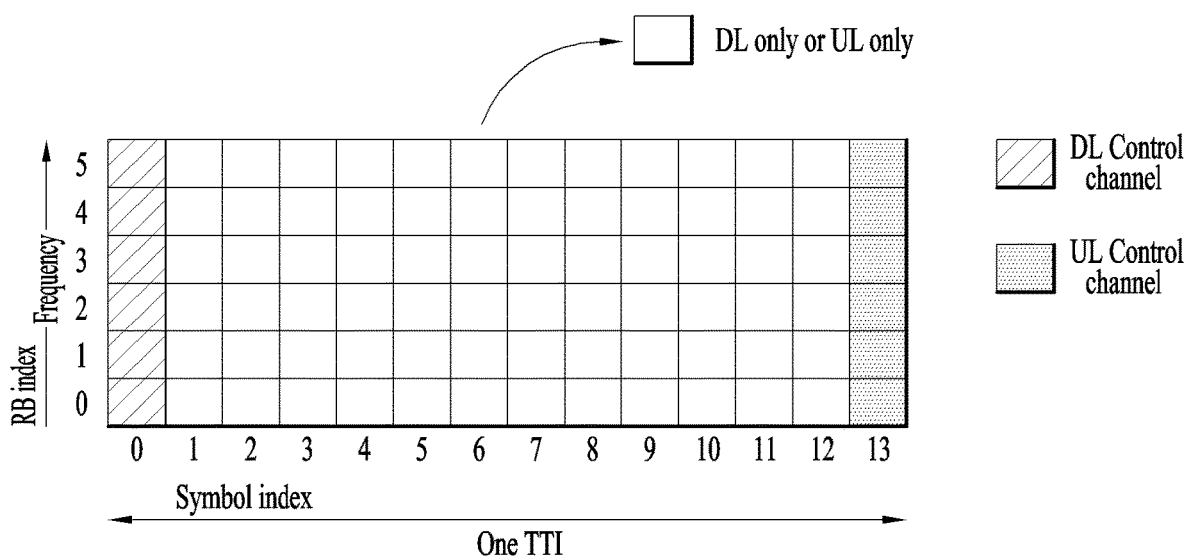
FIG. 8 illustrates an example of a self-contained subframe structure.

A self-contained subframe structure shown in FIG. 8 is considered in the fifth generation NewRAT to minimize data transmission latency in a TDD system. FIG. 8 illustrates an example of a self-contained subframe structure.

In FIG. 8, oblique line areas indicate downlink control regions and black colored areas indicate uplink control regions. Areas having no mark may be used for downlink data transmission or uplink data transmission. In this structure, downlink transmission and uplink transmission are performed in due order within one subframe, whereby downlink data may be transmitted and uplink ACK/NACK may be received within the subframe. As a result, the time required for data re-transmission may be reduced when an error occurs in data transmission, whereby latency of final data transfer may be minimized.

In this self-contained subframe structure, a time gap for switching from a transmission mode to a reception mode or vice versa is required for the base station and the UE. To this end, some OFDM symbols (OS) at the time when a downlink is switched to an uplink in the self-contained subframe structure are set to a guard period.

Examples of the self-contained subframe type that may be configured in the system operating based on the NewRAT may consider four subframe types as follows.

downlink control period+downlink data period+GP+uplink control period
downlink control period+downlink data period
downlink control period+GP+uplink data period+uplink control period
downlink control period+GP+uplink data period In the following, a method of generating a synchronization signal and a method of indicating a synchronization signal index are described according to embodiments of the present invention.

1. Parameter Set and Basic Subcarrier Spacing

A parameter set for an SS block can be defined according to the following.

Subcarrier spacing (bandwidth)
15 kHz (up to 5 MHz), 30 kHz (up to 10 MHz), 120 kHz (up to 40 MHz), 240 kHz (up to 80 MHz).

Since 24 RBs are allocated to transmit PBCH, it is necessary to have a transmission bandwidth of 4.32 MHz for a subcarrier of 15 kHz and a transmission bandwidth of 34.56 MHz for a subcarrier of 120 kHz. And, in a frequency range up to 6 GHz, a minimum available carrier bandwidth for NR is determined by 5 MHz. In a frequency range ranging from 6 GHz to 52.6 GHz, a minimum available carrier bandwidth for NR is determined by 50 MHz.

In particular, as mentioned in the foregoing description, in a frequency range narrower than 6 GHz, subcarrier spacing of 15 kHz is determined as default numerology. In a frequency range wider than 6 GHz, subcarrier spacing of 120 kHz can be determined as default numerology. More specifically, in a frequency range ranging from 6 GHz to 52.6 GHz, subcarrier spacing of 120 kHz can be determined as default numerology. However, it is necessary to delicately approach detection performance of PSS/SSS-based 15 kHz subcarrier in 6 GHz.

And, it may consider the possibility of introducing wider subcarrier spacing (e.g., 30 kHz or 240 kHz subcarrier spacing) for transmitting an NR-SS.

2. Transmission Bandwidth and NR-SS Sequence RE Mapping

Figure 9:
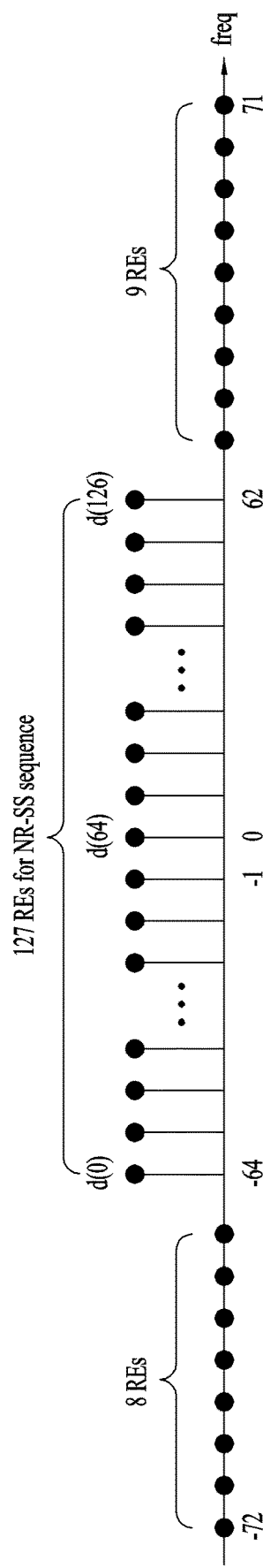
FIG. 9 is a diagram for explaining an embodiment of mapping a synchronization signal sequence to a resource element.

Referring to FIG. 9, similar to a mapping method of a PSS/SSS sequence mapped to an RE in LTE, an NR-SS sequence can be mapped to REs positioned at the center of a transmission bandwidth. A partial RE positioned at an edge of the transmission bandwidth can be reserved as a guard subcarrier. For example, when 12 RBs are used for transmitting an NR-SS, 127 REs are used for an NR-SS sequence and 17 REs are reserved. In this case, a $64^{th}$ element of the NR-SS sequence can be mapped to a subcarrier positioned at the center of the bandwidth on which the NR-SS is transmitted.

Meanwhile, when an NR-SS sequence is mapped to an RE, in case of 15 kHz subcarrier, it may assume that a transmission bandwidth of 2.16 MHz is used for transmitting an NR-SS. If subcarrier spacing increases by an integer multiple, an NR-SS bandwidth identically increases by an integer multiple as well.

In particular, a bandwidth for transmitting an NR-SS can be defined as follows according to subcarrier spacing.

If subcarrier spacing corresponds to 15 kHz, the bandwidth for transmitting the NR-SS may correspond to 2.16 MHz.

If subcarrier spacing corresponds to 30 kHz, the bandwidth for transmitting the NR-SS may correspond to 4.32 MHz.

If subcarrier spacing corresponds to 120 kHz, the bandwidth for transmitting the NR-SS may correspond to 17.28 MHz.

If subcarrier spacing corresponds to 240 kHz, the bandwidth for transmitting the NR-SS may correspond to 34.56 MHz.

3. NR-PSS Sequence Design

In NR system, in order to classify 1000 cell IDs, the number of NR-PSS sequences is defined by 3 and the number of hypothesis of NR-SSS corresponding to each NR-PSS is defined by 334.

When NR-PSS is designed, it is necessary consider timing ambiguity, PAPR, detection complexity, and the like. In order to solve the timing ambiguity, it may be able to generate an NR-PSS sequence using an M-sequence of frequency domain. However, if the NR-PSS sequence is generated using the M-sequence, it may have relatively high PAPR characteristic. Hence, when the NR-PSS is designed, it is necessary to study on a frequency domain M-sequence with a low PAPR characteristic.

Meanwhile, it may consider a modified ZC sequence as an NR-PSS sequence. In particular, if 4 ZC sequences are generated in a manner of being consecutively arranged in time domain, it may be able to solve a timing ambiguity problem, have a low PAPR characteristic, and reduce detection complexity. In particular, in NR system, when a UE intends to detect an NR-PSS having a transmission bandwidth wider than that of multi-sequence and LTE, detection complexity increases. Hence, it is very important to reduce the detection complexity in designing the NR-PSS.

Based on the aforementioned discussion, it may consider two types of NR-PSS sequence.

(1) Frequency M-Sequence with Low PAPR Characteristic

Polynomial expression: $g(x)=x^7+x^6+x^4+x+1$ (initial poly shift register value: 1000000)
Cyclic shift: 0, 31, 78

(2) 4 ZC Sequences Consecutively Arranged in Time Domain

ZC sequence of a length of 31 (root index: {1,30}, {7,24}, {4,27})

Equation for generating a sequence $$d(i) = DFT([s1_{u_1}\ s2_{u_2}\ s3_{u_1}\ s4_{u_2}\ 1]), i = 0 \sim 127 \quad \text{[Equation 1]}$$

where $$s1_{u_1}(n) = \begin{cases} e^{-j\frac{\pi u_1 n(n+1)}{31}}, & n = 0, 1, \ldots, 30 \\ 0, & n = 31 \end{cases}$$

$$s2_{u_2}(n) = s1_{u_2}(n), n = 0, 1, \ldots, 31$$

$$s3_{u_1}(n) = s1_{u_1}(n), n = 0, 1, \ldots, 31$$

$$s4_{u_2}(n) = s1_{u_2}(n), n = 0, 1, \ldots, 31$$

Figure 10:
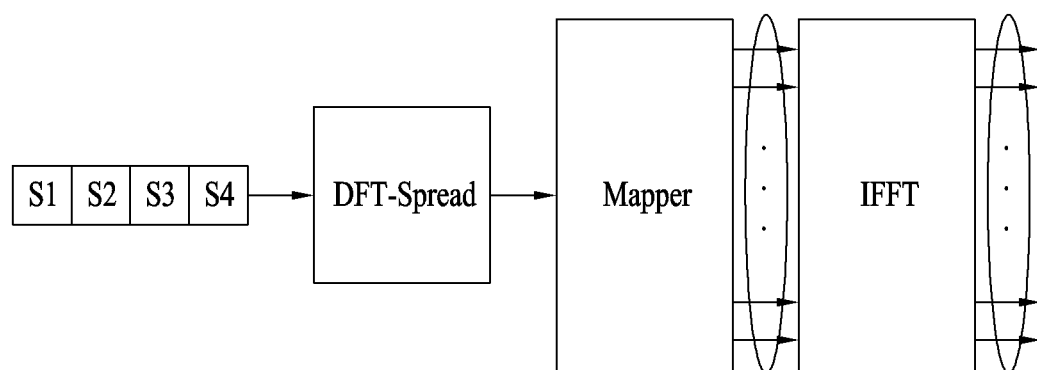
FIG. 10 is a diagram for explaining an embodiment of generating a primary synchronization signal sequence.

FIG. 10 is a diagram for briefly explaining a method of generating an NR-PSS using 4 consecutive ZC sequences in time domain. Referring to FIG. 10, when the N number of sub-symbols correspond to S1, S2, . . . , Sn, if sequences of the sub-symbols are concatenated before IFFT is performed, DFT (Discrete Fourier Transform) spreading is performed with a length of the total sequences, a plurality of sequences respectively corresponding to the N number of sub-symbols are mapped according to a subcarrier, and IFFT is performed, it may be able to obtain a time domain sequence of a length of NIFFT without a problem of out of band emission.

4. NR-SSS Sequence Design

An NR-SSS sequence is generated by a single long sequence and is generated by a combination of 2 M-sequences having a different polynomial expression to generate 334 hypotheses. For example, if a cyclic shift value for a first M-sequence corresponds to 112 and a cyclic shift value for a second M-sequence corresponds 3, it may obtain 336 hypotheses in total. In this case, it may be able to obtain a scrambling sequence for an NR-PSS by applying a third M-sequence.

If an NR-SS burst set of a relatively short period (e.g., 5 ms/10 ms) is configured, the NR-SS burst set can be transmitted several times in two radio frames each of which has a length of 10 ms.

In particular, if a different NR-SSS sequence is introduced for the NR-SS burst set which is transmitted several times, in other word, if a different NR-SSS sequence is used whenever the NR-SS burst set is transmitted, a UE is able to identify each of a plurality of NR-SS burst sets transmitted within a basic period.

For example, if NR-SS bust sets are transmitted 4 times in a basic period, it may consider that an original set of an NR-SSS sequence is applied to a first NR-SSS burst set and an NR-SSS sequence different from the original set is applied to a second, a third, and a fourth NR-SS burst set. If two NR-SSS sequence sets different from each other are used, an NR-SSS sequence set is used for the first and the third NR-SSS burst set and another NR-SSS sequence set can be used for the second and the fourth NR-SSS burst set.

In NR system, two M-sequences each of which has a length of 127 are defined for an NR-SSS sequence and a final sequence is generated by multiplying elements included in each of the M-sequences.

In particular, the NR-SSS sequence may correspond to a scrambling sequence given by an NR-SSS, the NR-SSS sequence may have a length of 127, and the NR-SSS sequence can be determined by an equation 2 described in the following.

$$d(n)=s_{1,m}(n)s_{2,k}(n)c_z(n) \text{ for } n=0,\ldots,126 \text{ and } z=0,1 \quad \text{[Equation 2]}$$

In this case, z=0 can be used for an NR-SSS transmitted in a first SS burst set of two radio frames each of which has a length of 10 ms. And, z=1 can be used for an NR-SSS transmitted in a second, a third, and a fourth SS burst set.

In this case, $s_{1,m}(n)$ and $s_{2,k}(n)$ can be determined by an equation 3 described in the following.

$$s_{1,m}(n)=S_1((n+m) \bmod 127),$$

$$s_{2,k}(n)=S_2((n+k) \bmod 127) \quad \text{[Equation 3]}$$

In this case, it may define m=$N_{ID1}$ mod 112, K=floor($N_{ID1}$/112), k=$CS_2$(K), 0≤$N_{ID1}$≤333, $CS_2$∈{48, 67,122}.

Lastly, in order to calculate S1 and S2, $S_r(i)=1-2x(i)$, 0≤i≤126, r=1,2 can be defined. In this case, a polynomial expression for x(i) can be defined by an equation 4 described in the following.

$$x(j+7)=(x(j+3)+x(j)) \bmod 2, r=1$$

$$x(j+7)=(x(j+3)+x(j+2)+x(j+1)+x(j)) \bmod 2, r=2 \quad \text{[Equation 4]}$$

In this case, an initial condition for the x(i) may correspond to
x(0)=x(1)=x(2)=x(3)=x(4)=x(5)=0, x(6)=1 and may have a value satisfying 0≤j≤119.

In this case, as a preamble and a mid-amble of an SSS, it may be able to use two scrambling sequences including $C_0(n)$ and $C_1(n)$. The two scrambling sequences depend on a PSS. As shown in an equation 5 in the following, the scrambling sequences can be defined by applying a different cyclic shift to C(n) corresponding to an M-sequence.

$$c_z(n)=C((n+p) \bmod 127) \quad \text{[Equation 5]}$$

where, p=$CS_1(N_{ID2}+3 \cdot z)$, $CS_1 \in \{23, 69, 103, 64, 124, 24\}$, $N_{ID2} \in \{0,1,2\}$ In this case, C(i)=1-2x(i) and 0≤I≤126 can be defined. In this case, a polynomial expression for the x(i) can be defined by an equation 6 described in the following.

$$x(j+7)=(x(j+5)+x(j+4)+x(j+3)+x(j+2)+x(j+1)+x(j)) \bmod 2 \quad \text{[Equation 6]}$$

In this case, an initial condition for the x(i) may correspond to x(0)=x(1)=x(2)=x(3)=x(4)=x(5)=0, x(6)=1 and may have a value satisfying 0≤j≤119.

In the following, performance measurement results according to the aforementioned embodiments are described. In order to measure performance of an NR-PSS, 3 methods of designing the NR-SSS are considered: 1) frequency domain M-sequence (legacy PSS sequence), 2) M-sequence with low PAPR, and 3) sequence generated by concatenating 4 ZC sequences in time domain.

And, in order to measure an NR-SSS, an NR-SSS sequence proposed by the present invention is used.

5. Measurement Result According to the Aforementioned NR-PSS Sequence Design

PAPR and CM

Measurement results of PAPR and CM measured for the 3 types of NR-PSS sequence are shown in Table 1 in the following.

TABLE 1

|  | PAPR [dB] | CM [dB] |
| --- | --- | --- |
| Frequency domain M-sequence (WA) | 4.87, 5.10, 5.74 | 1.25, 1.76, 2.19 |
| M-sequence with low PAPR | 4.16, 3.99, 4.15 | 1.10, 1.42, 1.50 |
| Four ZC sequences concatenation in time | 2.80, 3.49, 3.91 | 0.094, 0.71, 0.79 |

According to the results, PAPR/CM of an NR-SSS based on a sequence of which 4 ZC sequences are concatenated in time domain is lower than PAPR/CM of an NR-PSS based on an M-sequence. Meanwhile, when an M-sequence with low PAPR is compared with a frequency domain M-sequence, PAPR/CM of the M-sequence with low PAPR is lower than PAPR/CM of the frequency domain M-sequence. Meanwhile, since the PAPR/CM corresponds to an important element for determining a price of a power amplifier, it is necessary to consider designing an NR-PSS of which the PAPR/CM is low.

Consequently, in the aspect of the PAPR/CM, an NR-PSS based on a ZC sequence shows a better performance measurement result compared to an NR-PSS based on an M-sequence. An NR-PSS based on an M-sequence with low PAPR shows a better performance measurement result compared to an NR-PSS of a frequency domain M-sequence.

Misdetection Rate

Figure 11:
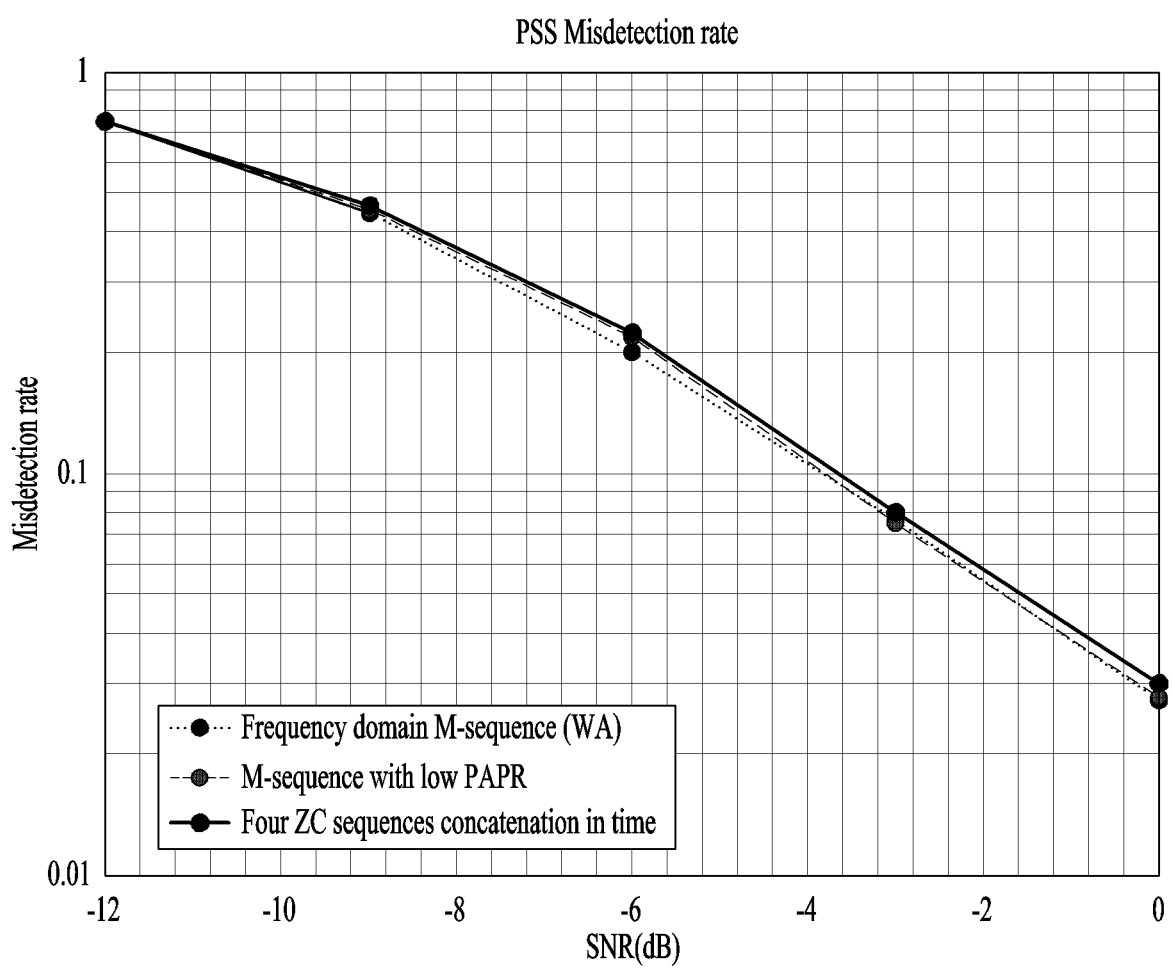
FIGS. 11 to 13 are diagrams for explaining a measurement result of detection performance and PAPR (peak to average power ratio) performance when a synchronization signal is transmitted according to an embodiment of the present invention.

FIG. 11 illustrates evaluation for a misdetection rate of each of the aforementioned NR-PSSs. Referring to FIG. 11, it is able to know that performance of each of NR-PSS designs has a similar level. On the other hand, referring to FIG. 12, it is able to see that a sequence generated by concatenating 4 ZC sequences has a lowest detection complexity.

Figure 12:
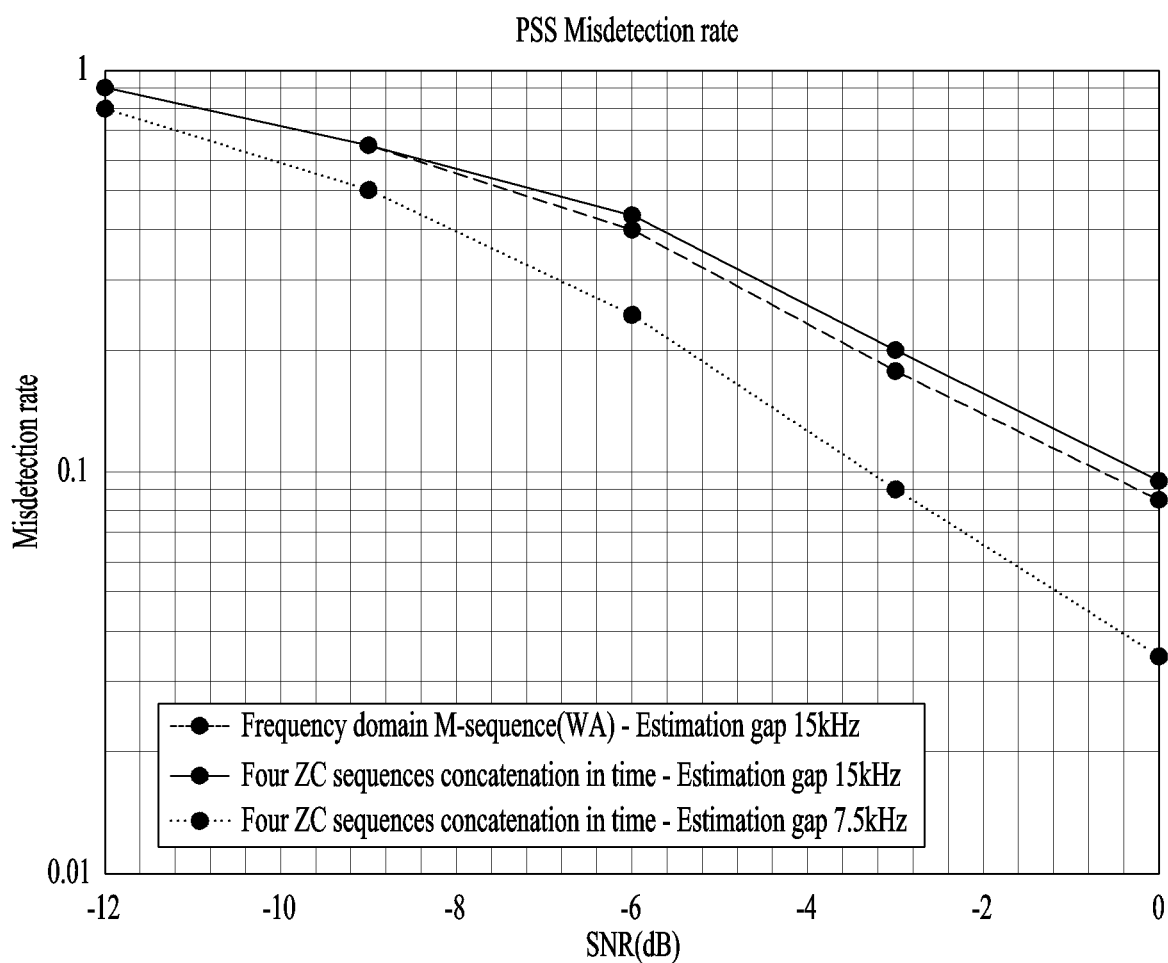

Specifically, referring to FIG. 12, it is able to see that a sequence generated by concatenating 4 ZC sequences and a frequency domain sequence have similar detection performance. In this case, the sequence generated by concatenating 4 ZC sequences has a merit in that detection complexity is lower. If it is assumed that the NR-PSS sequence has similar detection complexity, the sequence generated by concatenating 4 ZC sequences provides superior performance compared to the M-sequence.

Consequently, NR-PSS design detection performance based on a ZC sequence provides better performance compared to detection performance of the frequency domain M-sequence under the assumption of the same detection complexity.

6. Measurement Result According to the Aforementioned NR-SSS Sequence Design

In the following, detection performances are compared with each other according to the number of NR-SSS sequences. In order to measure performance, a legacy SSS sequence is compared with an NR-SSS proposed in the present invention.

Information on NR-SSS sequence design is briefly explained in the following.

1) NR-SSS of a single set (334 hypotheses per NR-PSS sequence)

2) NR-SSS of two sets (668 hypotheses per NR-PSS sequence)

Figure 13:
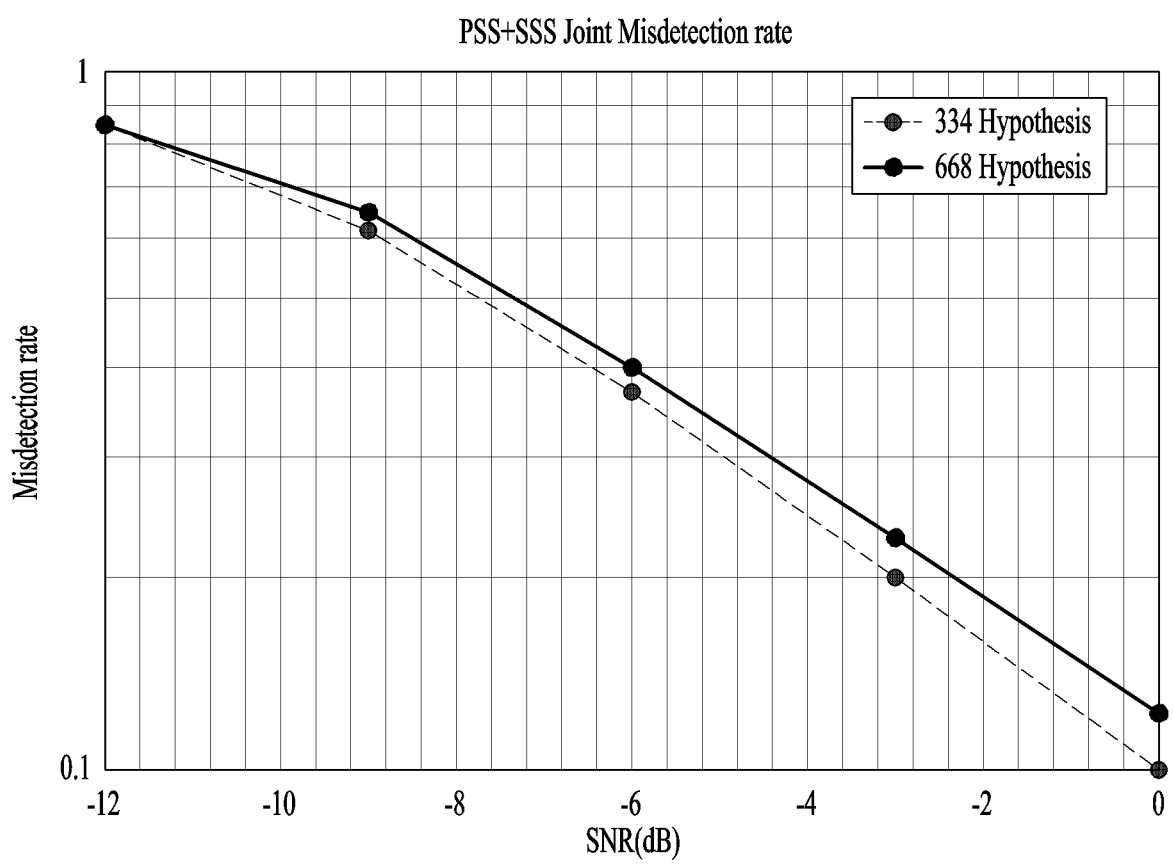

Referring to FIG. 13, although the hypotheses of NR-SSS are doubled, no special performance degrade is examined. Hence, in order to detect a boundary of an SS bust set within a basic period, it may consider introducing an additional set of an NR-SSS.

Meanwhile, parameters used for a measurement experiment according to FIGS. 11 to 13 are shown in Table 2 in the following.

TABLE 2

| Parameter | Value |
| --- | --- |
| Carrier Frequency | 4 GHz |
| Channel Model | CDL_C (delay scaling values: 100 ns) |
| Subcarrier Spacing | 15 kHz |
| Antenna Configuration | TRP: (1, 1, 2) with Omni-directional antenna element<br>UE: (1, 1, 2) with Omni-directional antenna element |
| Timing offset | Uniformly distributed in [−1 ms, 1 ms] |
| Frequency Offset | 5 ppm |
| PSS/SSS detection | One shot detection |
| PSS/SSS period | 20 ms |
| Subframe duration | 1 ms |
| OFDM symbols in SF | 14 |
| Number of interfering TRPs | 2 |
| Operating SNR | −6 dB |

7. SS Block Configuration

Figure 14:
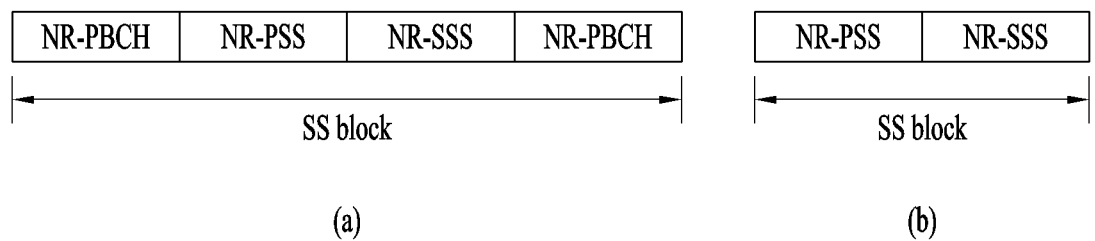

When the maximum payload size of PBCH corresponds to 80 bits, it may be able to use 4 OFDM symbols in total to transmit an SS block. Meanwhile, it is necessary to consider a time position of NR-PSS/NR-SSS/NR-PBCH in an SS block including the NR-PSS, the NR-SSS, and the NR-PBCH. When initial access is performed, the NR-PBCH can be used as a reference signal for precise time/frequency tracking. In order to increase estimation accuracy, two OFDM symbols for the NR-PBCH can be positioned at a distance as far as possible. In particular, as shown in FIG. 14 (a), the present invention proposes to use a first and a fourth OFDM symbol of an SS block to transmit the NR-PBCH. Hence, a second OFDM symbol is allocated to the NR-SSS and a third OFDM symbol can be used for the NR-SSS.

Meanwhile, when the NR-SSS is transmitted to measure or discover a cell, it is not necessary to transmit both the NR-PBCH and an SS block time index indication. In this case, as shown in FIG. 14 (b), an SS block includes two OFDM symbols. A first OFDM symbol is allocated to the NR-SSS and a second OFDM symbol is allocated to the NR-SSS.

Referring to FIG. 15 (a), NR-PBCH is allocated within 288 REs and the REs are configured by 24 RBs. Meanwhile, since a length of NR-PSS/NR-SSS corresponds to 127, 12 RBs are necessary for transmitting NR-PSS/NR-SSS. In particular, when an SS block is configured, the SS block is allocated within 24 RBs. And, it is preferable to allocate the SS block within 24 RBs to align an RB grid between numerologies different from each other (e.g., 15 kHz, 30 kHz, 60 kHz, etc.). And, since a minimum bandwidth of 5 MHz capable of defining 25 RBs with 15 MHz subcarrier spacing is assumed in the NR system, 24 RBs are used to transmit an SS block. The NR-PSS/SSS is positioned at the center of the SS block. This may indicate that the NR-PSS/SSS is allocated to $7^{th}$ to $18^{th}$ RBs.

Meanwhile, if an SS block is configured as shown in FIG. 15 (a), a problem may occur at an AGC (automatic gain control) operation of a UE in 120 kHz subcarrier spacing and 240 kHz subcarrier spacing. In particular, in case of the 120 kHz subcarrier spacing and the 240 kHz subcarrier spacing, it may fail to properly perform detection of NR-SSS due to the AGC operation. Hence, as described in the following two embodiments, it may consider changing a configuration of an SS block.

(Method 1) PBCH-PSS-PBCH-SSS
(Method 2) PBCH-PSS-PBCH-SSS-PBCH

In particular, if a PBCH symbol is positioned at a starting point of an SS block and the PBCH symbol is used as a dummy symbol for an AGC operation, it may be able to make the AGC operation of a UE to be more smoothly performed.

Meanwhile, NR-PSS/NR-SSS/NR-PBCH can be allocated as shown in FIG. 15 (b). In particular, the NR-PSS is allocated to a $0^{th}$ symbol and the NR-SSS can be allocated to a $2^{nd}$ symbol. And, the NR-PBCH can be allocated to a $1^{st}$ to a $3^{rd}$ symbol. In this case, the NR-PBCH can be dedicatedly allocated to the $1^{st}$ and the $3^{rd}$ symbol. In other word, the NR-PBCH is allocated to the $1^{st}$ symbol and the $3^{rd}$ symbol only and the NR-SSS and the NR-PBCH can be mapped to the $2^{nd}$ symbol together.

8. SS Burst Configuration

A method of determining an OFDM symbol in which an SS block is transmittable is described in the present invention. A CP type is semi-statically configured together with UE-specific signaling. An NR-PSS/SSS can support a normal CP. By doing so, it may be able to solve a CP detection problem at the time of performing initial access.

However, in NR system, an extended CP can be included in every edge of 0.5 ms. In particular, when an SS block is positioned within a slot or between slots, a center of the SS block can be positioned at an edge of 0.5 ms. In this case, a CP of a different length can be applied to NR-PSS and/or NR-SSS in the SS block. In this case, if a UE performs NR-SS detection under the assumption that a normal CP is applied to the NR-SSS and/or the NR-SSS, detection performance can be deteriorated. Hence, it is necessary to design an SS block not to exceed 0.5 ms edge in the NR system.

Figure 16:
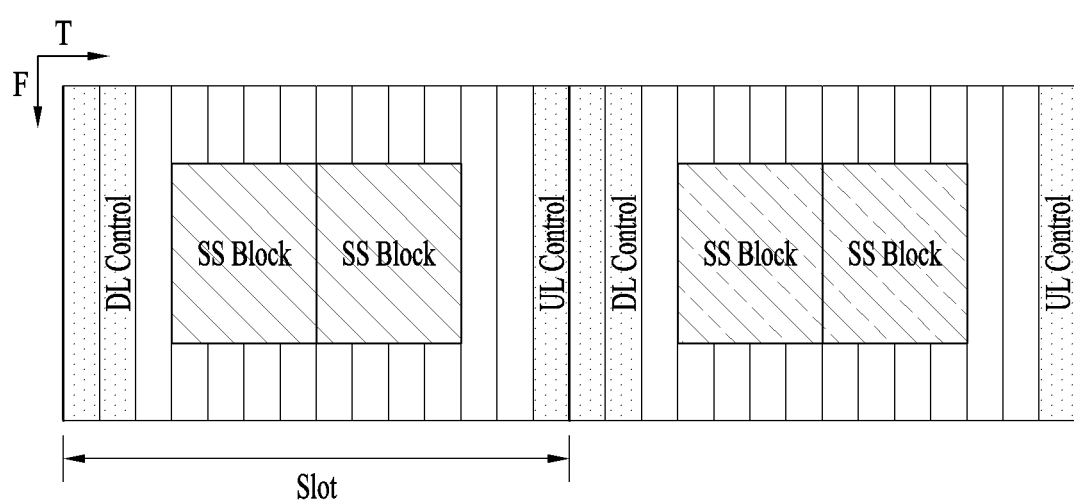
FIGS. 16 to 22 are diagrams for explaining a method of configuring a synchronization signal burst and a synchronization signal burst set.

FIG. 16 illustrates an example of configuring an SS burst in a TDD case. In NR system, a DL control channel is positioned at a first OFDM symbol in a slot and/or a mini slot and a UL control channel can be positioned at a lastly transmitted UL symbol. In order to avoid a collision between an SS block positioned in a slot and the DL/UL control channel, the SS block can be positioned at the center of the slot.

The maximum number of SS blocks included in an SS burst set is determined according to a frequency range. And, a candidate value of the number of SS blocks is determined according to a frequency range. Meanwhile, the present invention proposes a total time spacing necessary for transmitting an SS block in an SS burst set based on the example of configuring the SS burst show in FIG. 16.

TABLE 3

| Subcarrier Spacing | The maximum number of SS block | | | | | |
| --- | --- | --- | --- | --- | --- | --- |
|  | 1 | 2 | 4 | 8 | 32 | 64 |
| 15 kHz | 1 ms | 1 ms | 2 ms | 4 ms | — | — |
| 30 kHz | — | 0.5 ms | 1 ms | 2 ms | — | — |
| 120 kHz | — | — | — | — | 2 ms | 4 ms |
| 240 kHz | — | — | — | — | 1 ms | 2 ms |

As shown in Table 3, if subcarrier spacing of 30 kHz and 240 kHz are introduced to transmit NR-SS, it may be able to anticipate that an SS block is to be transmitted within maximum 2 ms. However, since basic subcarrier spacing for NR-SS transmission corresponds to 15 KHz and 120 kHz, it is necessary to determine whether to introduce a wider minimum system bandwidth (e.g., 10 MHz for 20 kHz subcarrier spacing and 80 MHz for 240 kHz subcarrier spacing) to introduce 30 kHz and 240 kHz subcarrier spacing. If it is determined that the NR supports 5 MHz in a band equal to or narrower than 6 GHz and supports a minimum system bandwidth of 50 MHz in a band of 6 GHz, it is necessary to design an SS burst set according to 15 kHz and 120 kHz subcarrier spacing. If the maximum number of SS blocks corresponds to 8 in a band equal to or narrower than 6 GHz and 64 in a band wider than 6 GHz, since time necessary for transmitting an SS block corresponds to 4 ms, system overhead is considerably high. And, since it is preferable to have short time spacing in transmitting an SS block in terms of network energy saving and UE measurement, it is necessary to define a candidate position for transmitting an SS block within duration of N ms (e.g., N=0.5, 1, 2).

9. SS Burst Set Configuration

Figure 17:
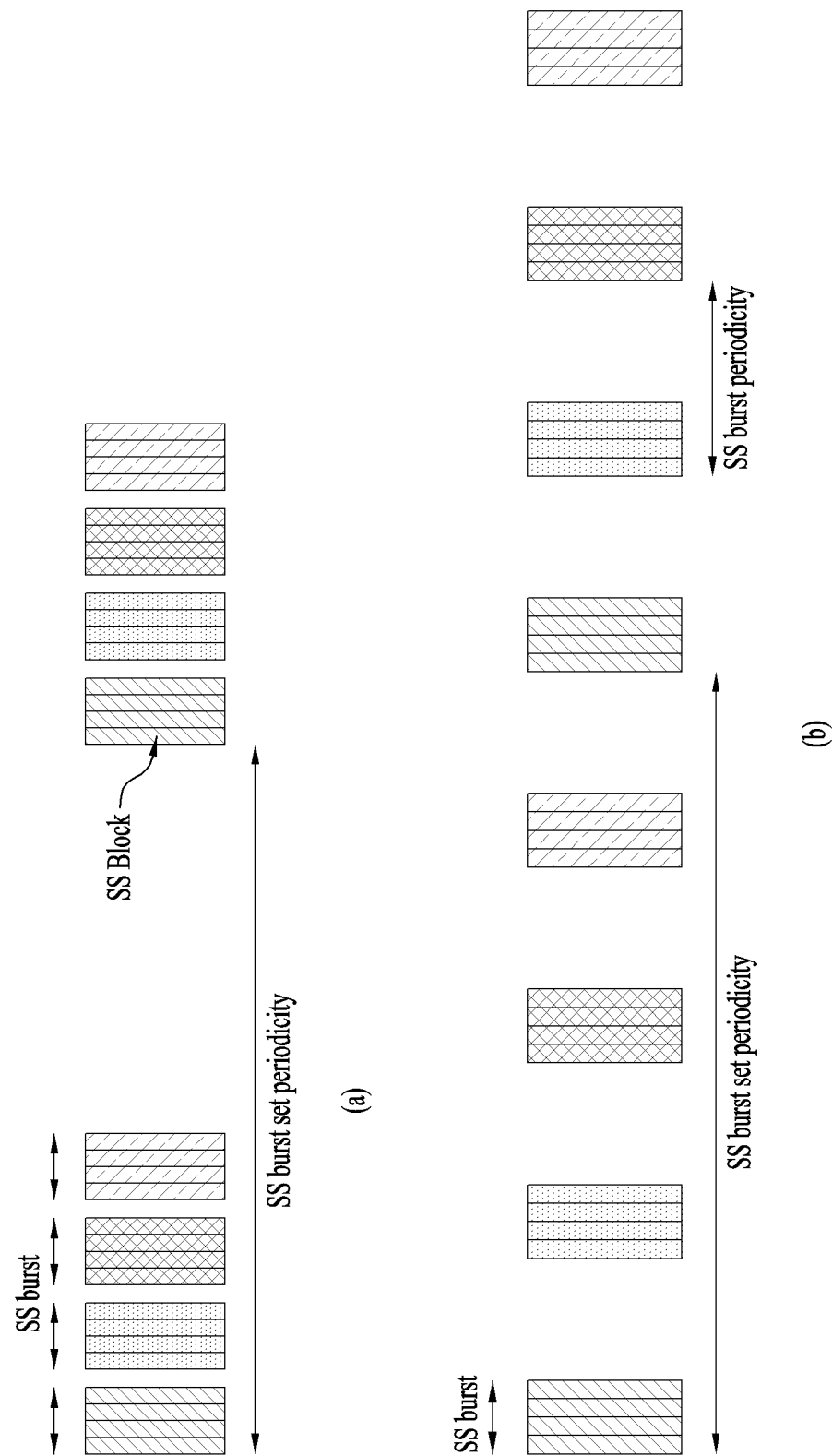

When an SS burst set is configured, as shown in FIG. 17, it may consider two types according to an SS burst periodicity. One is a local type shown in FIG. 17 (a). According to the local type, all SS blocks are continuously transmitted within an SS burst set. On the other hand, another one is a distribution type shown in FIG. 17 (b). According to the distribution type, an SS burst is periodically transmitted within an SS burst set periodicity.

In the aspect of energy saving for an idle UE and efficiency for measuring inter-frequency, an SS burst of the local type provides an advantage compared to an SS burst of the distribution type. Hence, it is more preferable to support the SS burst of the local type.

Meanwhile, as shown in FIG. 17 (a), if an SS burst set is configured by the local type, it is unable to transmit an uplink signal during a symbol period to which the SS burst set is mapped. In particular, as subcarrier spacing to which an SS block is assigned is getting bigger, a size of a symbol is getting smaller. In particular, the number of symbol periods in which an uplink signal is not transmitted increases. If subcarrier spacing to which an SS block is assigned is equal to or greater than a certain size, it is necessary to empty a symbol out between SS bursts with a prescribed space to perform uplink transmission.

Figure 18:
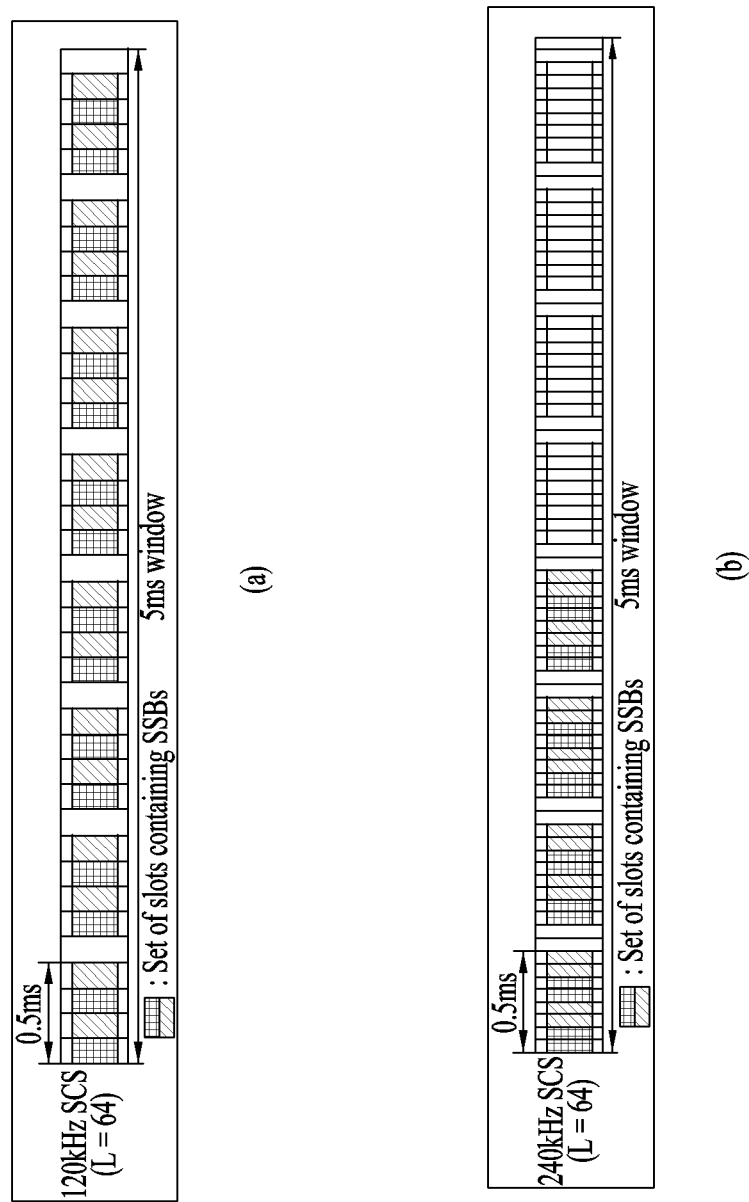

FIG. 18 illustrates an SS burst set configuration when subcarrier spacing to which an SS block is assigned corresponds to 120 kHz and 240 kHz. Referring to FIG. 18, when subcarrier spacing corresponds to 120 kHz and 240 kHz, an SS burst is configured in a unit of 4 SS bursts while a prescribed space is emptied out. In particular, an SS block is arranged in a unit of 0.5 ms while a symbol period (0.125 ms) for performing uplink transmission is emptied out.

In a frequency range equal to wider than 6 GHz, subcarrier spacing of 60 kHz can be used for transmitting data. In particular, as shown in FIG. 19, in NR system, subcarrier spacing (e.g., 60 kHz) for transmitting data and subcarrier spacing (e.g., 120 kHz or 240 kHz) for transmitting an SS block can be multiplexed.

Figure 19:
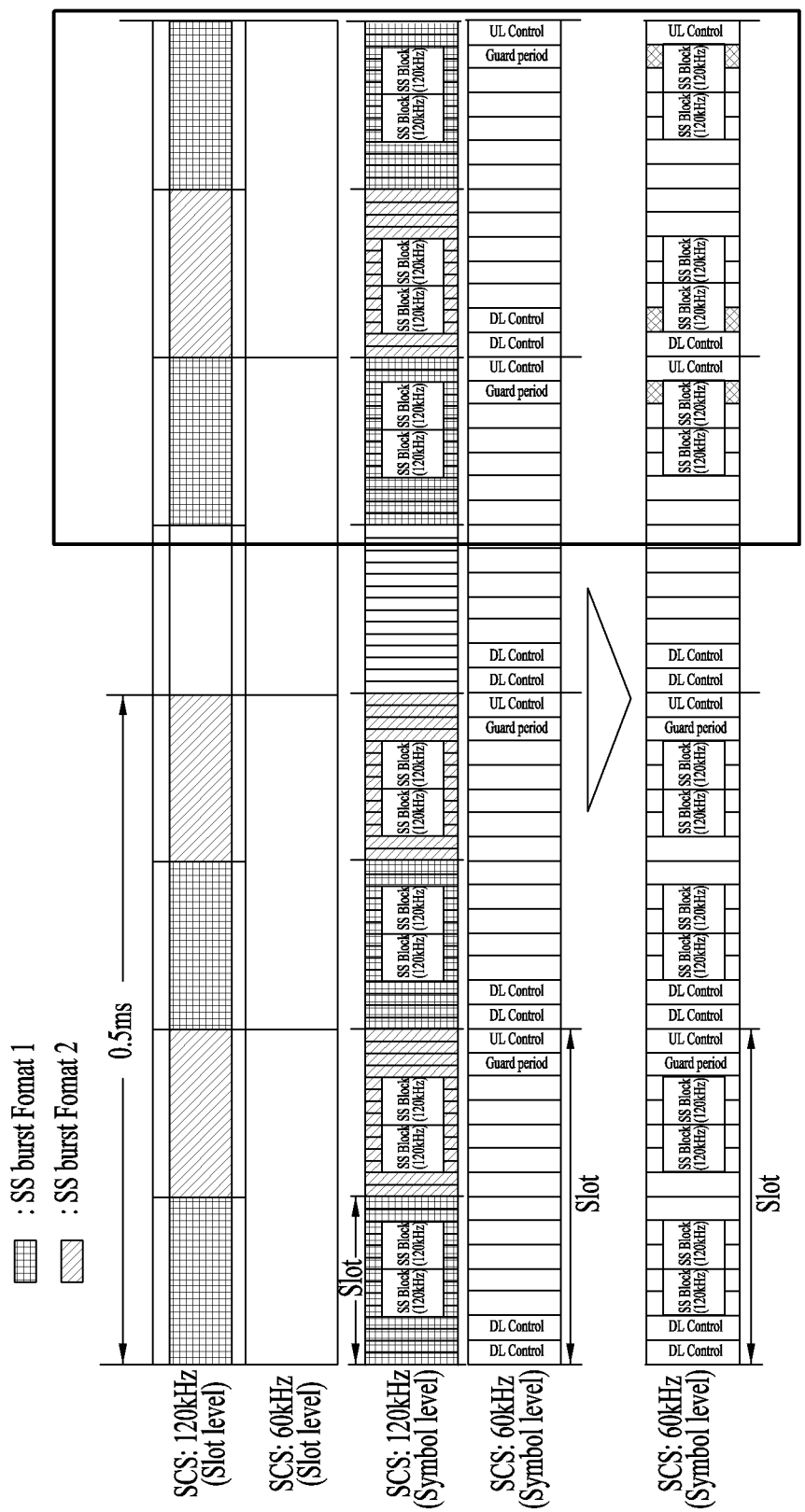

Meanwhile, referring to a part represented by a box in FIG. 19, when an SS block of 120 kHz subcarrier spacing and data of 60 kHz subcarrier spacing are multiplexed, it is able to see that a collision or overlap occurs at the SS block of 120 kHz subcarrier spacing, a GP of 60 kHz subcarrier spacing, and a DL control region. Since it is preferable to avoid a collision between an SS block and a DL/UL control region, it is required to modify a configuration of an SS burst and an SS burst set.

In order to modify a configuration of an SS burst, the preset invention proposes two embodiments.

Figure 20:
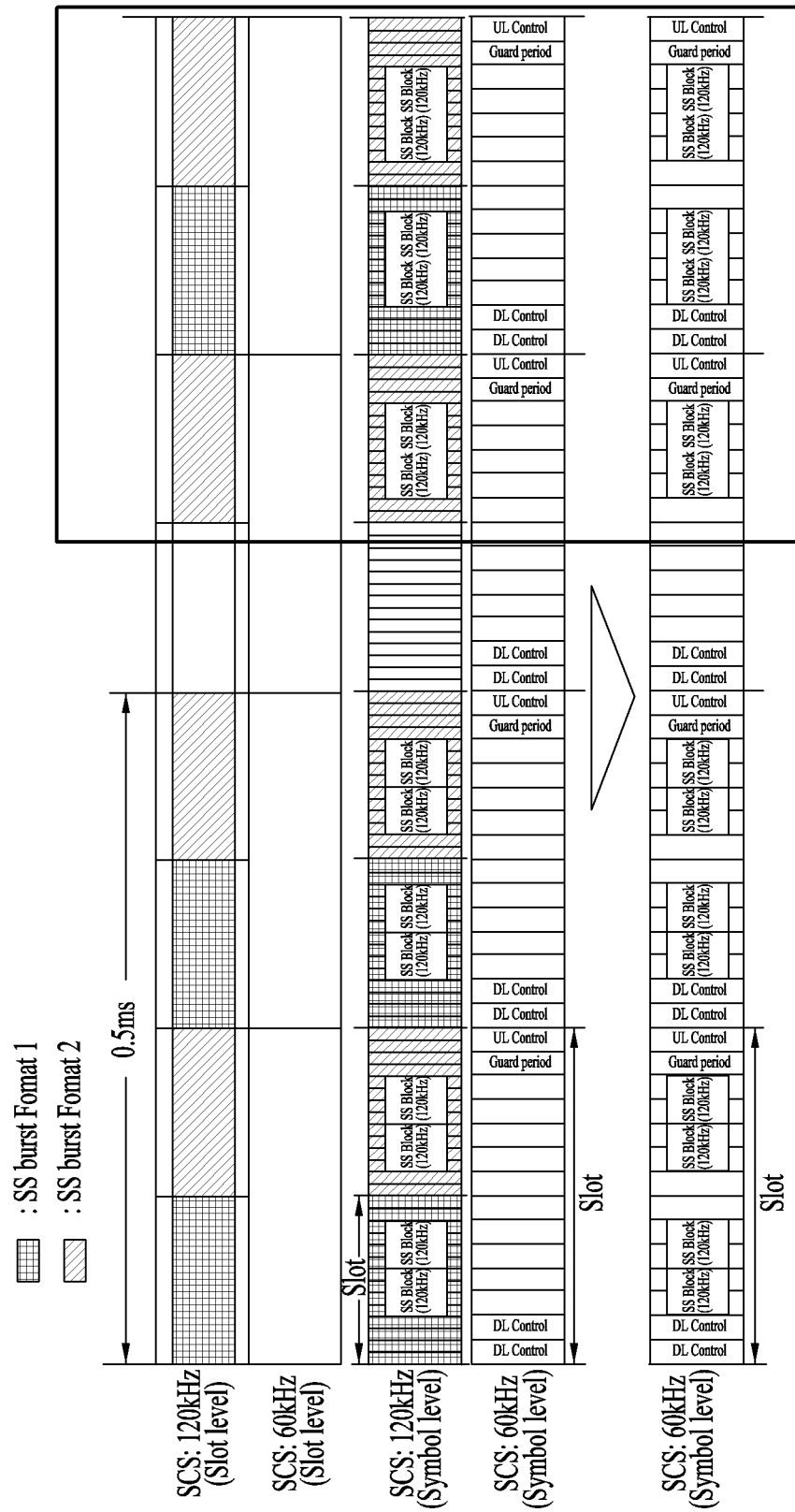

As shown in FIG. 20, a first embodiment is to change a position of an SS burst format 1 and a position of an SS burst format 2. In particular, if the SS burst format 1 and the SS burst format 2 positioned in the box of FIG. 20 are exchanged, it may be able to make a collision not to be occurred between an SS block and a DL/UL control region. In other word, the SS burst format 1 is positioned at the forepart of 60 kHz subcarrier spacing and the SS burst format 2 is positioned at the latter part of 60 kHz subcarrier spacing.

In summary, the aforementioned first embodiment can be represented as follows.

1) 120 KHz Subcarrier Spacing
   the first OFDM symbols of the candidate SS/PBCH blocks have indexes {4, 8, 16, 20, 32, 36, 44, 48}+70*n. For carrier frequencies larger than 6 GHz, n=0, 2, 4, 6.
   the first OFDM symbols of the candidate SS/PBCH blocks have indexes {2, 6, 18, 22, 30, 34, 46, 50}+70*n. For carrier frequencies larger than 6 GHz, n=1, 3, 5, 7.

2) 240 KHz Subcarrier Spacing
   the first OFDM symbols of the candidate SS/PBCH blocks have indexes {8, 12, 16, 20, 32, 36, 40, 44, 64, 68, 72, 76, 88, 92, 96, 100}+140*n. For carrier frequencies larger than 6 GHz, n=0, 2.
   the first OFDM symbols of the candidate SS/PBCH blocks have indexes {4, 8, 12, 16, 36, 40, 44, 48, 60, 64, 68, 72, 92, 96, 100, 104}+140*n. For carrier frequencies larger than 6 GHz, n=1, 3.

Figure 21:
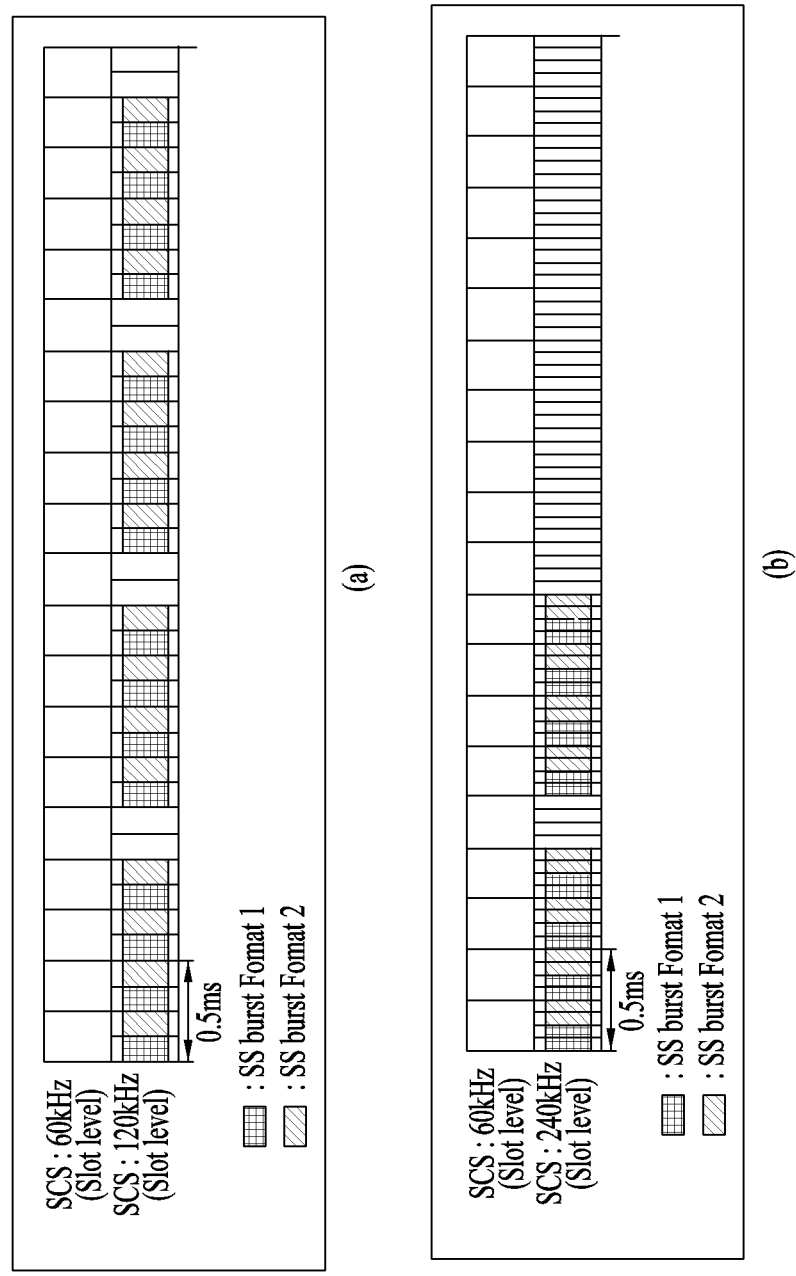

As shown in FIG. 21, a second embodiment is to change a configuration of an SS burst set. In particular, an SS burst set can be configured in a manner that a start boundary of the SS burst set is aligned (i.e., matched) with a start boundary of 60 kHz subcarrier spacing slot.

Specifically, an SS burst is configured by locally arranged SS blocks during 1 ms. In particular, an SS burst of 120 kHz subcarrier spacing has 16 SS blocks and an SS burst of 240 kHz subcarrier spacing has 32 SS blocks during 1 ms. In this case, one slot is allocated as a gap between SS bursts on the basis of 60 kHz subcarrier spacing.

In summary, the aforementioned second embodiment can be represented as follows.

1) 120 KHz Subcarrier Spacing
the first OFDM symbols of the candidate SS/PBCH blocks have indexes {4, 8, 16, 20}+28*n. For carrier frequencies larger than 6 GHz, n=0, 1, 2, 3, 5, 6, 7, 8, 10, 11, 12, 13, 15, 16, 17, 18.

2) 240 KHz Subcarrier Spacing
the first OFDM symbols of the candidate SS/PBCH blocks have indexes {8, 12, 16, 20, 32, 36, 40, 44}+56*n. For carrier frequencies larger than 6 GHz, n=0, 1, 2, 3, 5, 6, 7, 8.

10. Method of Indicating Actually Transmitted SS/PBCH Block within 5 ms Duration In NR system, it is able to specify a candidate position for transmitting an SS block within an SS burst set period (e.g., 5 ms) to perform an initial access procedure. And, a position of an actually transmitted SS block can be notified to a connected/idle mode UE. In this case, a network may have flexibility in utilizing a resource according to a network status. Yet, it may have different flexibility in configuring an SS burst set according to a configuration method of indicating an actually used SS block. For example, if it is able to set individual position information (e.g., a bitmap for an SS block or an SS burst) of actually transmitted SS blocks to a UE, both a localized type and a distributed type may operate according to a network status. The individual position information can be included in different SI indicating measurement-related information.

And, it may be able to change a periodicity of an SS burst set according to a network configuration and provide information on measurement timing/duration for a UE. When the SS burst set periodicity is changed, it is necessary to determine a candidate position in which an SS block is to be transmitted. In order to determine a position in which an SS block is to be transmitted, the present invention proposes two embodiments described in the following.

(Method 1) A network may use an assumption of a candidate position for a basic periodicity.

(Method 2) A network can indicate a position in which an SS block is to be actually transmitted within a measurement section.

In NR system, an SS burst set configuration can be designed according to a basic periodicity. When an SS burst set periodicity and measurement duration are indicated by a network, an SS burst set configuration can be assumed by an SS burst configuration. For example, when there is no indication from a network, if a UE assumes 5 ms periodicity as an SS burst set periodicity for measurement, it may be able to configure an SS burst set for 5 ms periodicity. The SS burst set configuration can also be used for a basic periodicity (e.g., 20 ms) and a periodicity configured by a network (e.g., 5, 10, 20, 40, 80, and 160 ms).

In order to more efficiently utilize a resource for an SS burst set configuration, a network can indicate a position in which an SS block is to be actually transmitted within measurement duration. For example, in case of a basic periodicity, NR-SS and NR-PBCH should be transmitted within an SS burst set periodicity. Meanwhile, in case of a periodicity longer than the basic periodicity, it may transmit NR-SS only for the purpose of measurement. If a network is able to configure a position in which an SS block is to be actually transmitted, an unused resource allocated to NR-PBCH can be allocated to a data/control channel. In case of a periodicity shorter than the basic periodicity, a network selects a partial SS block from among SS blocks included in an SS burst set to configure an actually used SS block.

Meanwhile, the number of candidates for transmitting an SS block is restricted according to network environment. For example, the number of candidates may vary depending on subcarrier spacing to which an SS block is assigned. In this case, it may be able to inform a connected/idle mode UE of a position at which an SS block is actually transmitted. Actual transmitted SS/PBCH block indication indicating the position at which the SS block is actually transmitted can be used for utilizing a resource (e.g., rate matching) for a serving cell and can be used for performing measurement related to a resource for a neighboring cell.

If a UE is able to precisely recognize a not transmitted SS block, the UE is able to recognize that the UE is able to receive other information such as paging or data via a candidate resource of the SS block which is not transmitted. For the flexibility of resource, it is necessary to precisely indicate an SS block actually transmitted in a serving cell.

In particular, since it is unable to receive other information such as paging or data in a resource in which an SS block is transmitted, a UE receives a different data or a different signal via a resource in which an SS block is not actually transmitted to increase efficiency of resource utilization. Hence, it is necessary for the UE to recognize an SS block candidate in which an SS block is not actually transmitted.

In order to precisely indicate an SS block actually transmitted in a serving cell, it is necessary to have information on a full bitmap of 4, 8, or 64 bits. In this case, a bit size included in the bitmap can be determined according to the maximum number of SS blocks capable of being transmitted in each frequency range. For example, in order to indicate an SS block actually transmitted in a period of 5 ms, a bitmap of 8 bits is required in a frequency range ranging from 3 GHz to 6 GHz and a bitmap of 64 bits is required in a frequency range equal to or wider than 6 GHz.

Bits for indicating an SS block actually transmitted in a serving cell can be defined by RMSI or OSI and the RMSI/OSI includes configuration information for data or paging. Since actual transmitted SS/PBCH block indication is associated with a configuration for a downlink resource, the RMSI/OCI can include information on an actually transmitted SS block.

Meanwhile, in order to measure a neighboring cell, actual transmitted SS/PBCH block indication of the neighboring cell is required. However, if there are many listed cells, an indicator of a full bitmap type may excessively increase signal overhead. In order to decrease the signaling overhead, it may consider an indicator of a variously compressed form. Meanwhile, in order not only to measure a neighboring cell but also to reduce signaling overhead, it may consider an indicator of a compressed form for an indicator indicating an SS block transmitted by a serving cell. In other word, an SS block indicator described in the following can be used for indicating an SS block actually transmitted in a neighboring cell and a serving cell. As mentioned in the foregoing description, an SS burst may correspond to a set of SS blocks included in a slot according to each subcarrier. However, the SS burst may correspond to a group of the prescribed number of SS blocks irrespective of a slot in the following embodiment only.

Figure 22:
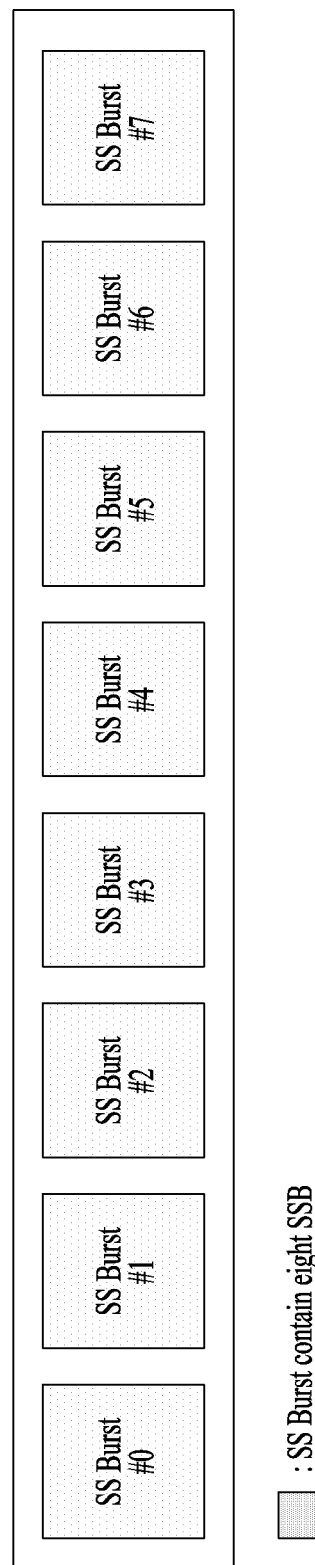

One of embodiments is explained with reference to FIG. 22. Assume that an SS burst includes 8 SS blocks. In this case, 8 SS bursts in total may exist in a band equal to or wider than 6 GHz at which 64 SS blocks are positioned.

In this case, SS blocks are grouped by an SS burst to compress the entire bitmap of 64 bits. It may use 8-bit information indicating an SS burst including actually transmitted SS blocks instead of 64-bit bitmap information. If the 8-bit bitmap information indicates an SS burst #0, the SS burst #0 can include one or more actually transmitted SS blocks.

In this case, it may consider additional information to indicate the number of actually transmitted SS blocks per SS burst. Each SS burst can locally include SS blocks as many as the number of SS blocks indicated by the additional information.

A UE combines the number of actually transmitted SS blocks per SS burst indicated by the additional information with the bitmap indicating the SS burst including the actually transmitted SS blocks to estimate the actually transmitted SS blocks.

For example, it may assume the indication shown in Table 4 in the following.

TABLE 4

| 8 bit bitmap (SS/PBCH burst unit) | The number of actually transmitted SS/PBCH block per SS/PBCH burst unit | Full bitmap |
| --- | --- | --- |
| 1 1 0 0 0 0 0 1 | 4 | (11110000) (11110000) (00000000) (00000000) (00000000) (00000000) (00000000) (11110000) |

According to Table 4, it is able to know that SS blocks are included in SS bursts #0, #1, and #7 via the 8-bit bitmap and it is able to know that 4 SS blocks are included in each SS burst via the additional information. Consequently, it is able to estimate that SS blocks are transmitted via 4 candidate positions prior to the SS bursts #0, #1, and #7.

Meanwhile, unlike the example above, if the additional information is forwarded in a bitmap form, it may be able to make a position at which an SS block is transmitted have flexibility.

For example, information related to SS burst transmission is indicated by a bitmap and an SS block transmitted within an SS burst can be indicated by other bits.

In particular, total 64 SS blocks are classified into 8 SS bursts (i.e., SS block groups) and it may inform a UE of an SS burst in use by transmitting 8-bit bitmap to the UE. When SS burst is defined as shown in FIG. 22, if the SS burst is multiplexed with a slot having subcarrier spacing of 60 kHz, it may have a merit in that a boundary between the SS burst and the slot is aligned. In particular, if on/off of the SS burst is indicated using a bitmap, a UE is able to know whether or not an SS block is transmitted in a slot unit for all subcarrier spacing in a frequency band equal to or wider than 6 GHz.

In this case, a point different from the aforementioned example is to inform a UE of the additional information using a bitmap. In this case, since it is necessary to transmit bitmap information to 8 SS blocks included in each SS burst, 8 bits are required. The additional information is commonly applied to all SS bursts. For example, if bitmap information on SS bursts indicates that an SS burst #0 and an SS burst #1 are used and additional bitmap information on SS blocks indicates that a first SS block and a fifth SS block are transmitted in an SS burst, since a first SS block and a fifth SS block are transmitted in each of the SS burst #0 and the SS burst #1, the number of actually transmitted SS blocks becomes 4.

Meanwhile, a couple of neighboring cells may not be included in a cell list. The neighboring cells not included in the cell list use a default format for an actually transmitted SS block. If the default format is used, a UE can perform measurement on the neighboring cells not included in the cell list. In this case, the default format can be defined in advance or can be configured by a network.

Meanwhile, if information on an SS block actually transmitted in a serving cell is collided with information on an SS block actually transmitted in a neighboring cell, a UE can obtain information on an actually transmitted SS block by prioritizing the information on the SS block transmitted in the serving cell.

In particular, if information on actually transmitted SS blocks is received in a form of a full bitmap and a grouping form, since it is highly probable that information in the full bitmap form is more accurate, the information in the full bitmap form can be preferentially used for receiving SS blocks.

11. Signal and Channel for Indicating Time Index

SS block time index indication is forwarded by NR-PBCH. If time index indication is included in a part of the NR-PBCH such as NR-PBCH content, a scrambling sequence, a CRC, a redundancy version, and the like, the indication is forwarded to a UE safely. On the contrary, if the time index indication is included in a part of the NR-PBCH, it may have additional complexity in decoding NR-PBCH of a neighboring cell. Meanwhile, although it is able to perform decoding on the NR-PBCH of the neighboring cell, it is not mandatory in designing a system. And, it is necessary to have additional discussion to determine a signal and a channel appropriate for forwarding SS block time index indication.

Since SS block time index information is going to be used as time resource allocation reference information on an initial access-related channel/signal such as system information forwarding, a PRACH preamble, and the like in a target cell, the SS block time index information should be safely transmitted to a UE. Meanwhile, a time index is used for measuring RSRP of an SS block level to measure a neighboring cell. In this case, the SS block time index information is not necessary to be very accurate.

The present invention proposes that NR-PBCH DMRS is to be used as a signal for forwarding an SS block time index. And, the present invention proposes that a time index indication is to be included in a part of NR-PBCH. In this case, for example, the part of the NR-PBCH may correspond to a scrambling sequence, a redundancy version, and the like of the NR-PBCH. According to the present invention, it may be able to detect an SS block time index from NR-PBCH DMRS and the detected index can be checked by NR-PBCH decoding. And, in order to measure a neighboring cell, it may be able to obtain an index from NR-PBCH DMRS for the neighboring cell.

Time index indication can be configured via two embodiments described in the following.

(Method 1) A single index method that an index is assigned to each of all SS blocks included in an SS burst set.

(Method 2) A multi-index method that an index is assigned using a combination of an SS burst index and an SS block index.

As described in embodiment 1, if a single index method is supported, it is necessary to have many bits to express the number of all SS blocks within an SS burst set periodicity. In this case, it is preferable for a DMRS sequence for NR-PBCH and a scrambling sequence to indicate SS block indication.

On the contrary, as described in embodiment 2, if a multi-index method is used, it may provide design flexibility for indicating an index. For example, both an SS burst index and an SS block index can be included in a single channel. And, each index can be individually transmitted via a different channel/signal. For example, the SS burst index can be included in contents of NR-PBCH or a scrambling sequence. The SS block index can be forwarded via a DMRS sequence of the NR-PBCH.

11. SS Block Time Index

Figure 23:
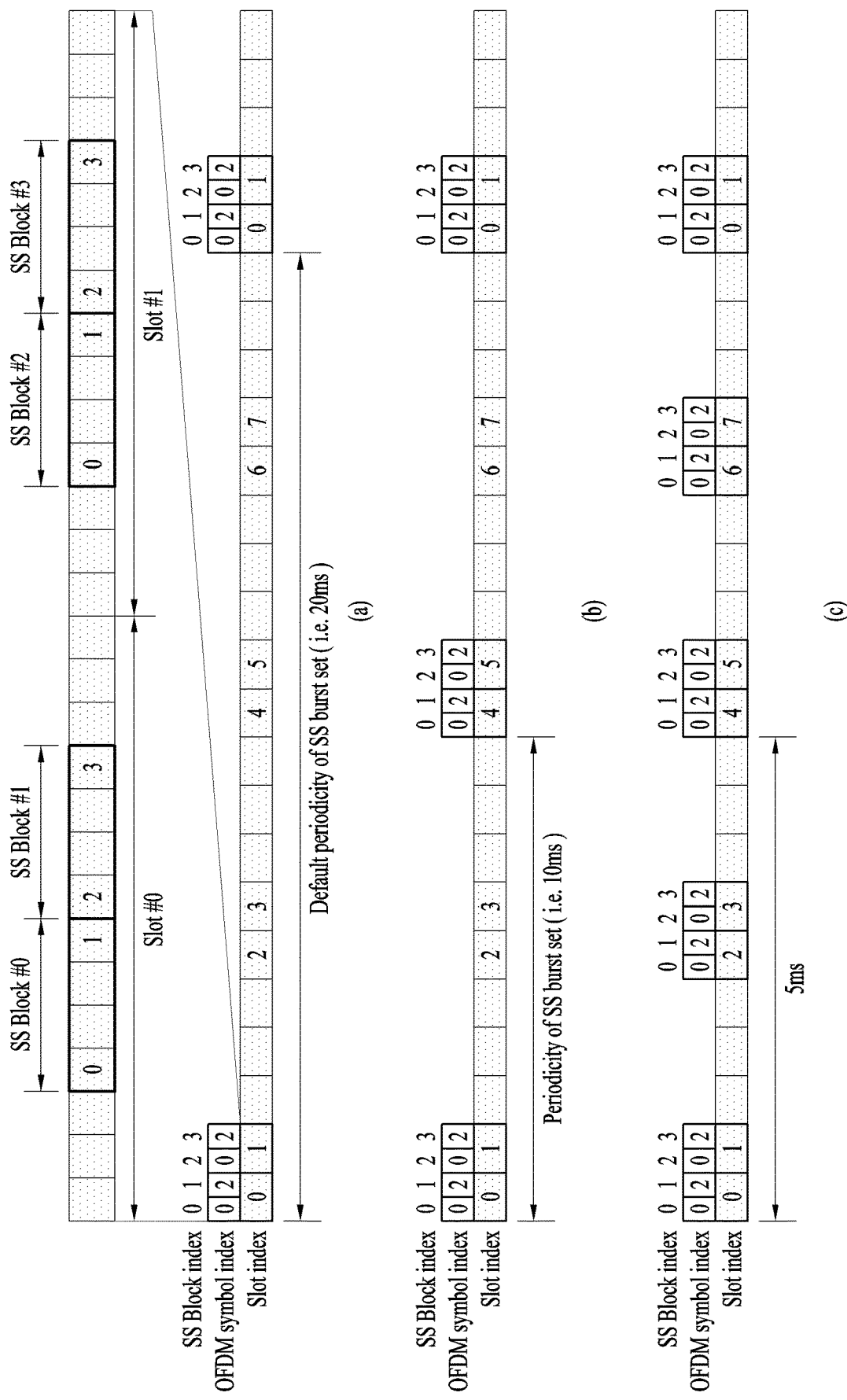
FIGS. 23 to 25 are diagrams for explaining a method of indexing a synchronization signal and a method of indicating the index.

The present invention proposes a method of configuring an SS burst set within shorter duration (e.g., 2 ms) to save energy of a network and a UE. In this case, all SS blocks can be positioned within an SS burst set periodicity irrespective of a periodicity (e.g., 5, 10, 20, 40, 80, 160 ms). FIG. 23 illustrates an SS block index when subcarrier spacing corresponds to 15 kHz.

An SS block index is explained with reference to FIG. 23. If the maximum number of SS blocks is defined by L, indexes of SS blocks correspond to 0 to L−1. And, the SS block indexes are derived from OFDM symbol indexes and slot indexes. And, an SS burst set can be configured by 4 SS blocks positioned at two slots adjacent to each other. Hence, the SS block indexes correspond to 0 to 3 and the slot indexes are defined by 0 and 1. And, an SS block includes 4 OFDM symbols and two OFDM symbols included in the SS block are used to transmit PBCH. In this case, indexes of the OFDM symbols for transmitting the PBCH may correspond to 0 and 2. As shown in FIG. 23 (a), indexes of an SS block are derived from indexes of an OFDM symbol and a slot. For example, an SS block transmitted in a slot #1 and an OFDM symbol #2 is mapped to an index 3.

As shown in FIG. 23 (b), a network can configure a periodicity of an SS burst set in NR system. And, it may be able to configure a short periodicity such as 5 and 10 ms. By doing so, it may be able to allocate more SS block transmissions. An index of an SS block can be identified within a configured periodicity of an SS burst set. As shown in FIG. 23 (c), if a periodicity of 5 ms is configured, it may be able to transmit 4 SS blocks within the configured periodicity. And, it may be able to transmit 16 SS blocks in total within a basic periodicity. In this case, indexes of the SS blocks can be repeated within a default periodicity and 4 SS blocks among the 16 SS blocks may have the same index.

12. NR-PBCH Contents

In NR system, it is anticipated that a payload size of MIB is to be extended based on a response LS of RAN2. The MIB payload size and NR-PBCH contents anticipated in the NR system are described in the following.

1) Payload: 64 bits (48-bit information, 16-bit CRC)
2) NR-PBCH contents:
At least a part of SFN/H-SFN
Configuration information on common search space
Center frequency information of NR carrier
A UE detects a cell ID and timing information and may be then able to obtain information for accessing a network from PBCH including a part of timing information such as SFN, an SS block index, and half frame timing, information on a common control channel such as a time/frequency position, information on a bandwidth part such as a bandwidth and an SS block position, and information on an SS burst set such as an SS burst set periodicity and an actually transmitted SS block index.

Since limited time/frequency resources such as 576 REs are occupied only for PBCH, essential information should be included in the PBCH. And, if possible, it may use such an auxiliary signal as a PBCH DMRS to further include essential information or additional information.

(1) SFN (System Frame Number)

In NR system, a system frame number (SFN) is defined to identify 10 ms space. And, similar to LTE system, it may introduce indexes between 0 and 1023 for the SFN. The indexes can be explicitly indicated using a bit or can be implicitly indicated.

According to the NR system, a PBCH TTI corresponds to 80 ms and a minimum SS burst periodicity corresponds to 5 ms. Hence, PBCH as much as 16 times can be transmitted in a unit of 80 ms. A different scrambling sequence for each transmission can be applied to a PBCH coded bit. Similar to an LTE PBCH decoding operation, a UE can detect 10 ms space. In this case, 8 states of the SFN are implicitly indicated by a PBCH scrambling sequence and 7 bits for representing the SFN can be defined in the PBCH contents.

(2) Timing Information in Radio Frame

An SS block index can be explicitly indicated by a bit included in a PBCH DMRS sequence and/or PBCH contents according to a carrier frequency range. For example, in a frequency range equal to or narrower than 6 GHz, 3 bits of SS block indexes are forwarded via a PBCH DMRS sequence only. In a frequency band equal to or wider than 6 GHz, lowest 3 bits of SS block indexes are indicated by a PBCH DMRS sequence and top 3 bits of SS block indexes are forwarded by PBCH contents. In particular, maximum 3 bits for SS block indexes can be defined in the PBCH contents in a frequency range ranging from 6 GHz to 52.6 GHz only.

(3) Information for Identifying that there is No RMSI Corresponding to PBCH

In NR, an SS block can be used not only for providing information for accessing a network but also for measuring an operation. In particular, in order to perform a broadband CC operation, it may be able to transmit multiple SS blocks for measurement.

However, it is not necessary to forward RMSI via all frequency positions at which an SS block is transmitted. In particular, it is able to forward the RMSI via a specific frequency position for efficiency of resource utilization. In this case, UEs performing an initial access procedure are unable to recognize whether or not RMSI is provided at a detected frequency position. In order to solve the problem above, it is necessary to define a bit field for identifying that there is no RMSI corresponding to PBCH of a detected frequency region. Meanwhile, it is also necessary to consider a method capable of identifying that there is no RMSI corresponding to PBCH without the bit field.

To this end, an SS block in which RMSI does not exist is configured to be transmitted at a frequency position which is not defined as a frequency raster. In this case, since UEs performing an initial access procedure are unable to detect the SS block, it is able to solve the aforementioned problem.

(4) SS Burst Set Periodicity and Actually Transmitted SS Block

It is able to indicate information on an SS burst set periodicity and an actually transmitted SS block for the purpose of measurement. In particular, it is preferable to include the information in system information for cell measurement and inter/intra cell measurement. In particular, it is necessary to define the information in PBCH contents.

(5) Payload Size

As shown in Table 5, maximum 64-bit payload size can be assumed in consideration of decoding performance of PBCH.

TABLE 5

| Details | Bit size | |
| --- | --- | --- |
| | narrower that 6 GHz | wider than 6 GHz |
| System Frame Number (MSB) | 7 | 7 |
| SS/PBCH block time index (MSB) | 0 | 3 |
| Reference numerology | [1] | [1] |
| Bandwidth for DL common channel, and SS block position | [3] | [2] |
| # of OFDM symbols in a Slot | [1] | 0 |
| CORESET (Frequency resource - bandwidth, location) (Time resource - starting OFDM symbol, Duration) (UE Monitoring Periodicity, offset, duration) | About [10] | About [10] |
| Reserved Bit | [20] | [20] |
| CRS | 16 + a | 16 + a |
| Total | 64 | 64 |

13. NR-PBCH Scrambling

A type of NR-PBCH scrambling sequence and sequence initialization are described. In NR, it may consider using a PN sequence. However, if a gold sequence of a length of 31 defined in LTE system is used as an NR-PBCH sequence and a serious problem does not occur, it is preferable to reuse the gold sequence as the NR-PBCH scrambling sequence.

A scrambling sequence can be initialized by a cell ID and 3 bits of SS block indexes indicated by PBCH-DMRS can be used for initializing a scrambling sequence. And, if half frame indication is indicated by a PBCH-DMRS or a different signal, the half frame indication can also be used as a seed value for initializing a scrambling sequence.

14. Transmission Method and Antenna Port

In NR system, NR-PBCH transmission is performed based on a single antenna port. When the transmission is performed based on a single antenna port, it may consider methods described in the following to transmit NR-PBCH.

(Method 1) TD-PVS (time domain precoding vector switching) method (Method 2) CDD (cyclic delay diversity) method (Method 3) FD-PVS (frequency domain precoding vector switching) method According to the transmission methods, NR-PBCH can obtain a transmission diversity gain and/or a channel estimation performance gain. Meanwhile, it may consider the TD-PVS and the CDD to transmit NR-PBCH. On the other hand, since the FD-PVS causes overall performance loss due to a channel estimation loss, it is not preferable.

And, antenna port assumption for NR-SS and NR-PBCH is explained. In an initial access state, it may consider transmitting NR-SS and NR-PBCH via a different antenna port to provide network flexibility in transmitting the NR-SS and the NR-PBCH in NR system. However, a UE may assume that antenna ports of the NR-SS and the NR-PBCH are identical to each other or different from each other based on a network configuration.

15. NR-PBCH DMRS Design

In NR system, a DMRS is introduced for phase reference of NR-PBCH. And, NR-PSS/NR-SSS/NR-PBCH exists in all SS blocks and OFDM symbol at which the NR-PSS/NR-SSS/NR-PBCH is positioned is consecutive in a single SS block. However, if a transmission scheme is different between NR-SSS and NR-PBCH, it is unable to assume that the NR-SSS is going to be used as a reference signal for demodulating the NR-PBCH. Hence, it is necessary to design the NR-PBCH under the assumption that the NR-SSS is not used as a reference signal for demodulating the NR-PBCH in NR system.

In order to design a DMRS, it is necessary to consider DMRS overhead, a time/frequency position, and a scrambling sequence.

Overall PBCH decoding performance can be determined by channel estimation performance and an NR-PBCH coding rate. The number of REs for transmitting a DMRS has a trade-off relation between the channel estimation performance and the NR-PBCH coding rate. Hence, it is necessary to find out the number of REs appropriate for the DMRS. For example, if 4 REs per RB are allocated to a DMRS, it may have better performance. If two OFDM symbols are allocated to transmit NR-PBCH, 192 REs are used for a DMRS and 384 REs are used for MIB transmission. In this case, if a payload size corresponds to 64 bits, it may obtain 1/12 coding speed identical to coding speed of LTE PBCH.

When multiple OFDM symbols are allocated to transmit NR-PBCH, it is necessary to determine an OFDM symbol in which a DMRS is to be included. In this case, in order to prevent performance deterioration due to a residual frequency offset, it is preferable to arrange a DMRS to all OFDM symbols at which the NR-PBCH is positioned. In particular, all OFDM symbol for transmitting the NR-PBCH can include a DMRS.

A PBCH DMRS is used as a time/frequency tracking RS for an OFDM symbol position at which NR-PBCH is transmitted. As a distance between two OFDM symbols including a DMRS is getting longer, it is more profitable for precisely tracking a frequency. Hence, a first OFDM symbol and a fourth OFDM symbol can be allocated to transmit NR-PBCH.

And, a frequency position of a DMRS can be mapped by interleaving in time domain capable of being shifted according to a cell ID. When DMRS patterns are uniformly distributed, the DMRS patterns can be used for DFT-based channel estimation that provides optimized performance to 1-D channel estimation. In order to increase channel estimation performance, it may use broadband RB bundling.

A DMRS sequence can use a pseudo random sequence defined by a type of a gold sequence. A length of a DMRS sequence can be defined by the number of REs for a DMRS according to an SS block. And, the DMRS sequence can be generated by a cell ID and a slot number/OFDM symbol index within 20 ms corresponding to a default periodicity of an SS burst set. And, an index of an SS block can be determined based on an index of a slot and an index of an OFDM symbol.

Meanwhile, it is necessary to perform scrambling on NR-PBCH DMRS using 1008 cell IDs and SS block indexes of 3 bits. This is because, when detection performances are compared according to the number of hypotheses of a DMRS sequence, it is known as detection performance of 3 bits is most suitable for the number of hypotheses of the DMRS sequence. However, since it is examined as detection performance of 4 to 5 bits has little performance loss, it is o.k. to use the number of hypotheses of 4 to 5 bits.

In other word, the DMRS sequence can be initialized by the cell ID, the SS block indexes included in the SS burst set, and the half frame indication. An equation for initializing the DMRS sequence is shown in the following.

$$c_{init} = (N_{ID}^{SS/PBCHblock} + 1 + 8 \cdot HF) \cdot (2 \cdot N_{ID}^{cell} + 1) \cdot 2^{10} + N_{ID}^{cell}$$ [Equation 7]

In this case, $N_{ID}^{SS/PBCHblock}$ corresponds to SS block indexes in an SS block group, $N_{ID}^{cell}$ corresponds to a cell ID, and HF corresponds to a half frame indication index having a value of {0, 1}.

Similar to an LTE DMRS sequence, NR-PBCH DMRS sequence can be generated using a gold sequence of a length of 31 or a gold sequence of a length of 7 or 8.

Meanwhile, since detection performance using the gold sequence of a length of 31 is similar to detection performance using the gold sequence of a length of 7 or 8, the present invention proposes to use the gold sequence of a length of 31 like LTE DMRS does. In a frequency range equal to or wider than 6 GHz, it may consider using a gold sequence of a length longer than 31.

It may consider BPSK and QPSK as a modulation type for generating a DMRS sequence. Detection performance of the BPSK is similar to detection performance of the QPSK. However, since correlation performance of the QPSK is superior to correlation performance of the BPSK, the QPSK is more suitable for a modulation type for generating the DMRS sequence.

15. NR-PBCH DMRS Pattern Design

In relation to a frequency position of a DMRS, it may consider two types of DMRS RE mapping method. According to a fixed RE mapping method, an RS mapping region is fixed in frequency domain. According to a variable RE mapping method, an RS position is shifted according to a cell ID using a Vshift method. Since the variable RE mapping method randomizes interference, it may have a merit in that it is able to obtain an additional performance gain. Hence, it is preferable to use the variable RE mapping method.

The variable RE mapping method is explained in more detail. A complex modulation symbol $a_{k,l}$ included in a half frame can be determined by equation 8 in the following.

$$k = 4m' + v_{shift} \text{ if } l \in \{1, 3\}$$ [Equation 8]
$$l = \begin{cases} 1 & l' = 0 \\ 3 & l' = 1 \end{cases}$$
$$m' = 0, 1, \ldots, 71$$
$$v_{shift} = N_{ID}^{cell} \bmod 3$$

In this case, k and l correspond to a subcarrier positioned in an SS block and an OFDM symbol index, respectively. Meanwhile, the complex modulation symbol can also be determined by $v_{shift} = N_{ID}^{cell} \bmod 4$.

And, it may consider RS power boosting for performance enhancement. If the RS power boosting and Vshift are used together, it may be able to reduce interference from interference TRP (total radiated power). And, when a detection performance gain of the RS power boosting is considered, −1.25 dB is preferable for a ratio of PDSCH EPRE to RS EPRE.

20. NR-PBCH TTI Boundary Indication

NR-PBCH TTI corresponds to 80 ms and a default periodicity of an SS burst set corresponds to 20 ms. This indicates that NR-PBCH is transmitted 4 times within the NR-PBCH TTI. When the NR-PBCH is repeated within the NR-PBCH TTI, it is necessary to indicate a boundary of the NR-PBCH TTI. For example, similar to LTE PBCH, the NR-PBCH TTI boundary can be indicated by a scrambling sequence of the NR-PBCH.

Figure 24:
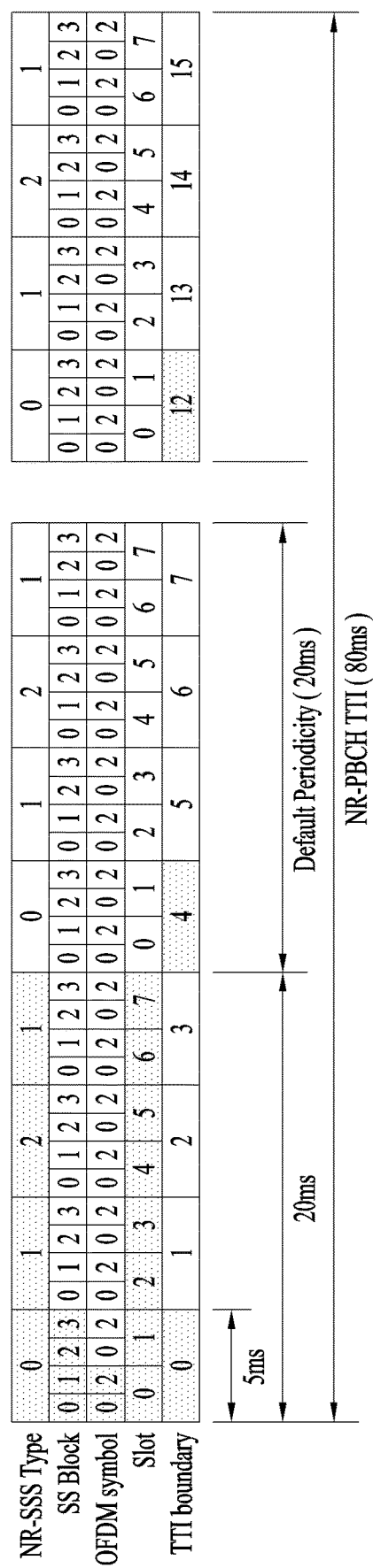

Referring to FIG. 24, the scrambling sequence of the NR-PBCH can be determined by a cell ID and TTI boundary indication. A periodicity of an SS burst set may have a plurality of values. Hence, the number of indexes for the TTI boundary indication can be changed according to the periodicity of the SS burst set. For example, 4 indexes are necessary for a default periodicity (i.e., 20 ms) and 16 indexes are necessary for a shorter periodicity (i.e., 5 ms).

Meanwhile, NR system supports both single beam transmission and multi-beam transmission. When a plurality of SS blocks are transmitted within the periodicity of the SS burst set, an SS block index can be assigned to each of a plurality of the SS blocks. In order to perform randomization between SS blocks for inter-cell, it is necessary to determine a scrambling sequence by an index related to an SS block. For example, If an index of an SS block is derived from an index of a slot and an index of an OFDM symbol, a scrambling sequence of NR-PBCH can be determined by the index of the sot and the index of the OFDM symbol.

And, if a network sets such a short period as 5 ms or 10 ms to an SS burst set, the SS burst set can be more transmitted during the same time. In this case, a UE may have ambiguity regarding a TTI boundary of NR-PBCHs transmitted within the default periodicity. In order to indicate an NR-PBCH TTI boundary for a periodicity shorter than the default periodicity, it may consider a different scrambling sequence of NR-PBCH for the periodicity shorter than the default periodicity. For example, if a periodicity of 5 ms of an SS burst set is assumed, 16 scrambling sequences are applied to NR-PBCH. By doing so, it may have a merit in that it is able to indicate a precise boundary of NR-PBCH transmission within NR-PBCH TTI. On the contrary, blind detection complexity for NR-PBCH decoding is increased. In order to reduce the blind decoding complexity of the NR-PBCH, it may consider applying a different NR-SSS sequence to distinguish NR-SSS having a default periodicity from NR-SSS additionally transmitted within the default periodicity.

17. Time Index Indication Method

Figure 25:
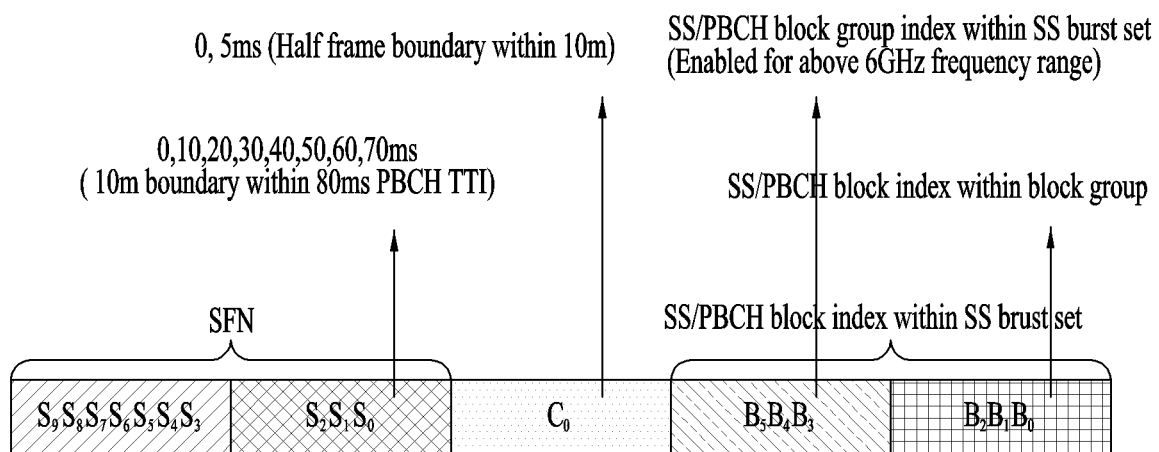

Referring to FIG. 25, time information includes SFN (system frame number), a half frame interval, and an SS block time index. The time information can be represented by 10 bits for the SFN, 1 bit for the half frame, and 6 bits for the SS block time index. In this case, a part of the 10 bits for the SFN can be included in PBCH contents. And, NR-DMRS can include 3 bits among the 6 bits for the SS block time index.

In FIG. 25, embodiments for the time index indication method are described in the following.

Method 1: S2 S1 (PBCH scrambling)+S0 C0(PBCH contents)

Method 2: S2 S1 S0 (PBCH scrambling)+C0 (PBCH contents)

Method 3: S2 S1 (PBCH scrambling)+S0 C0 (PBCH DMRS)

Method 4: S2 S1 S0 (PBCH scrambling)+C0 (PBCH DMRS)

If half frame indication is forwarded via the NR-PBCH DMRS, it may be able to have additional performance enhancement by combining PBCH data in every 5 ms. To this end, as shown in the methods 3 and 4, 1 bit for the half frame indication can be forwarded via the NR-PBCH DMRS.

When the methods 3 and 4 are compared, although the method 3 reduces a decoding count, the method 3 may bring about a loss of PBCH DMRS performance. If PBCH DMRS is able to forward 5 bits including S0, C0, B0, B1, and B2 with excellent performance, the method 3 can be used as an appropriate timing indication method. However, if the PBCH DMRS is unable to forward the 5 bits with excellent performance, the method 4 can be used as an appropriate timing indication method.

In particular, the top 7 bits of the SFN can be included in the PBCH contents and the bottom 2 or 3 bits can be forwarded via PBCH scrambling. And, the bottom 3 bits of the SS block index are included in the PBCH DMRS and the top 3 bits of the SS block index can be included in the PBCH contents.

In addition, it may consider a method of obtaining an SS block time index of a neighboring cell. Since decoding via a DMRS sequence shows better performance compared to decoding via the PBCH contents, if a DMRS sequence is changed within 5 ms, it is able to transmit 3 bits of the SS block index.

Meanwhile, in a frequency range equal to or narrower than 6 GHz, an SS block time index can be transmitted using NR-PBCH DMRS of a neighboring cell only. On the contrary, in a frequency range equal to or wider than 6 GHz, since 64 SS block indexes are separately indicated via PBCH-DMRS and PBCH contents, it is not necessary for a UE to perform decoding on PBCH of a neighboring cell.

However, if decoding is performed on PBCH-DMRS and PBCH contents together, it may bring about additional NR-PBCH decoding complexity and decoding performance of PBCH can be deteriorated compared to a case of using the PBCH-DMRS only. As a result, it may be difficult to perform decoding on PBCH to receive an SS block of a neighboring cell.

It may consider a method for a serving cell to provide a UE with a configuration related to an SS block index of a neighboring cell instead of a method of decoding PBCH of the neighboring cell. For example, the serving cell provides the UE with a configuration related to the top 3 bits of an SS block index of a target neighboring cell and the UE detects the bottom 3 bits via PBCH-DMRS. Then, the UE is able to obtain the SS block index of the target neighboring cell by combining the top 3 bits with the bottom 3 bits.

18. Soft Combining

It is necessary for NR system to support wise soft combining to an SS burst set for efficient resource utilization and PBCH coverage. Since NR-PBCH is updated in every 80 ms and the SS bust set is transmitted in every default periodicity of 20 ms, soft combining of at least 4 times can be performed on NR-PBCH decoding. If a periodicity shorter than the default periodicity is indicated to the SS burst set, more OFDM symbols can be used for soft combining for PBCH.

19. PBCH Decoding for the Neighboring Cell Measurements

In order to measure a neighboring cell, it is necessary to determine whether or not a UE performs decoding on NR-PBCHs of neighboring cells. Since decoding of neighboring cells increases UE complexity, it is preferable not to increase unnecessary complexity. Hence, it is necessary for the UE to assume that the UE needs not decode NR-PBCH of a neighboring cell when the UE measures the neighboring cell.

On the contrary, if an SS block index is forwarded via a signal of a specific type, the UE performs signal detection and may be then able to obtain SS block indexes of neighboring cells. By doing so, it is able to reduce UE complexity. Meanwhile, the signal of the specific type may correspond to NR-PBCH DMRS.

20. Measurement Result Evaluation

In the following, a performance measurement result according to a payload size, a transmission scheme, and a DMRS is explained. In this case, assume that two OFDM symbols having 24 RBs are used to transmit NR-PBCH. And, assume that an SS burst set (i.e., 10, 20, 40, 80 ms) has a plurality of periods and a coded bit is transmitted within 80 ms.

(1) Payload Size and NR-PBCH Resource

Figure 26:
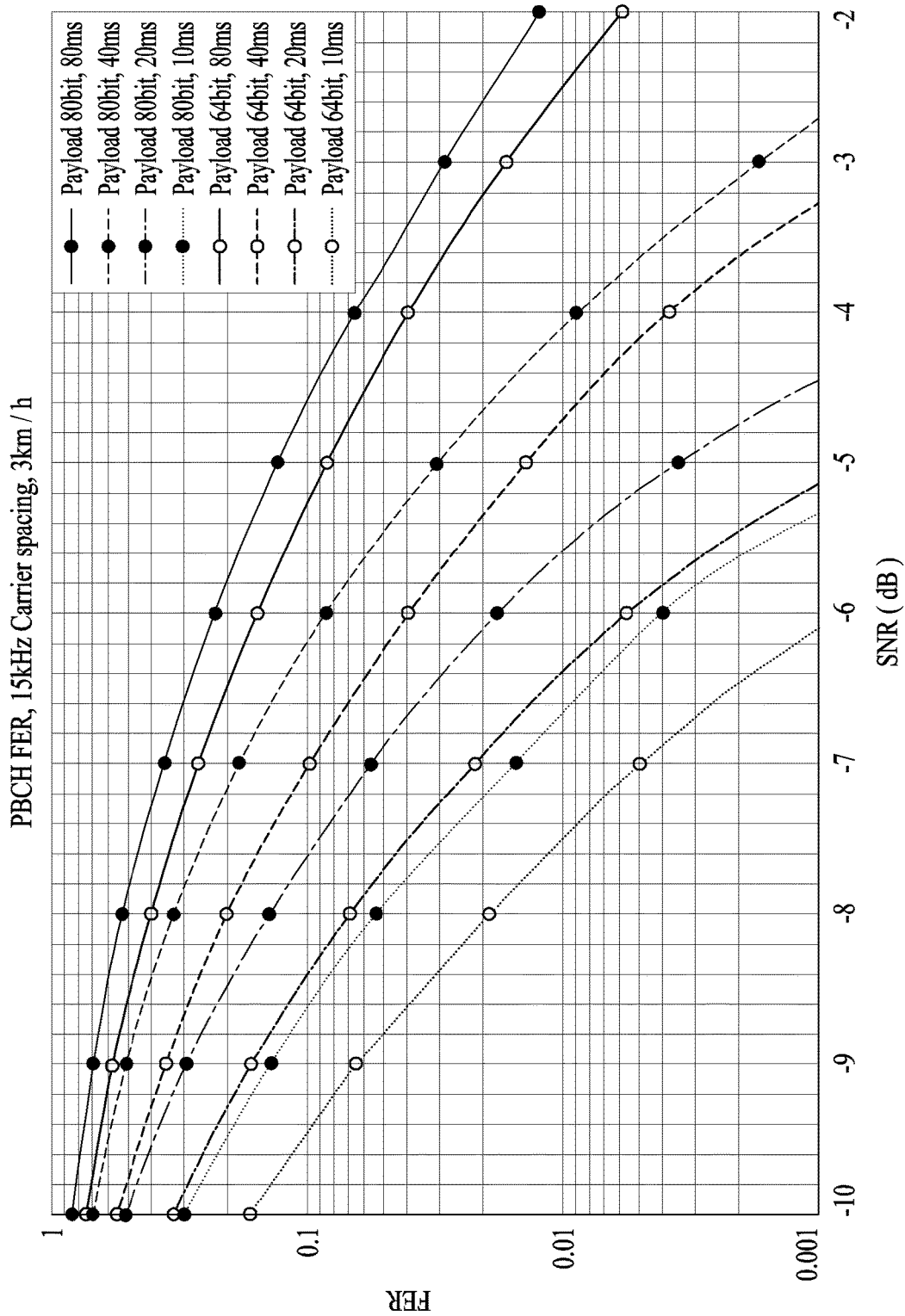
FIGS. 26 to 42 are diagrams for a measurement result of performance according to embodiments of the present invention.

FIG. 26 provides an evaluation result according to MIB payload size (e.g., 64, 80 bits). In this case, assume that 384 REs and 192 REs for a DMRS are used in two OFDM symbols and 24 RBs. And, assume that a single antenna port-based transmission scheme (i.e., TD-PVS) is used.

Referring to FIG. 26, NR-PBCH of a period of 20 ms shows an error rate of 1% in −6 dB SNR. In case of a payload of 64 bits, it is able to see that the payload has a gain as much as 0.8 dB compared to a payload of 80 bits. In particular, if a payload size between 64 bits and 80 bits is assumed, a performance requirement of NRR-PBCH (i.e., 1% BLER in −6 dB SNR) can be satisfied using 24 RBs and 2 OFDM symbols.

(2) Transmission Scheme

Figure 27:
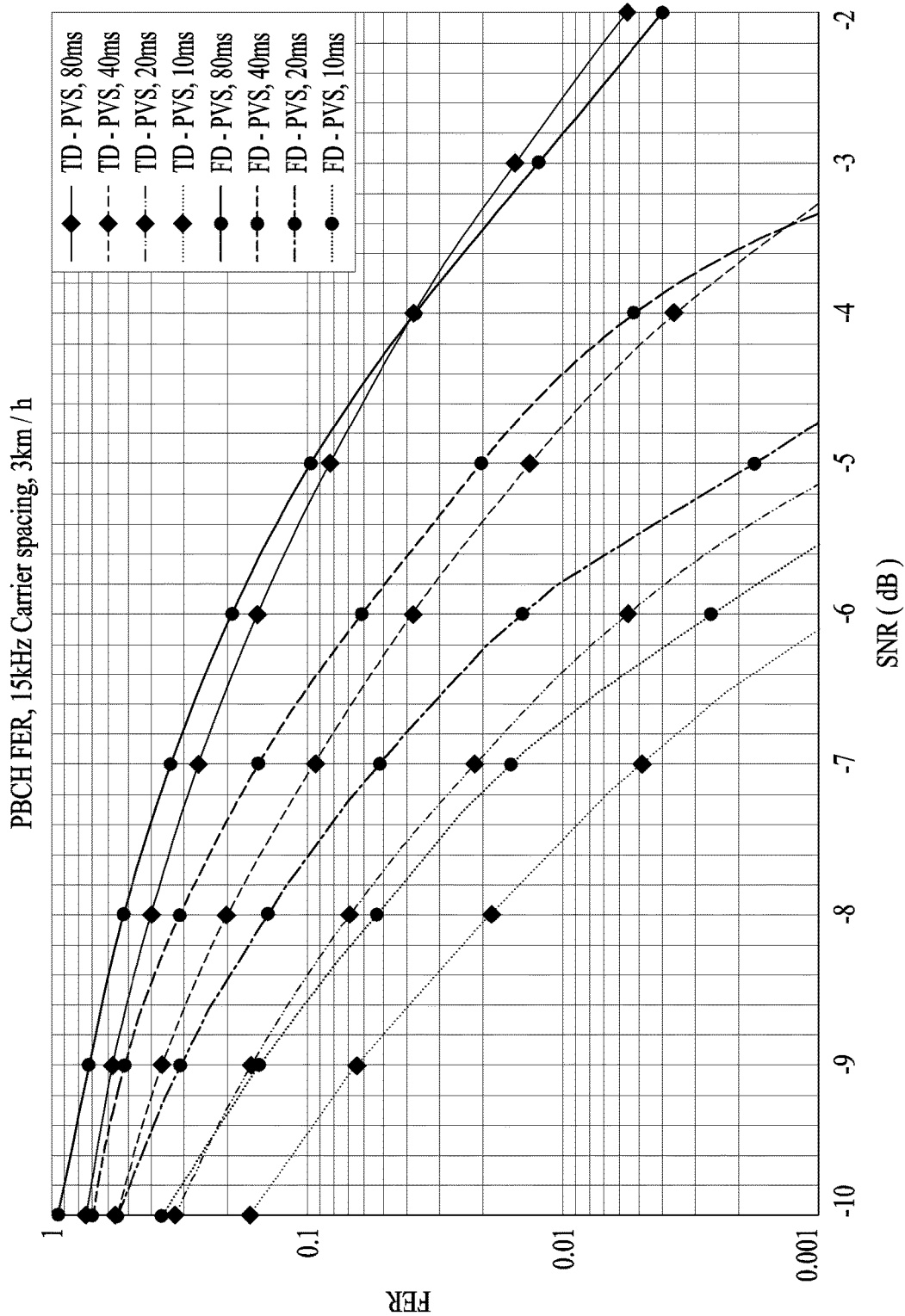

FIG. 27 provides an evaluation result according to NR-PBCH transmission scheme such as TD-PVS and FD-PVS. A precoder is cycled in every PBCH transmission subframe (e.g., 20 ms) for the TD-PVS and all of the N number of RBs (e.g., N corresponds to 6) for the FD-PVS. In FIG. 27, soft combining of NR-PBCH is assumed in a plurality of periods (i.e., 10, 20, 40, and 80 ms) of an SS burst set.

As shown in FIG. 27, a TD-PVS (time-domain precoding vector switching) scheme shows excellent channel estimation performance better than performance of an FD-PVS (frequency-domain precoding vector switching). In this case, it is able to see that channel estimation performance is more important than transmit diversity gain in a very low SNR region.

(3) DMRS Density

Figure 32:
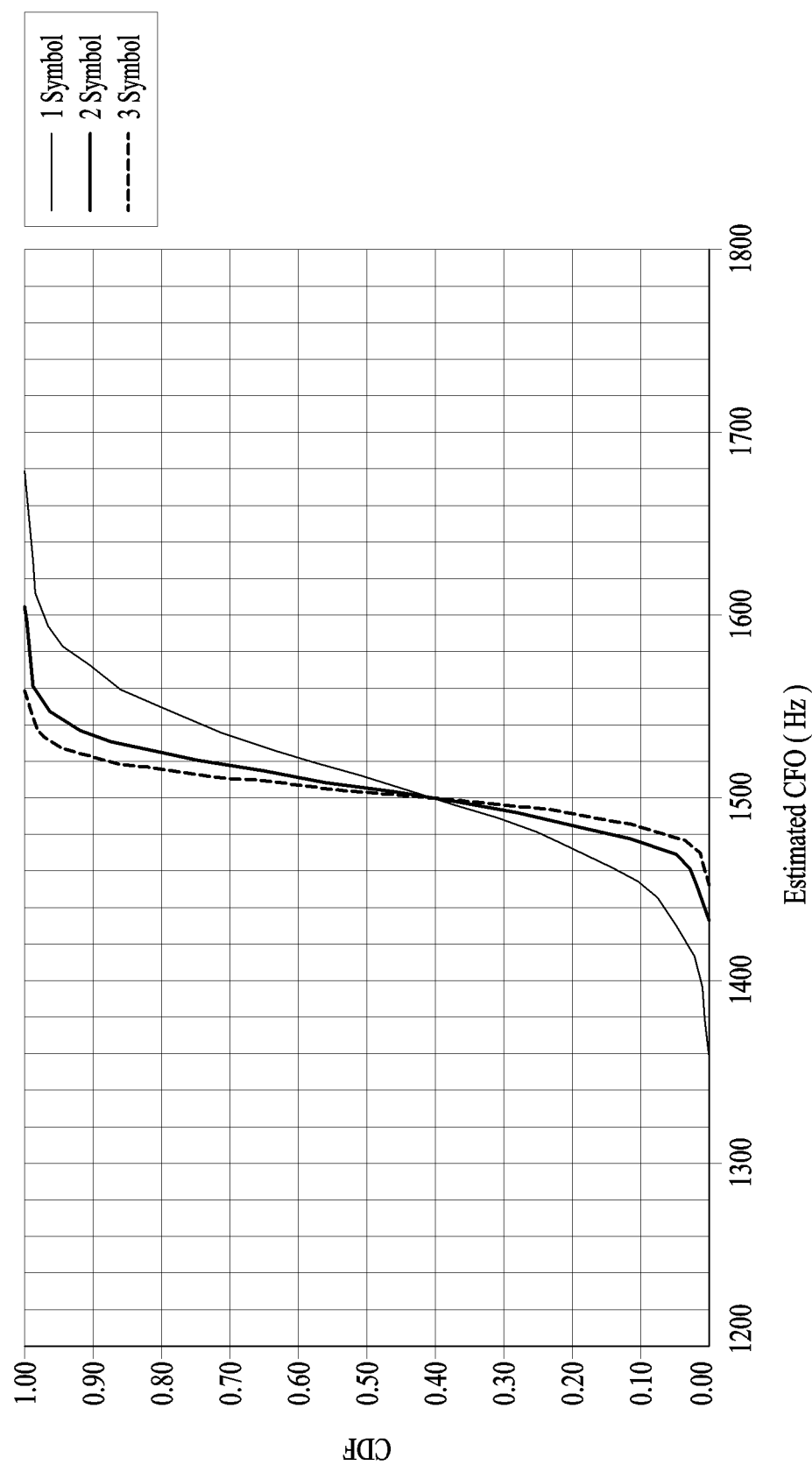

In a low SNR region, channel estimation performance enhancement is an important element for enhancing demodulation performance. However, if RS density of NR-PBCH increases, although the channel estimation performance is enhanced, coding speed is reduced. In order to compromise between the channel estimation performance and a channel coding gain, decoding performance is compared according to DMRS density. FIG. 32 illustrates DMRS density.

Figure 28:
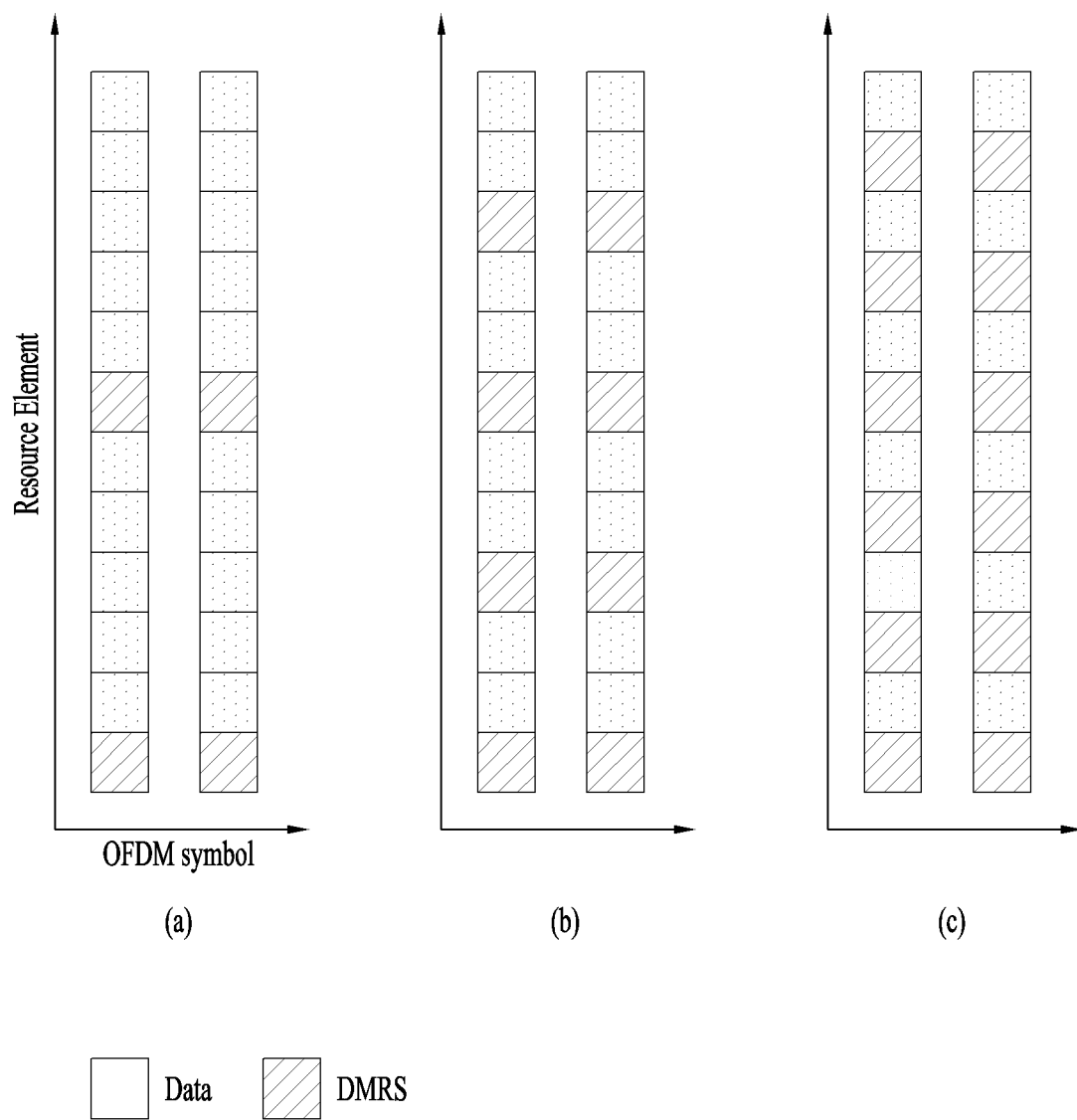

FIG. 28 (a) illustrates a case of using 2 REs per symbol for a DMRS, FIG. 32 (b) illustrates a case of using 4 REs per symbol for a DMRS, and FIG. 32 (c) illustrates a case of using 6 REs per symbol for a DMRS. And, assume that the present evaluation uses a single port-based transmission scheme (i.e., TD-PVS).

Figure 29:
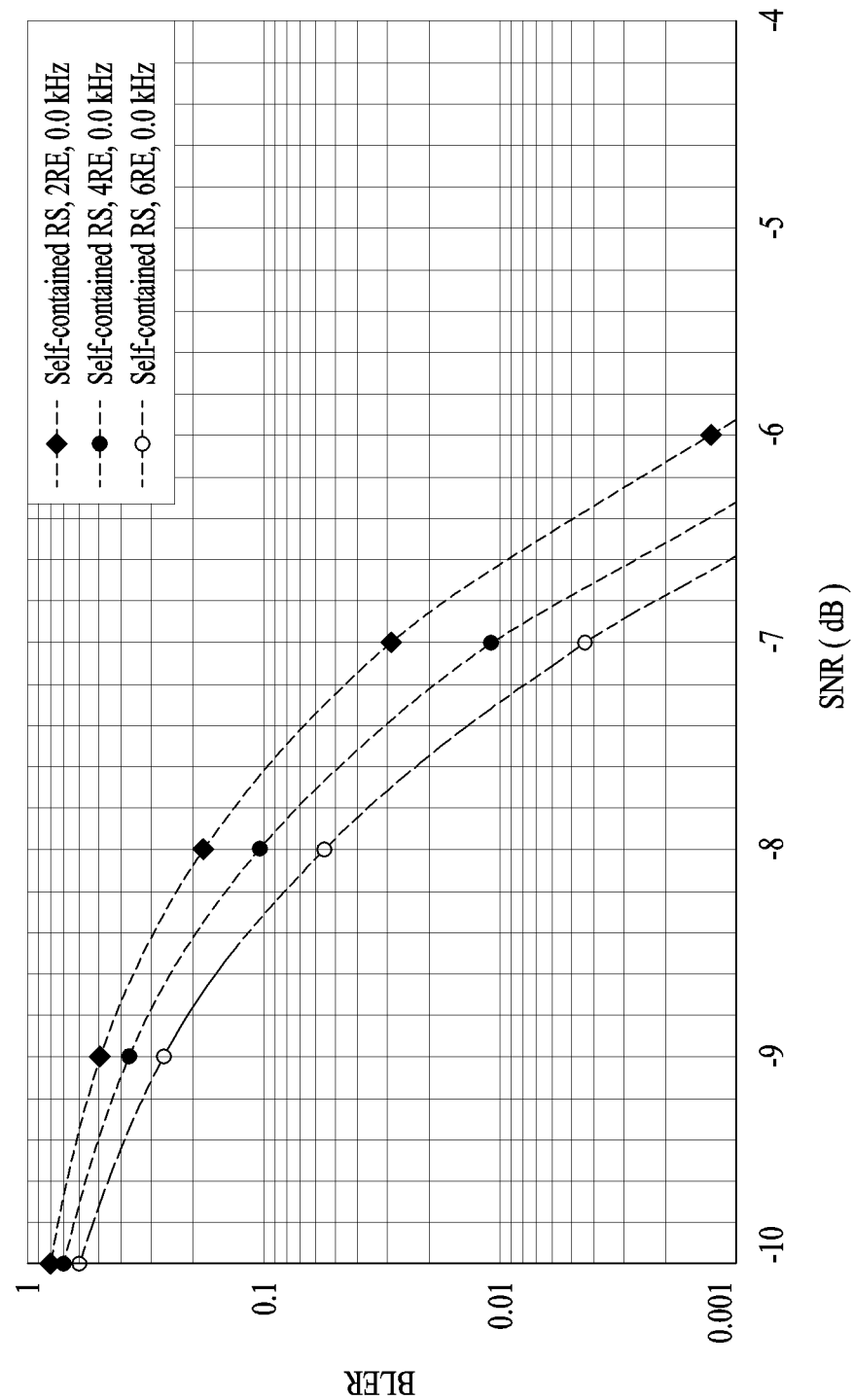

FIG. 28 illustrates an embodiment of a DMRS pattern for a single antenna port-based transmission. Referring to FIG. 28, while a DMRS position maintains the same distance between reference signals in frequency domain, RS density is changed. FIG. 29 illustrates a performance result of a DMRS according to reference signal density.

As shown in FIG. 29, NR-PBCH decoding performance shown in FIG. 28 (b) shows excellent channel estimation performance. In particular, the NR-PBCH decoding performance is superior to the performance shown in FIG. 28 (a). On the contrary, referring to FIG. 28 (c), since an effect of a coding speed loss is greater than a gain of channel estimation performance enhancement, performance shown in FIG. 28 (c) is inferior to the performance of FIG. 28 (b). Due to the abovementioned reason, it is preferable to design RS density of 4 REs per symbol.

(4) DMRS Time Position and CFO Estimation

If NR system supports self-contained DMRS, it may be able to perform fine frequency offset tracking on NR-PBCH using the self-contained DMRS. Since frequency offset estimation accuracy depends on an OFDM symbol distance, as shown in FIG. 30, it may assume three types of NR-PBCH symbol spacing.

Figure 30:
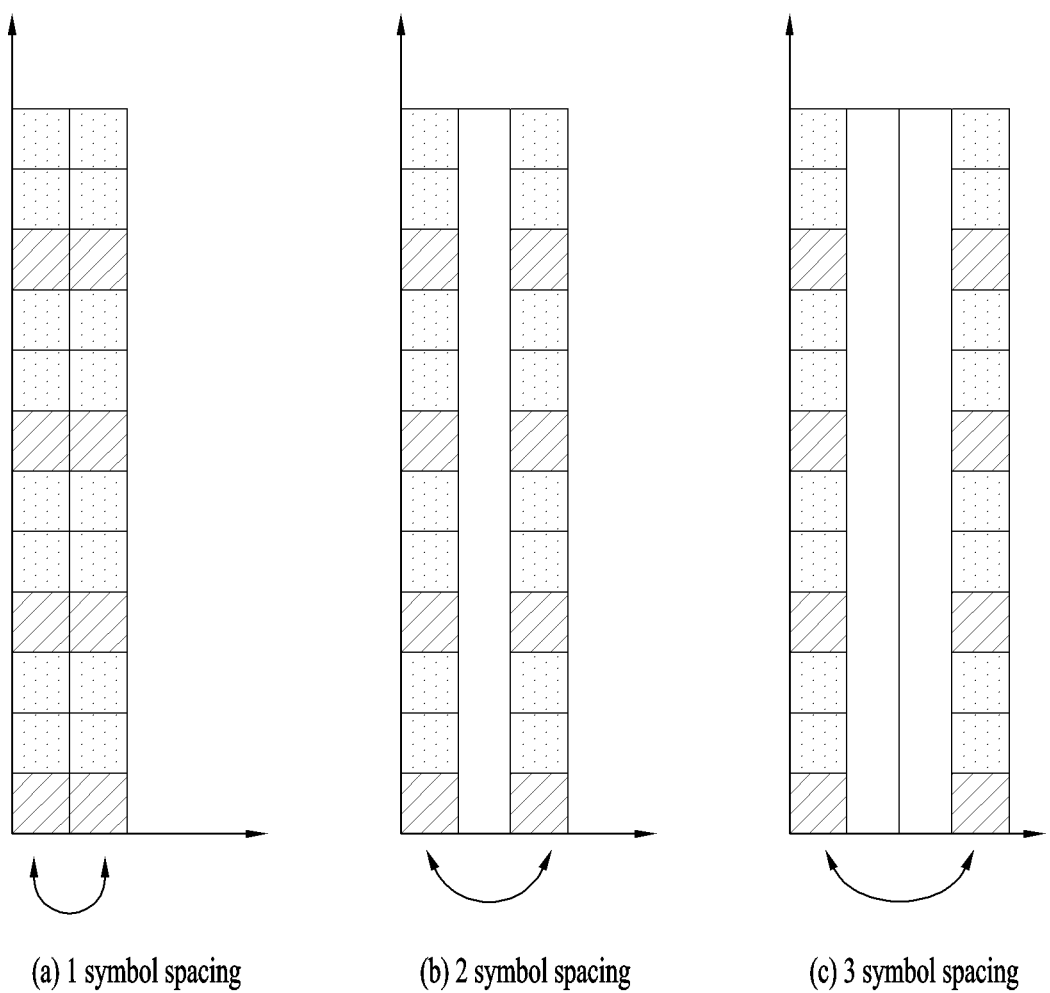

CFO estimation is performed in SNR of −6 dB according to each of NR-PBCH symbol spacing shown in FIG. 30. A sample of 10% CFO (1.5 kHz) is applied in a subframe. 4 REs per symbol are used as an independent RS and the REs are included in a symbol in which PBCH is transmitted.

Figure 31:
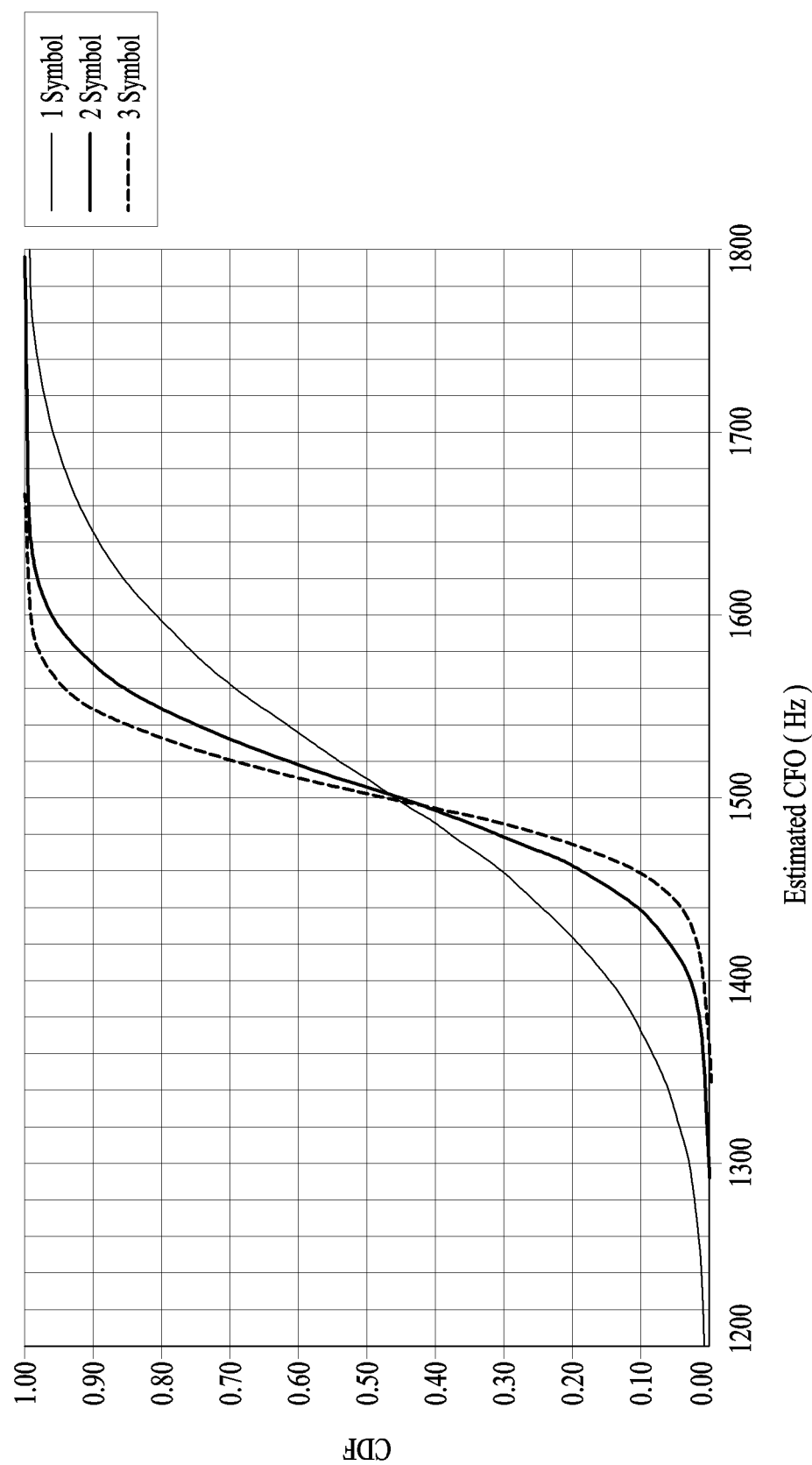

FIGS. 31 and 32 illustrate CDF of CFO estimated according to a different NR-PBCH symbol spacing. As shown in FIGS. 31 and 32, 90% of UEs can estimate CFO of 1.5 kHz within an error range of ±200 Hz. If minimum 2 symbols are introduced as NR-PBCH symbol spacing, 95% of UEs can estimate CFO within an error range of ±200 Hz and 90% of UEs can estimate CFO within an error range of ±100 Hz.

A phase offset due to CFO increases as spacing is getting bigger. If an interval between PBCH symbols is bigger, CFO estimation performance is better. Hence, similar to noise suppression, it is able to easily measure the phase offset. And, if a size of an average window is big, it is able to increase accuracy of CFO estimation.

In the following, detection performance of an SS block index according to the number of DMRS sequence hypotheses, a modulation type, sequence generation, and DMRS RE mapping is explained. In the present measurement result, assume that 2 OFDM symbols are used for transmitting NR-PBCH to 24 RBs. And, it may consider multiple periods of an SS burst set. The multiple periods may include 10 ms, 20 ms, and 40 ms.

(5) Number of DMRS Hypotheses

Figure 33:
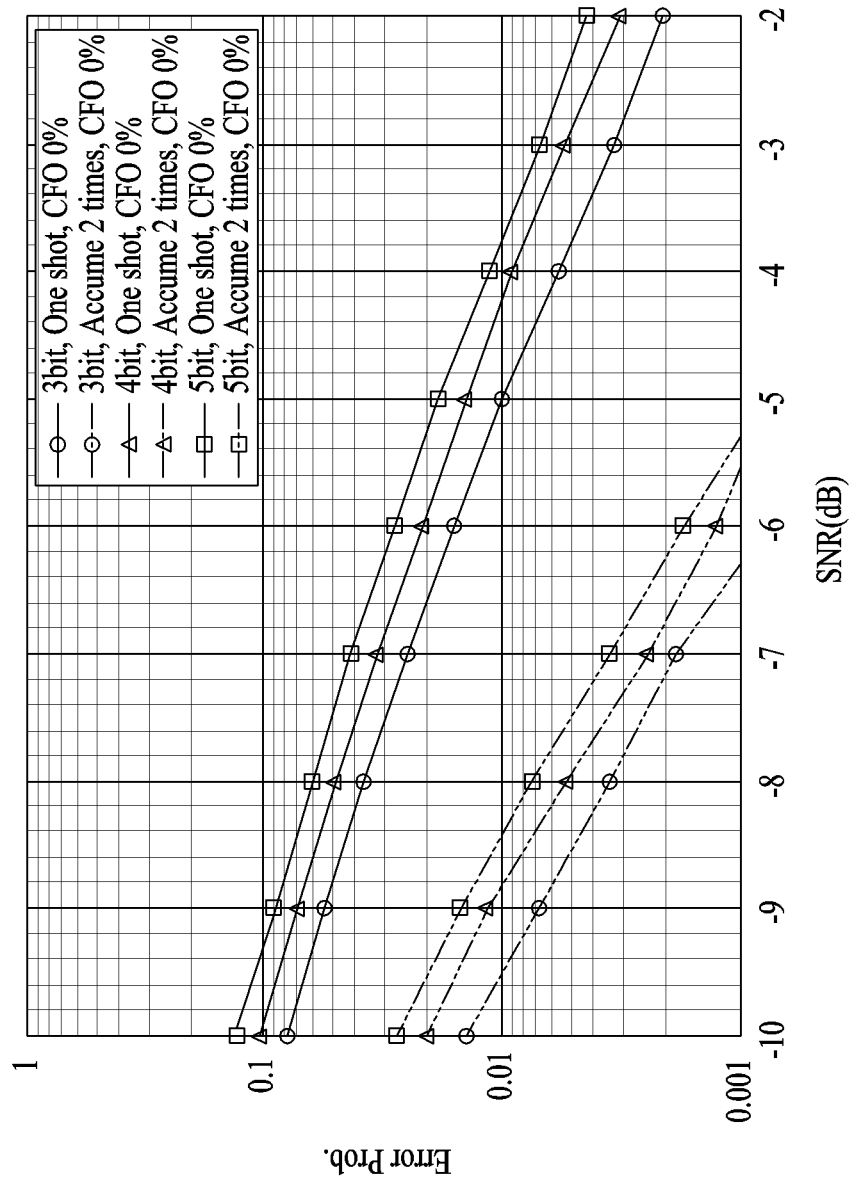

FIG. 33 illustrates a measurement result according to an SS block index. In this case, 144 REs are used for a DMRS within 24 RBs and 2 OFDM symbols 432 REs are used for information. And, assume that a long sequence (e.g., a gold sequence of a length of 31) is used as a DMRS sequence and QPSK is used.

Referring to FIG. 33, if detection performance of 3 to 5 bits is measured two times by accumulating the detection performance, it shows an error rate of 1% in SNR of −6 dB. In particular, information of 3 to 5 bits can be used as the number of hypotheses for a DMRS sequence in the aspect of detection performance.

(6) Modulation Type

Figure 34:
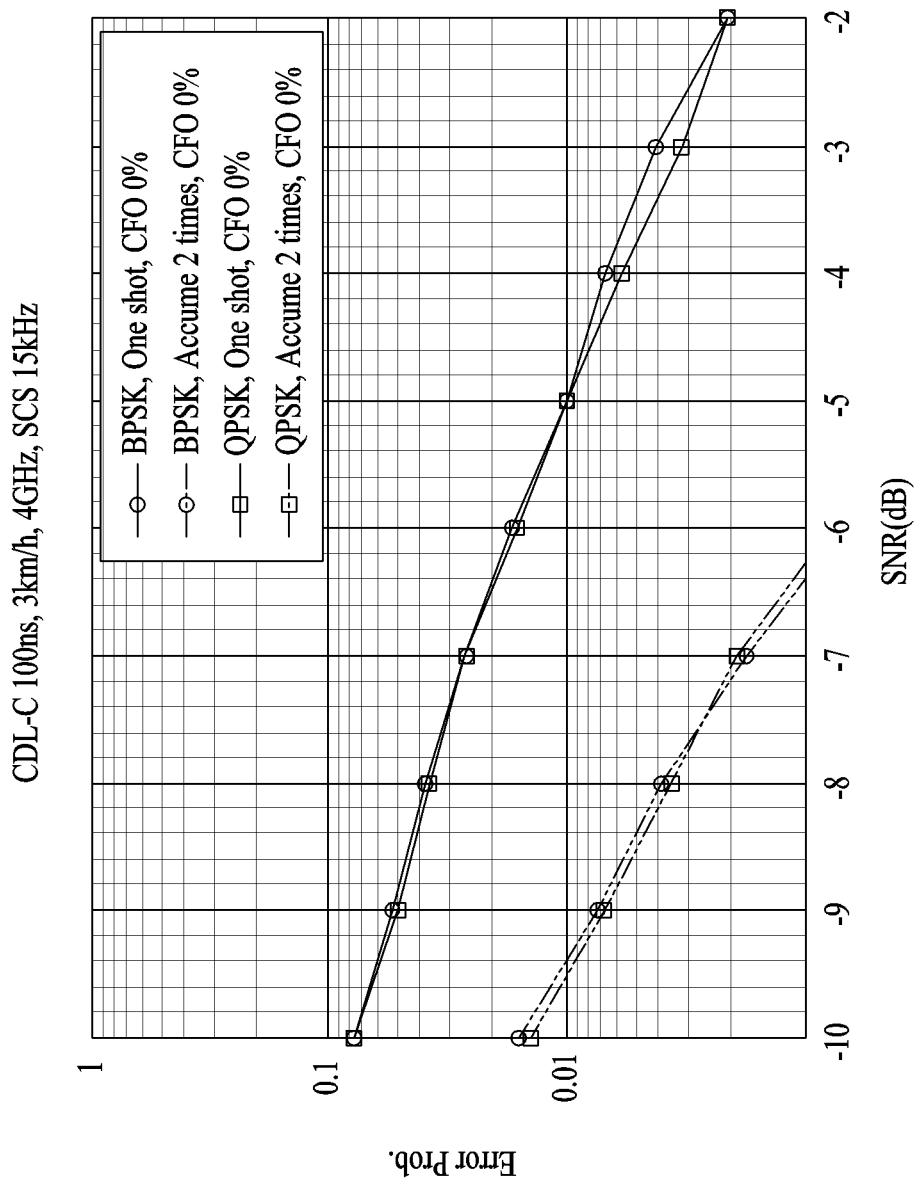
Figure 35:
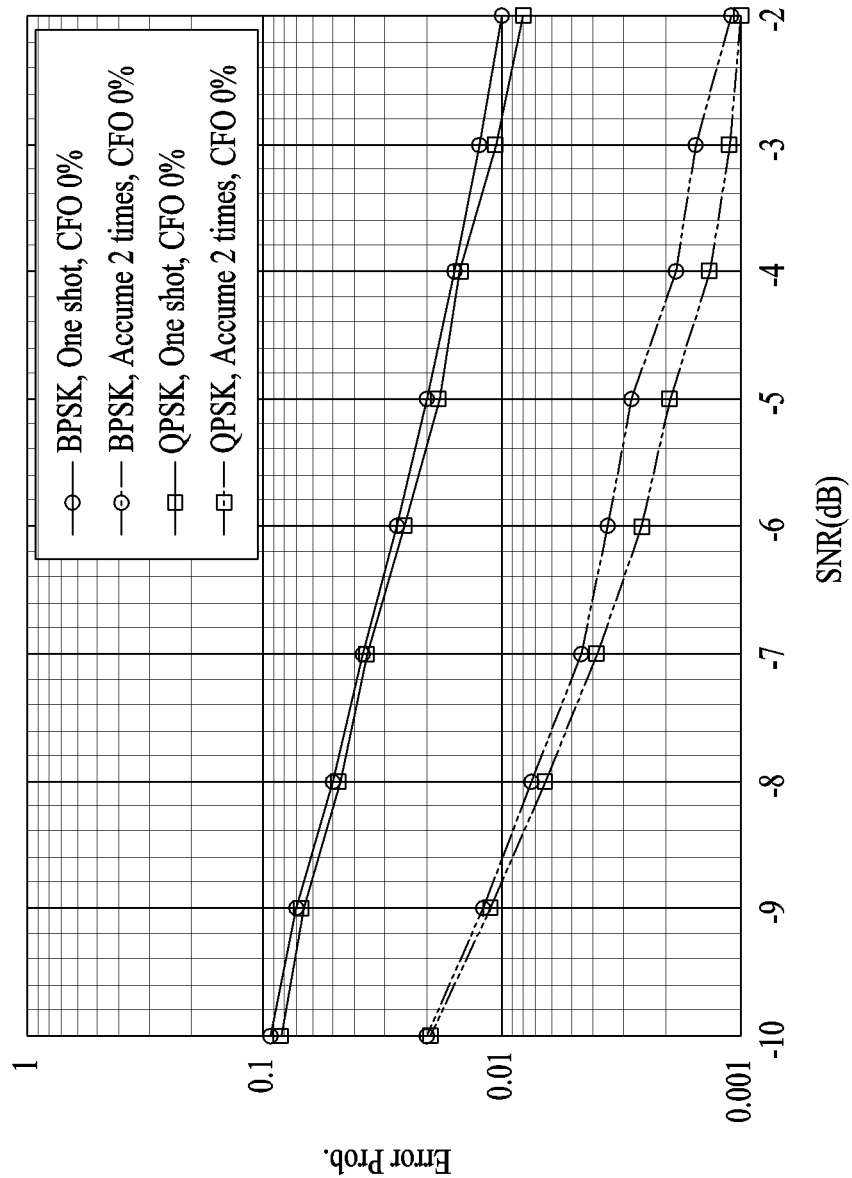

FIGS. 34 and 35 illustrate performance measurement results of BPSK and QPSK. The present experiment is performed based on an assumption that a DMRS hypothesis corresponds to 3 bits and a long sequence is used as a DMRS sequence. A power level of interference TRP is identical to a power level of serving TRP.

Referring to FIGS. 34 and 35, performance of BPSK is similar to performance of QPSK. In particular, there is no significant difference in terms of performance measurement irrespective of a modulation type for a DMRS sequence. However, referring to FIG. 36, it is able to see that a correlation property varies depending on BPSK and QPSK.

Figure 36:
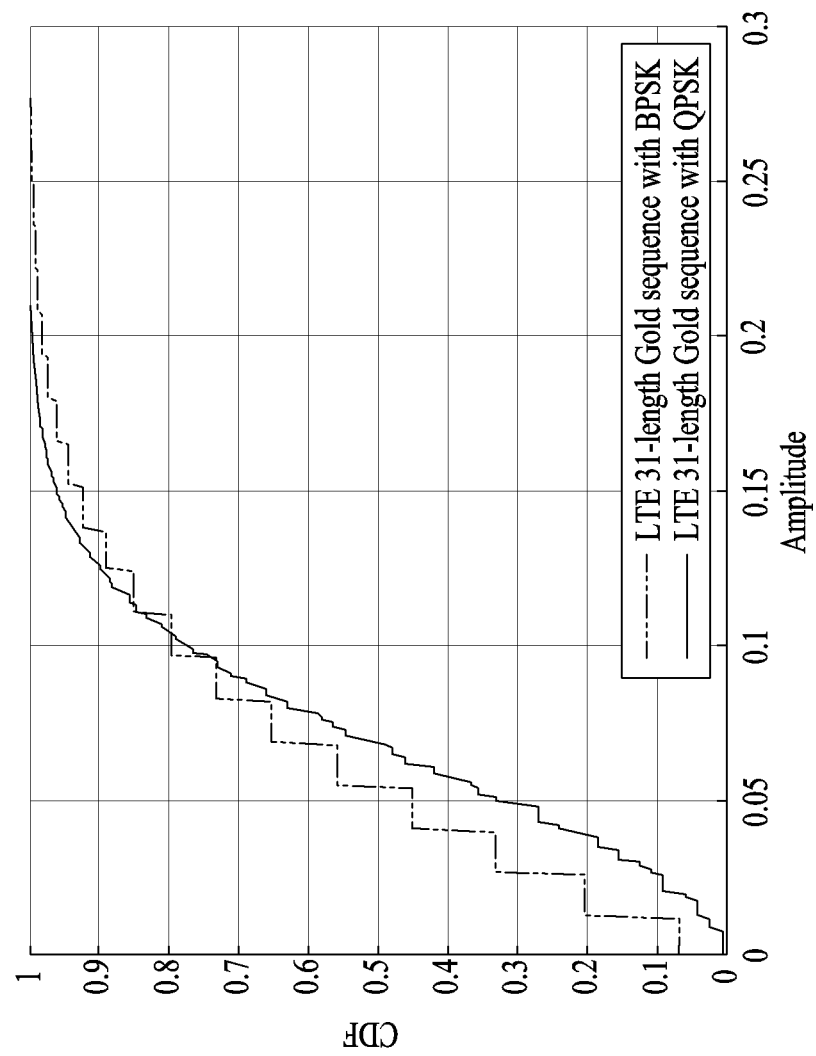

Referring to FIG. 36, BPSK is more distributed to a region of which correlation amplitude is 0.1 compared to QPSK. Hence, when multi-cell environment is considered, it is preferable to use the QPSK as a modulation type of a DMRS. In particular, the QPSK corresponds to a modulation type more suitable for a DMRS sequence in the aspect of the correlation property.

(7) Sequence Generation of PBCH DMRS

Figure 37:
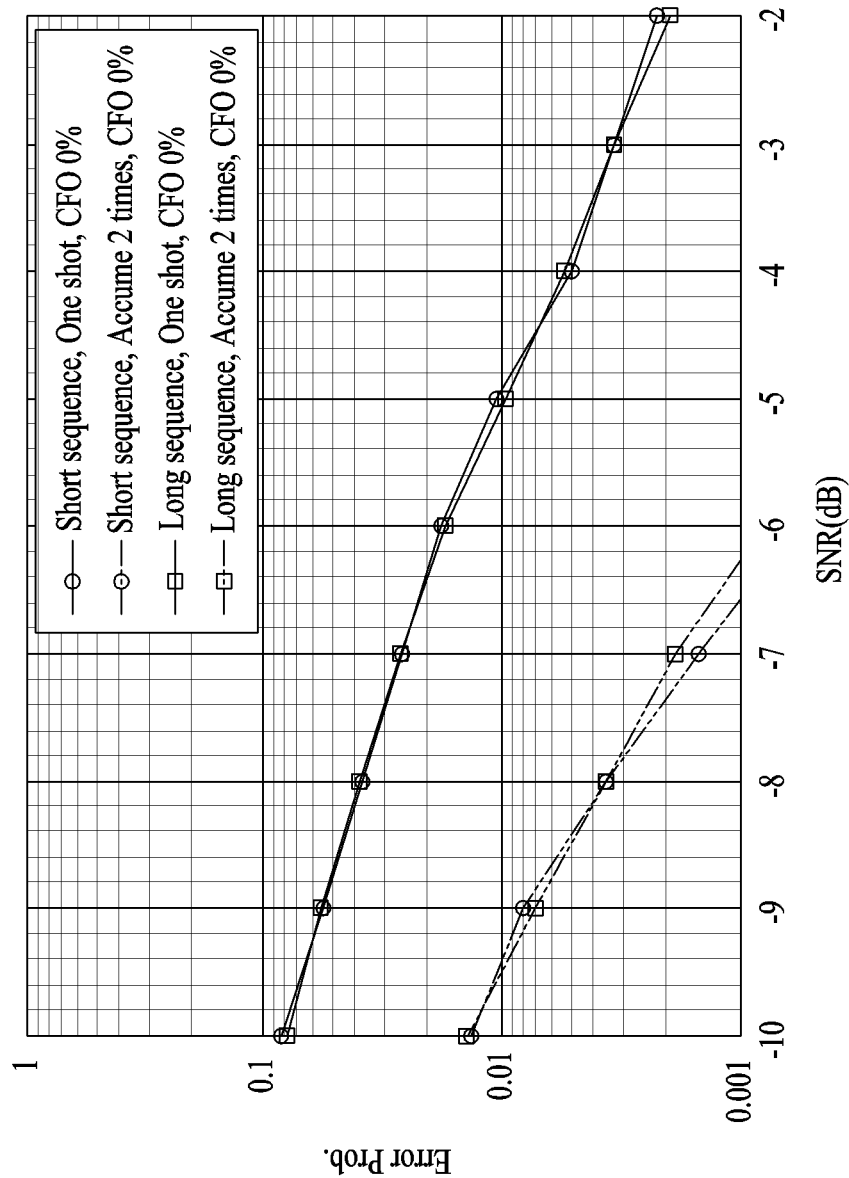
Figure 38:
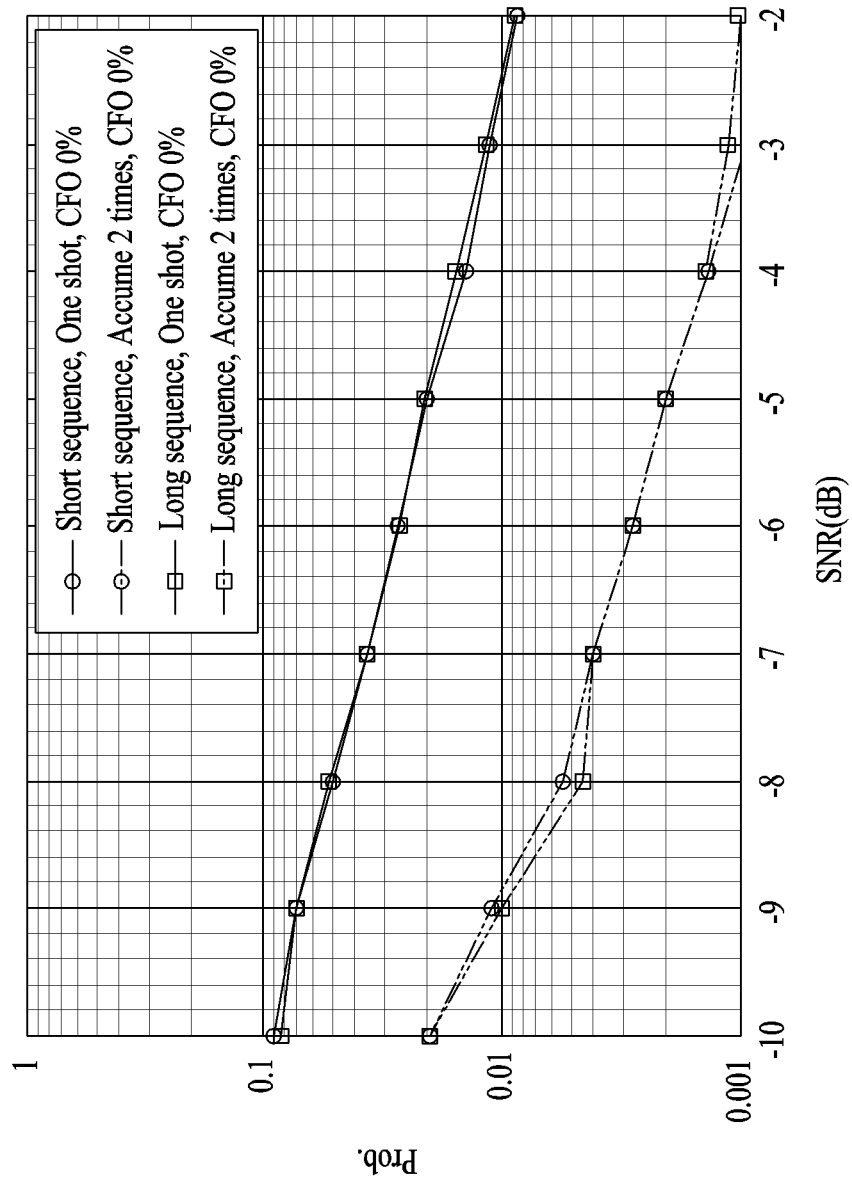

FIGS. 37 to 38 illustrate a measurement result according to DMRS sequence generation. A DMRS sequence can be generated based on a long sequence of a polynomial expression order equal to or greater than 30 or a short sequence of a polynomial expression order equal to or less than 8. And, assume that a hypothesis for a DMRS corresponds to 3 bits and a power level of interference TRP is identical to that of serving TRP.

Referring to FIGS. 37 to 38, it is able to see that detection performance generated based on a short sequence is similar to detection performance generated based on a long sequence.

(8) DMRS RE Mapping

Figure 39:
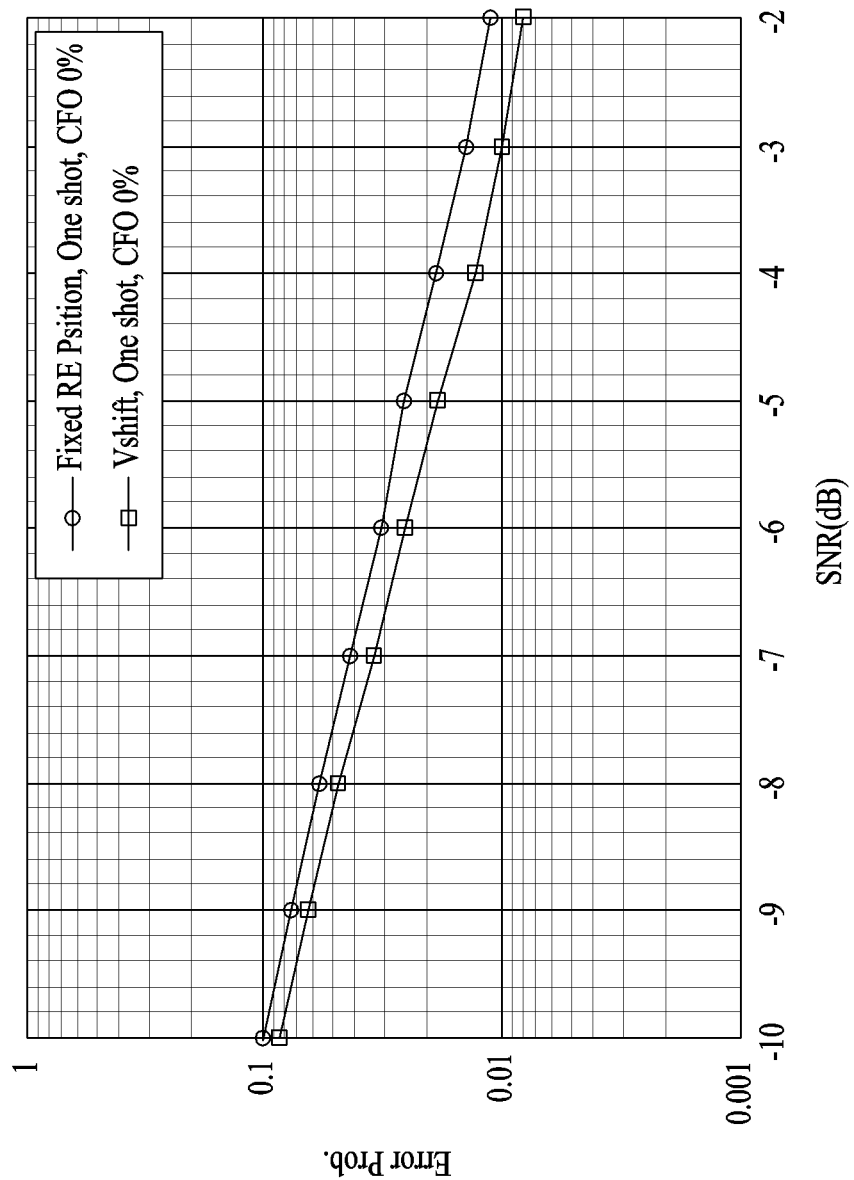

FIG. 39 illustrates performance measurement results according to an RE mapping method. In this case, assume that a hypothesis for a DMRS corresponds to 3 bits, a DMRS sequence is based on a long sequence, and a power level of interference TRP is identical to that of serving TRP. And, assume that there is only one interference source.

As shown in FIG. 39, if variable RE mapping is used, it may have an effect that interference is randomly distributed. In particular, detection performance of the variable RE mapping is superior to performance of fixed RE mapping.

Figure 40:
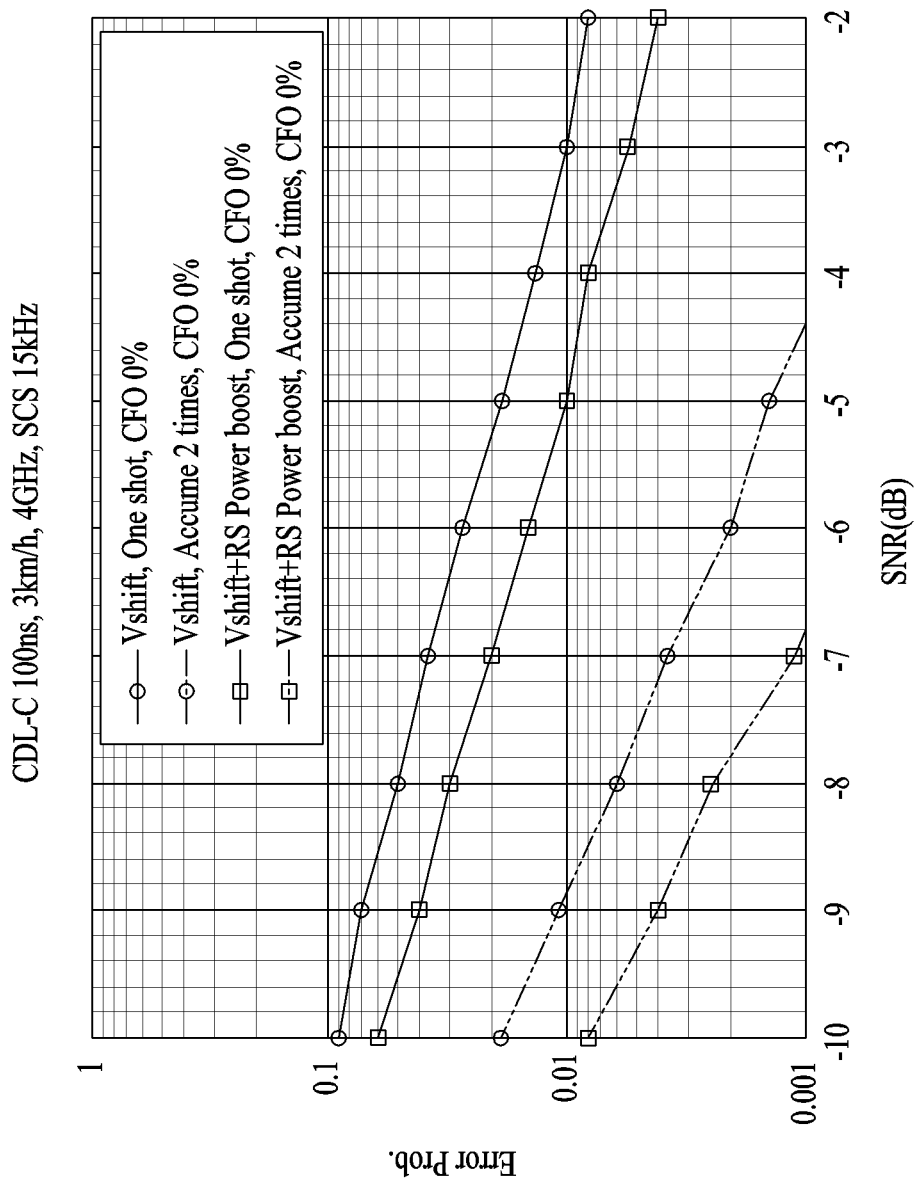

FIG. 40 illustrates a measurement result when RS power boost is used. In this case, assume that RE transmit power for DMRS is higher than RE transmit power for PBCH data as much as about 1.76 dB. If variable RE mapping and DMRS power boosting are used together, interference of a different cell is reduced. As shown in FIG. 40, if RS power boosting is applied, it may have a performance gain as much as 2-3 dB compared to a case of not applying the RS power boosting.

Figure 41:
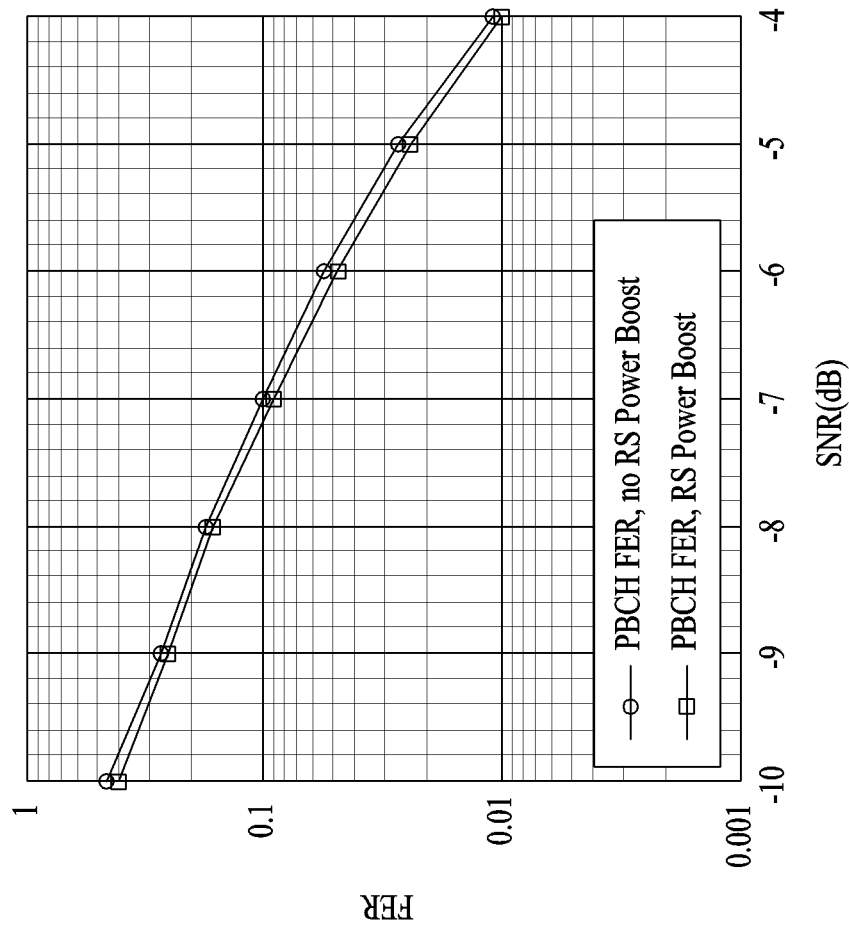
Figure 42:
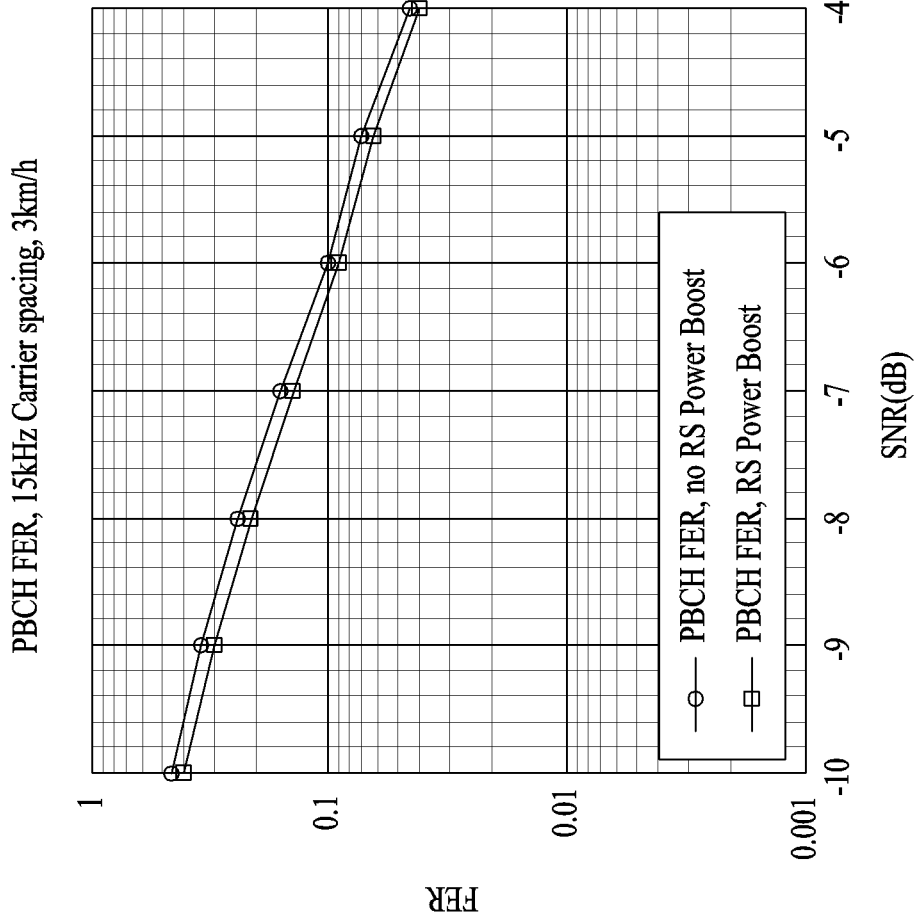
Figure 43:
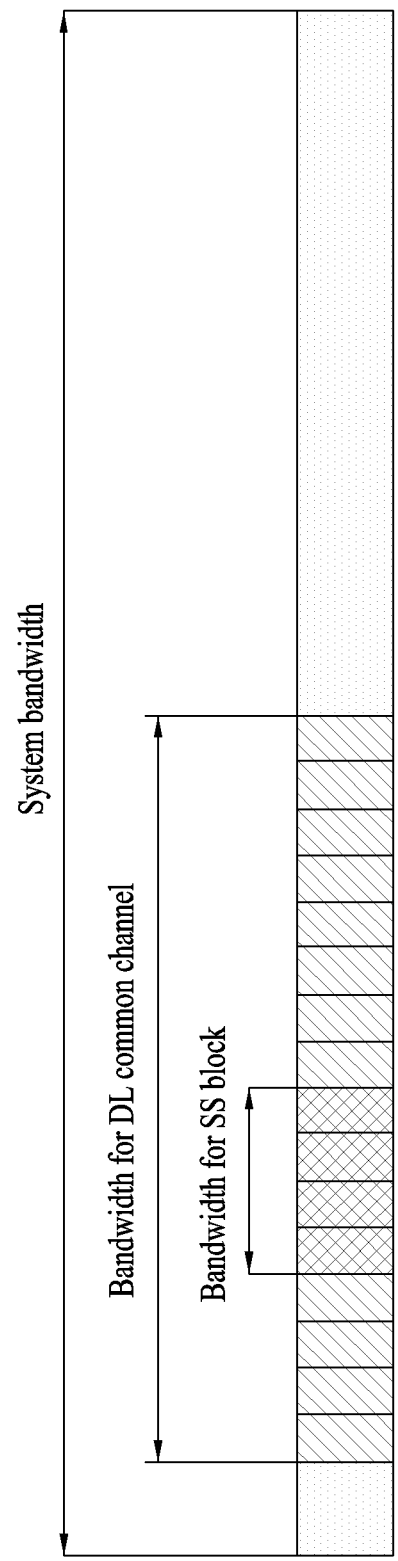
FIGS. 43 and 44 are diagrams for explaining embodiments of configuring a bandwidth for a synchronization signal and a downlink common channel.

On the contrary, the RS power boosting may decrease RE transmit power for PBCH data. Hence, the RS power boosting may influence on PBCH performance. FIGS. 41 to 42 illustrate measurement results for PBCH performance when RS power boosting is applied and the RS power boosting is not applied. In this case, assume that a periodicity of an SS burst set corresponds to 40 ms and a coded bit is transmitted within 80 ms.

If transmit power of an RE for PBCH data is decreased, performance loss may occur. However, channel estimation performance is enhanced due to the increase of RS power, thereby enhancing demodulation performance. In particular, as shown in FIGS. 41 to 42, performance is similar in both cases. In particular, the performance loss due to the decrease of the transmit power of the RE for PBCH data can be complemented by a gain of the channel estimation performance.

Table 6 in the following shows assumption values of parameters used for the performance measurement.

TABLE 6

| Parameter | Value |
|---|---|
| Carrier Frequency | 4 GHz |
| Channel Model | CDL_C (delay scaling values: 100 ns) |
| Subcarrier Spacing | 15 kHz |
| Antenna Configuration | TRP: (1, 1, 2) with Omni-directional antenna element |
| | UE: (1, 1, 2) with Omni-directional antenna element |

TABLE 6-continued

| Parameter | Value |
| --- | --- |
| Frequency Offset | 0% and 10% of subcarrier spacing |
| Default period | 20 ms |
| Subframe duration | 1 ms |
| OFDM symbols in SF | 14 |
| Number of interfering TRPs | 1 |
| Operating SNR | −6 dB |

21. BWP (Bandwidth Part) for Transmitting Downlink Common Channel

An initial access procedure of LTE operates within a system bandwidth configured by MIB. And, PSS/SSS/PBCH is aligned on the basis of the center of the system bandwidth. And, a common search space is defined in the system bandwidth, system information is forwarded by PDSCH assigned within the system bandwidth, and a RACH procedure for Msg 1/2/3/4 operates within the system bandwidth.

Meanwhile, although NR system supports an operation in a broadband CC, it is very difficult to implement a UE capable of performing a necessary operation in all broadband CCs in the aspect of cost. Hence, it may be difficult to implement the UE to smoothly perform an initial access procedure within a system bandwidth.

In order to solve the problem, as shown in FIG. 42, NR can define a BWP for performing an initial access operation. In NR system, SS block transmission, system information forwarding, paging, and an initial access procedure for a RACH procedure can be performed within the BWP corresponding to each UE. And, at least one downlink BWP can include a CORESET having a common search space in at least one primary component carrier.

Hence, at least one selected from the group consisting of RMSI, OSI, paging, and RACH message 2/4-related downlink control information is transmitted in the CORESET having a common search space. A downlink data channel associated with the downlink control information can be assigned within a downlink BWP. And, a UE can anticipate that an SS block is to be transmitted within a BWP corresponding to the UE.

In particular, in NR, at least one or more downlink BWPs can be used for transmitting a downlink common channel. In this case, a signal capable of being included in the downlink common channel may correspond to an SS block, CORESET having a common search space and RMSI, OSI, paging, PDSCH for RACH message 2/4, and the like.

(1) Numerology

In NR, subcarrier spacing such as 15, 30, 60, and 120 kHz are used for transmitting data. Hence, numerology for PDCCH and PDSCH within a BWP for a downlink common channel can be selected from among numerologies defined for data transmission. For example, in a frequency range equal to or narrower than 6 GHz, at least one or more subcarrier spacing can be selected from among 15 kHz, 30 kHz and 60 kHz subcarrier spacing. In a frequency range ranging from 6 GHz to 52.6 GHz, at least one or more subcarrier spacing can be selected from among 60 kHz and 120 kHz subcarrier spacing.

However, in a frequency range equal to or narrower than 6 GHz, subcarrier spacing of 60 kHz is already defined for a URLLC service. Hence, the subcarrier spacing of 60 kHz is not appropriate for transmitting PBCH in the frequency range equal to or narrower than 6 GHz. Hence, in the frequency range equal to or narrower than 6 GHz, it may use subcarrier spacing of 15 kHz or 30 kHz to transmit a downlink common channel. In a frequency range equal to or wider than 6 GHz, it may use subcarrier spacing of 60 kHz or 120 kHz.

Meanwhile, NR system supports subcarrier spacing of 15, 30, 120, and 240 kHz to transmit an SS block. It may assume that the same subcarrier spacing is applied to an SS block, CORESET having a common search space and RMSI, paging, and a downlink channel such as PDSCH for RAR. Hence, if the assumption is applied, it is not necessary to define numerology information in PBCH contents.

On the contrary, subcarrier spacing for a downlink control channel can be changed. For example, when subcarrier spacing of 240 kHz is applied to transmit an SS block in a frequency band equal to or wider than 6 GHz, since the subcarrier spacing of 240 kHz is not defined for data transmission, it is necessary to change the subcarrier spacing to transmit data. In particular, the SCS can be changed to transmit data. The change of the SCS can be indicated using 1-bit indicator in PBCH contents. The 1-bit indicator can be comprehended as {15, 30 kHz} or {60, 120 kHz} according to a carrier frequency range. And, indicated subcarrier spacing can be regarded as reference numerology for an RB grid.

(2) Bandwidth of BWP for Transmitting Downlink Common Channel

In NR system, it is not necessary for a bandwidth of a BWP for a downlink common channel to be identical to a system bandwidth on which a network operates. In particular, the bandwidth of the BWP may be narrower than the system bandwidth. In particular, the bandwidth should be wider than a carrier minimum bandwidth but should be narrower than a UE minimum bandwidth.

In particular, in case of a BWP for transmitting a downlink common channel, it may be able to define a bandwidth of the BWP is to be wider than a bandwidth of an SS block and is to be equal to or narrower than a specific downlink bandwidth of all UEs capable of operating in each frequency range. For example, in a frequency range equal to or narrower than 6 GHz, a carrier minimum bandwidth is defined by 5 MHz and a UE minimum bandwidth can be assumed as 20 MHz. In this case, a bandwidth of a downlink common channel can be defined in a range ranging from 5 MHz to 20 MHz.

(3) Bandwidth Configuration

Figure 44:
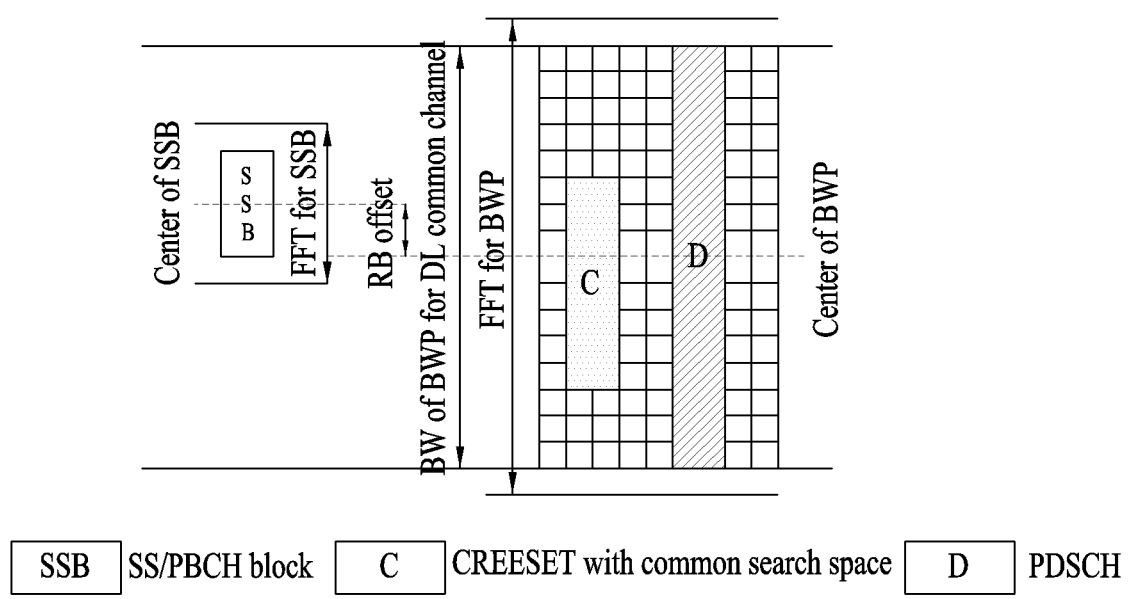

FIG. 44 illustrates an example of configuring a bandwidth.

A UE attempts to detect a signal within a bandwidth of an SS block while an initial synchronization procedure including cell ID detection and PBCH decoding is performed. Subsequently, the UE can continuously perform a next initial access procedure within a bandwidth for a downlink common channel. In particular, the UE obtains system information and may be then able to perform a RACH procedure.

Meanwhile, an indicator indicating a relative frequency position between a bandwidth for an SS block and a bandwidth for a downlink common channel can be defined in PBCH contents. In order to simplify the indication of the relative frequency position, a bandwidth for a plurality of SS blocks may correspond to a candidate position at which an SS block is positioned within the bandwidth for the downlink common channel.

For example, assume that a bandwidth of an SS block corresponds to 5 MHz and a bandwidth of a downlink common channel corresponds to 20 MHz. In this case, in order to find out the SS block within the bandwidth for the downlink common channel, it may be able to define 4 candidate positions.

22. CORESET Configuration (1) CORESET Information and RMSI Scheduling Information It is more efficient for a network to transmit CORESET information including RMSI scheduling information to a UE rather than directly indicate scheduling information on RMSI. In particular, it may be able to indicate frequency resource-related information such as CORESET, a bandwidth for a frequency position, and the like in the PBCH contents. And, it may be able to additionally configure time resource-related information such as a start OFDM symbol duration, the number of OFDM symbols, and the like to flexibly use a network resource.

And, a network can transmit information on a common search space monitoring period, duration, and offset to a UE to reduce UE detection complexity.

Meanwhile, a transmission type and bundling can be fixed according to CORESET of a common search space. In this case, the transmission type can be determined according to whether or not a transmission signal is interleaved.

(2) Number of OFDM Symbols Included in Slot

In relation to the number of OFDM symbols included in a slot or a carrier frequency range equal to or narrower than 6 GHz, it may consider two candidates such as a slot including 7 OFDM symbols and a slot including 14 OFDM symbols. If NR system determines to support the two types of slots for a carrier frequency range equal to or narrower than 6 GHz, it is necessary to define a method of indicating a slot type to display a time resource of CORESET having a common search space.

(3) Bit Size of PBCH Contents

In order to indicate numerology, a bandwidth, and CORESET information in the PBCH contents, as shown in table 8, it may be able to designate about 14 bits.

TABLE 7

| Details | Bit size | |
|---|---|---|
| | 6 GHz | For a6 GHz |
| Reference numerology | [1] | [1] |
| Bandwidth for DL common channel, and SS block position | [3] | [2] |
| # of OFDM symbols in a Slot | [1] | 0 |
| CORESET (Frequency resource - bandwidth, location) (Time resource - starting OFDM symbol, Duration) (UE Monitoring Periodicity, offset, duration) | About [10] | About [10] |
| Total | About [14] | |

Figure 45:
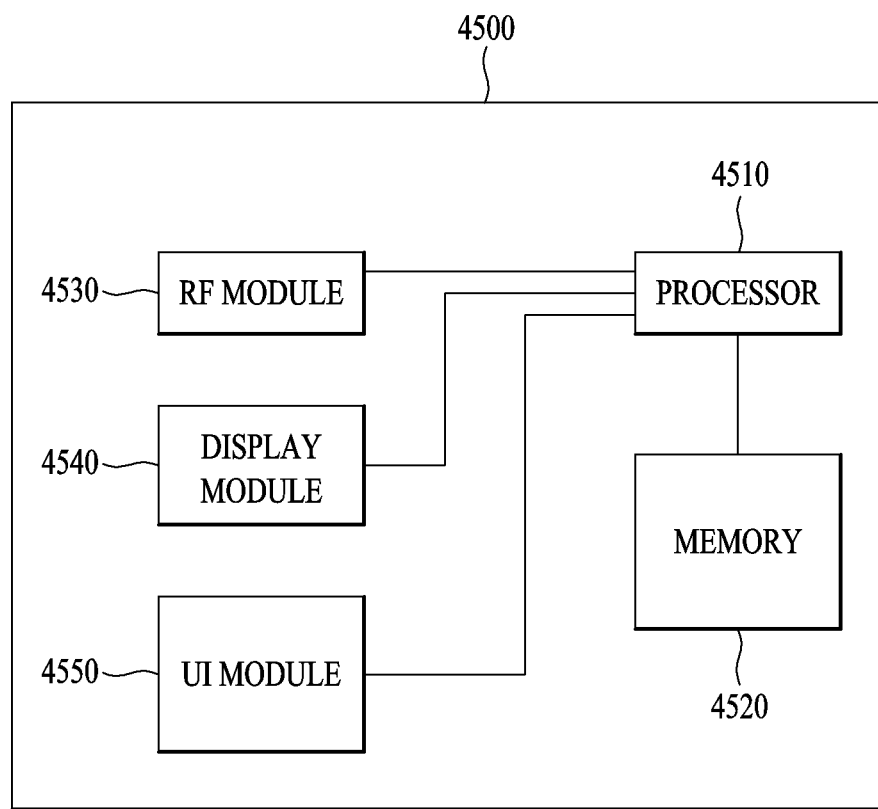
FIG. 45 is a block diagram of a communication apparatus according to an embodiment of the present disclosure.

Referring to FIG. 45, a communication apparatus 4500 includes a processor 4510, a memory 4520, an RF module 4530, a display module 4540, and a User Interface (UI) module 4550.

The communication device 4500 is shown as having the configuration illustrated in FIG. 45, for the convenience of description. Some modules may be added to or omitted from the communication apparatus 4500. In addition, a module of the communication apparatus 4500 may be divided into more modules. The processor 4510 is configured to perform operations according to the embodiments of the present disclosure described before with reference to the drawings. Specifically, for detailed operations of the processor 6010, the descriptions of FIGS. 1 to 44 may be referred to.

The memory 4520 is connected to the processor 4510 and stores an Operating System (OS), applications, program codes, data, etc. The RF module 4530, which is connected to the processor 4510, upconverts a baseband signal to an RF signal or downconverts an RF signal to a baseband signal. For this purpose, the RF module 4530 performs digital-to-analog conversion, amplification, filtering, and frequency upconversion or performs these processes reversely. The display module 4540 is connected to the processor 4510 and displays various types of information. The display module 4540 may be configured as, not limited to, a known component such as a Liquid Crystal Display (LCD), a Light Emitting Diode (LED) display, and an Organic Light Emitting Diode (OLED) display. The UI module 4550 is connected to the processor 4510 and may be configured with a combination of known user interfaces such as a keypad, a touch screen, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

Although a method of receiving a synchronization signal and an apparatus therefor are described centering on the example applied to 5th generation NewRAT system, the method and the apparatus can be applied not only to the 5th generation NewRAT system but also to various wireless communication systems.

What is claimed is:

1. A method of receiving a synchronization signal and physical broadcast channel (SS/PBCH) block by a user equipment (UE) operating on a frequency band above 6 GHz in a wireless communication system, the method comprising:
   receiving system information including (i) first information related to one or more SS/PBCH block groups and (ii) second information related to one or more SS/PBCH blocks within each of the one or more of SS/PBCH block groups; and
   receiving the SS/PBCH block based on the first information and the second information,
   wherein the first information informs the UE of the one or more SS/PBCH block groups, in each of which the one or more SS/PBCH blocks are transmitted,
   wherein the second information informs the UE of the one or more transmitted SS/PBCH blocks within each of the one or more SS/PBCH block groups,
   wherein the second information is commonly used for the one or more SS/PBCH block groups informed by the first information,
   wherein each of the one or more transmitted SS/PBCH blocks includes a primary synchronization signal (PSS), a secondary synchronization signal (SSS), and a physical broadcast channel (PBCH) signal, and
   wherein the first information is in a form of a bitmap and a length of the bitmap is 8 bits.

2. The method of claim 1, wherein a value 1 in the bitmap indicates that the SS/PBCH blocks are transmitted.

3. The method of claim 1, wherein the second information is in a form of a bitmap.

4. The method of claim 3, wherein a value 0 in the bitmap indicates that the corresponding SS/PBCH block is not transmitted while the value 1 indicates that the corresponding SS/PBCH block is transmitted.

5. The method of claim 1, wherein the second information comprises a number of the one or more transmitted SS/PBCH blocks.

6. The method of claim 1, wherein the system information is received in a system information block (SIB).

7. The method of claim 1, wherein the UE assumes that reception occasions on a PBCH, PSS and SSS are in consecutive symbols and form a SS/PBCH block.

8. A user equipment (UE) configured to operate on a frequency band above 6 GHz and to receive a synchronization signal and physical broadcast channel (SS/PBCH) block in a wireless communication system, the UE comprising:
   a transceiver;
   at least one processor; and
   at least one computer memory operably connectable to the at least one processor and storing instructions that, when executed by the at least one processor, perform operations comprising:
   receiving, through the transceiver, system information including (i) first information related to one or more SS/PBCH block groups and (ii) second information related to one or more SS/PBCH blocks within each of the one or more of SS/PBCH block groups, and
   receiving, through the transceiver, the SS/PBCH block based on the first information and the second information,
   wherein the first information informs the UE of the one or more SS/PBCH block groups, in each of which the one or more SS/PBCH blocks are transmitted,
   wherein the second information informs the UE of the one or more transmitted SS/PBCH blocks within each of the one or more SS/PBCH block groups,
   wherein the second information is commonly used for the one or more SS/PBCH block groups informed by the first information,
   wherein each of the one or more transmitted SS/PBCH blocks includes a primary synchronization signal (PSS), a secondary synchronization signal (SSS), and a physical broadcast channel (PBCH) signal, and
   wherein the first information is in a form of a bitmap and a length of the bitmap is 8 bits.

9. The UE of claim 8, wherein a value 1 in the bitmap indicates that the SS/PBCH blocks are transmitted.

10. The UE of claim 8, wherein the second information is in a form of a bitmap.

11. The UE of claim 10, wherein a value 0 in the bitmap indicates that the corresponding SS/PBCH block is not transmitted while the value 1 indicates that the corresponding SS/PBCH block is transmitted.

12. The UE of claim 8, wherein the second information comprises a number of the one or more transmitted SS/PBCH blocks.

13. The UE of claim 8, wherein the system information is received in a system information block (SIB).

14. The UE of claim 8, wherein the UE assumes that reception occasions on a PBCH, PSS and SSS are in consecutive symbols and form a SS/PBCH block.

15. An apparatus configured to control a user equipment (UE) to operate on a frequency band above 6 GHz and to receive a synchronization signal and physical broadcast channel (SS/PBCH) block in a wireless communication system, the apparatus comprising:
   at least one processor; and
   at least one computer memory operably connectable to the at least one processor and storing instructions that, when executed by the at least one processor, perform operations comprising:
   receiving system information including (i) first information related to one or more SS/PBCH block groups and (ii) second information related to one or more SS/PBCH blocks within each of the one or more of SS/PBCH block groups, and
   receiving the SS/PBCH block based on the first information and the second information,
   wherein the first information informs the UE of the one or more SS/PBCH block groups, in each of which the one or more SS/PBCH blocks are transmitted,
   wherein the second information informs the UE of the one or more transmitted SS/PBCH blocks within each of the one or more SS/PBCH block groups,
   wherein the second information is commonly used for the one or more SS/PBCH block groups informed by the first information,
   wherein each of the one or more transmitted SS/PBCH blocks includes a primary synchronization signal (PSS), a secondary synchronization signal (SSS), and a physical broadcast channel (PBCH) signal, and
   wherein the first information is in a form of a bitmap and a length of the bitmap is 8 bits.

16. The apparatus of claim 15, wherein a value 1 in the bitmap indicates that the SS/PBCH blocks are transmitted.

17. The apparatus of claim 15, wherein the second information is in a form of a bitmap.

18. The apparatus of claim 17, wherein a value 0 in the bitmap indicates that the corresponding SS/PBCH block is not transmitted while the value 1 indicates that the corresponding SS/PBCH block is transmitted.

* * * * *